(12) United States Patent
Yamagishi et al.

(10) Patent No.: US 12,185,167 B2
(45) Date of Patent: Dec. 31, 2024

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventors: Yasuaki Yamagishi, Tokyo (JP); Kazuhiko Takabayashi, Tokyo (JP); Yoshiyuki Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 469 days.

(21) Appl. No.: 17/639,388

(22) PCT Filed: Aug. 31, 2020

(86) PCT No.: PCT/JP2020/032862
§ 371 (c)(1),
(2) Date: Mar. 1, 2022

(87) PCT Pub. No.: WO2021/049347
PCT Pub. Date: Mar. 18, 2021

(65) Prior Publication Data
US 2022/0322157 A1    Oct. 6, 2022

(30) Foreign Application Priority Data
Sep. 10, 2019  (JP) .................. 2019-164752

(51) Int. Cl.
*H04W 72/30*  (2023.01)
*H04W 4/06*   (2009.01)
*H04W 28/26*  (2009.01)

(52) U.S. Cl.
CPC ............. *H04W 28/26* (2013.01); *H04W 4/06* (2013.01); *H04W 72/30* (2023.01)

(58) Field of Classification Search
CPC ....... H04W 28/26; H04W 4/06; H04W 72/30; H04W 72/23
See application file for complete search history.

(56) References Cited

U.S. PATENT DOCUMENTS

| | | |
|---|---|---|
| 2012/0192242 A1 | 7/2012 | Kellerer et al. |
| 2016/0078900 A1 | 3/2016 | Baron et al. |
| 2016/0127951 A1 | 5/2016 | Skarp |

FOREIGN PATENT DOCUMENTS

| | | |
|---|---|---|
| CN | 105144740 A | 12/2015 |
| EP | 2479684 A1 | 7/2012 |

(Continued)

OTHER PUBLICATIONS

3GPPTR26.939V16.1.0(Sep. 2019)3rd Generation Partnership Project; Technical Specification Group Services and System Aspects; Guidelines on the Framework for Live Uplink Streaming (FLUS); (Release16) (Year:2019) (Year: 2019).*

(Continued)

*Primary Examiner* — Lan-Huong Truong
(74) *Attorney, Agent, or Firm* — CHIP LAW GROUP

(57) ABSTRACT

An information processing device (50) includes a control unit. The control unit acquires each piece of resource information related to a plurality of different resources to be used when uplink data is transmitted by streaming. The control unit selects a resource to be used by a device (10, 20, 30) that performs the streaming on the basis of the resource information that has been acquired and performs reservation for use of the resource that has been selected. The control unit generates combination information related to a combination of resources that have been reserved for use.

12 Claims, 48 Drawing Sheets

(56) References Cited

FOREIGN PATENT DOCUMENTS

| JP | 2012-165371 | A | | 8/2012 | | |
|----|----|----|----|----|----|----|
| JP | 2016-523041 | A | | 8/2016 | | |
| JP | 2016-524833 | A | | 8/2016 | | |
| KR | 10-2016-0006783 | A | | 1/2016 | | |
| WO | 2014/181043 | A1 | | 11/2014 | | |
| WO | 2014/189485 | A1 | | 11/2014 | | |
| WO | WO-2019133048 | A1 | * | 7/2019 | ........... | H04B 17/318 |
| WO | WO-2020040938 | A1 | * | 2/2020 | ....... | H04N 21/26216 |

OTHER PUBLICATIONS

"3rd Generation Partnership Project; Technical Specification Group Services and System Aspects; Guidelines on the Framework for Live Uplink Streaming (FLUS); Release 15", (Jun. 2018), 29 pages.
International Search Report and Written Opinion of PCT Application No. PCT/JP2020/032862, issued on Dec. 1, 2020, 09 pages of ISRWO.

* cited by examiner

FIG.53

| Name | Definition | Unit | Type | Valid range |
|---|---|---|---|---|
| ScheduledResourceBinding | Token to be used to resolve reserved resources bound to instantiated function tasks at scheduled time described in this workflow. | N/A | String | N/A |

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2020/032862 filed on Aug. 31, 2020, which claims priority benefit of Japanese Patent Application No. JP 2019-164752 filed in the Japan Patent Office on Sep. 10, 2019. Each of the above-referenced applications is hereby incorporated herein by reference in its entirety.

FIELD

The present disclosure relates to an information processing device, an information processing method, and an information processing system.

BACKGROUND

With an increase in use cases of distributing streams such as User Generate Contents (UGC), there is a possibility that a standard content (stream) uplink interface will be supported in a distribution platform called a video ecosystem (see, for example, Non Patent Literature 1).

A stream uplink interface is used in, for example, a low-cost smartphone camera or video camera that captures the UGC content. The stream uplink interface is also assumed to be used in cases where a wide variety of streams recorded in a professional camera are uplinked.

CITATION LIST

Non Patent Literature

Non Patent Literature 1: 3rd Generation Partnership Project; Technical Specification Group Services and System Aspects; Guidelines on the Framework for Live Uplink Streaming (FLUS); (Release 15), 3GPP TR 26.939 V15.0.0 (2018-06).

SUMMARY

Technical Problem

Here, as the mobile communication system shifts to 5G, high-quality uplink of a recording stream for professional use via a carrier network and the Internet network is desired in the future.

In addition, a mechanism that enables simple photographing (instant capture) by various capture devices such as a smartphone camera and a video camera and uplink (instantaneous uplink) immediately after photographing is desired.

Therefore, the present disclosure proposes technology that contributes to implementation of high-quality and low-delay uplinks of recording streams.

Note that the above problem or object is merely one of a plurality of problems or objects that can be solved or achieved by a plurality of embodiments disclosed in the present specification.

Solution to Problem

According to the present disclosure, an information processing apparatus is provided. The information processing device includes a control unit. The control unit acquires each piece of resource information related to a plurality of different resources to be used when uplink data is transmitted by streaming. The control unit selects a resource to be used by a device that performs the streaming on the basis of the resource information that has been acquired and performs reservation for use of the resource that has been selected. The control unit generates combination information related to a combination of resources that have been reserved for use.

BRIEF DESCRIPTION OF DRAWINGS

FIG. 53 is a diagram for describing SRB extended NBMP-WD according to another embodiment of the present disclosure.

DESCRIPTION OF EMBODIMENTS

Figure 1:
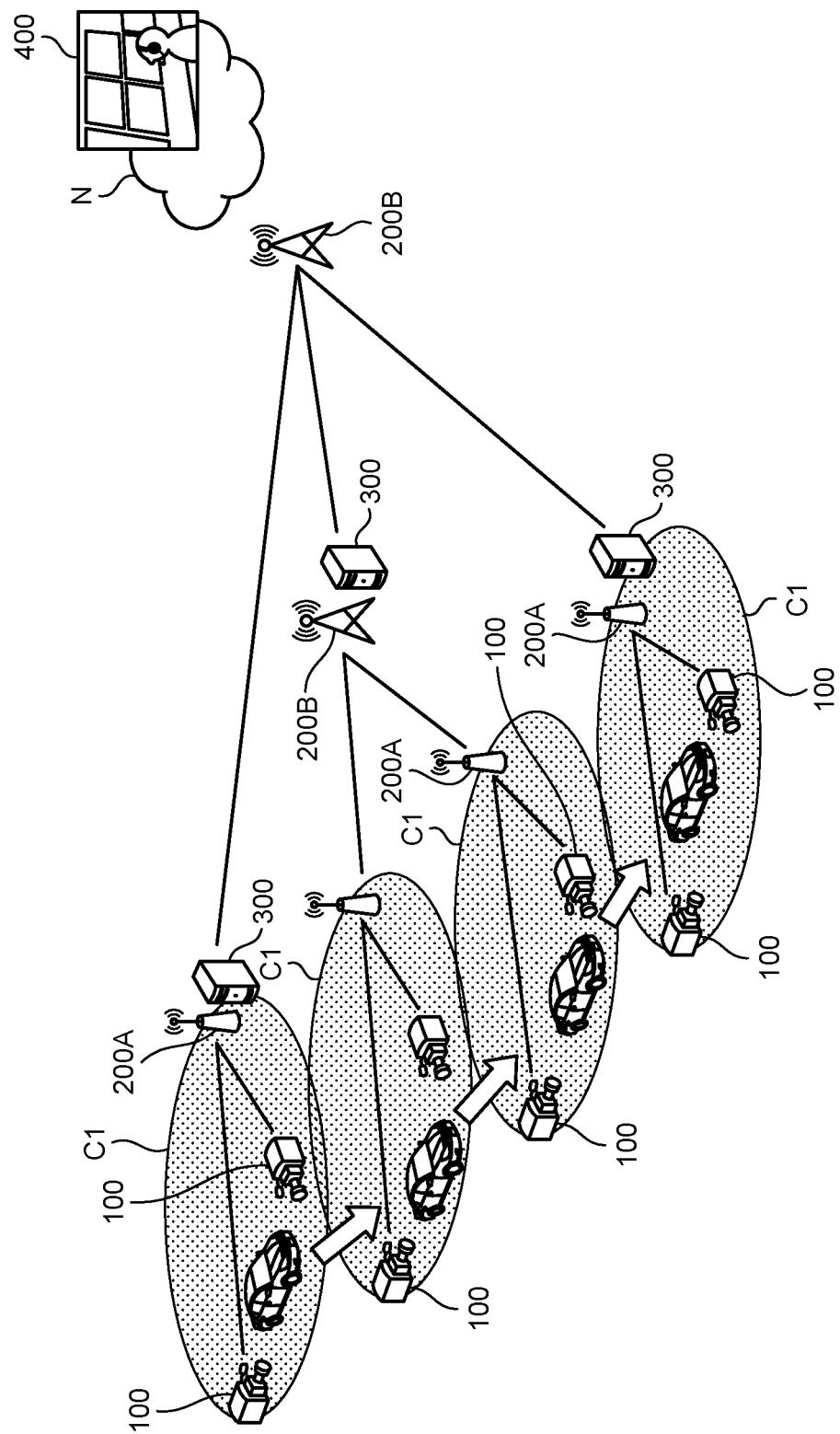
FIG. 1 is a diagram illustrating a configuration example of a streaming system to which the technology of the present disclosure can be applied.

Hereinafter, an embodiment of the present disclosure will be described in detail by referring to the accompanying drawings. Note that, in the present specification and the drawings, components having substantially the same functional configuration are denoted by the same reference numerals, and redundant description is omitted.

In addition, in the present specification and the drawings, similar components of embodiments may be distinguished by attaching different alphabets after the same reference numeral. Note that, in a case where it is not necessary to particularly distinguish each of similar components, only the same reference numeral is assigned.

One or more embodiments (including examples and modifications) described below can be each implemented independently. On the other hand, at least a part of a plurality of embodiments described below may be combined with at least a part of another embodiment as appropriate. The plurality of embodiments may include novel features different from each other. Therefore, the plurality of embodiments can contribute to solving different objects or problems and exhibit different effects.

Note that the description will be given in the following order.

1. Introduction
1.1. Configuration Example of Streaming System
1.2. Outline of Proposed Technology
2. Configuration Example of Information Processing System
2.1. Overall Configuration Example of Information Processing System
2.2. Configuration Example of Network Architecture
3. Registration Process of Resource Attributes
3.1. Registration Process by Streaming Source
3.2. Registration Process by Network
3.3. Registration Process by Streaming Sink
4. Scheduling Process
4.1. Inquiry Process
4.2. Selection Process
4.3. Reservation Process
4.4. SRB Generation Process
4.5. SRB Notification Process
4.6. Session Process
5. Process Flow in Entire System
6. SRB Update Process
7. Selection of UPF
8. Functional Configuration Example of Device
9. Other Embodiments
10. Modifications
11. Summary

1. INTRODUCTION

<1.1. Configuration Example of Streaming System>

First, an example of a streaming system to which the technology of the present disclosure can be applied will be described. FIG. 1 is a diagram illustrating a configuration example of a streaming system to which the technology of the present disclosure can be applied. A streaming system has an uplink streaming function of streaming images captured by a capture device such as a camera via a network.

A streaming system includes terminal devices 100, base station devices 200, application servers 300, and an information processing device 400. In the streaming system, an image captured (captured) by a terminal device 100 is processed by an application server 300 via a base station device 200 and transmitted to the information processing device 400.

For example, illustrated in FIG. 1 is an example in which images of an automobile race are captured by the terminal devices 100 and uplink streaming is performed to the information processing device 400 in a control room of a broadcasting station via a network N.

The terminal devices 100 and the base station devices 200 are coupled via radio access networks. Here, the radio access networks may be an evolved universal terrestrial radio access network (E-UTRAN) or a next generation radio access network (NG-RAN).

Note that the devices in the drawing may be considered as devices in a logical sense. That is, some of the devices in the drawing may be implemented by a virtual machine (VM), a container, a docker, or the like, and they may be implemented on physically the same hardware.

[Terminal Device]

A terminal device 100 is a communication device that performs wireless or wired communication with a base station device 200. The terminal device 100 is a device (mobile network capture device) including an imaging device, and is, for example, a mobile phone or a smart device (smartphone or tablet). Alternatively, the terminal device 100 may be a business-use camera for professional use.

[Base Station Device]

A base station device 200A is a small cell base station device and provides services to the terminal device 100 using a cell C1 as a communication area. Note that the cell C1 is a small cell.

Meanwhile, a base station device 200B is a macrocell base station device and provides services to the terminal device 100 using a macrocell (not illustrated) as a communication area.

The macrocell may be operated in accordance with any wireless communication scheme such as LTE, LTE-Advanced (LTE-A), LTE-ADVANCED PRO, GSM (registered trademark), UMTS, W-CDMA, CDMA 2000, WiMAX, WiMAX 2, or IEEE 802.16.

Note that the small cell is a concept that may include various types of cells (for example, femtocells, nanocells, picocells, and microcells) smaller than the macrocell and is arranged overlapping with a macrocell or without overlapping with any macrocell. In one example, a small cell is operated by a dedicated base station device. In another example, a small cell is operated by a terminal, which is serving as the master device, temporarily operating as a small cell base station device. A so-called relay node may also be regarded as a form of a small cell base station device. A wireless communication device that functions as a master station of a relay node is also referred to as a donor base station device. The donor base station device may refer to a DeNB in LTE or may more generally refer to a master station of a relay node.

Note that one base station device 200 may provide a plurality of cells.

The base station devices 200 can communicate with each other via a backhaul and mainly exchange control information. The backhaul may be wired or wireless. In the backhaul, for example, data exchange using protocols of an X2 interface or an S1 interface can be performed.

The base station device 200 is further coupled with the network N. A base station device 200 can be coupled to the network N via a core network (not illustrated).

Alternatively, a base station device 200 may be an entity included in a local cellular network (for example, local 5G). The local cellular network may broadly include forms referred to as a private network, a non-public network, and the like.

[Application Server]

An application server 300 is an information processing device that performs media processing on the basis of an image captured by a terminal device 100. The media processing includes, for example, an object recognition process of a captured image, a camera feedback control process based on the recognition process, and the like. The camera feedback control includes, for example, selection of a camera that performs imaging, automatic tracking control of a subject by the camera, and the like. Alternatively, the media processing may include, for example, edge cache (distributed storage) process for caching captured images to be streamed for ensuring redundancy.

Such an application server 300 is, generally, installed in the network N. Meanwhile, there are cases where an application server 300 is installed closer to a terminal device 100 for the purpose of reducing the delay and mitigating the traffic in the core network. Such an application server 300 is also referred to as a mobile edge computing (MEC) server. An MEC server is typically installed in a base station device 200 (installed inside or provided externally) and provides an application (for example, media processing) for a terminal device 100 coupled to the base station device 200. The application server 300 may operate as, for example, an MEC platform, an MEC host, or an MEC application.

[Information Processing Device]

The information processing device 400 receives streaming distribution of images captured by the terminal devices 100. Illustrated in FIG. 1 is a case where the information processing device 400 is, for example, a production server installed in a control room of a broadcasting station. The information processing device 400 is only required to receive provision of streaming services (end user) and may be, for example, a terminal device having a display unit, a storage server, or the like.

Note that the lines coupling the devices that are indicated by solid lines in FIG. 1 indicate logical connections, and it does not matter whether or not the lines are physically and directly connected.

<1.2. Outline of Proposed Technology>

Like the above streaming system, it is desired to implement a system in which a high-quality uplink of a recording stream via a carrier network and the Internet network is ensured. In addition, it is desired to generalize instant capture by a capture mobile device such as a terminal device 100 or an instantaneous uplink of uploading immediately after capture. Furthermore, it is conceivable that a cloud-native media processing environment in which images captured by a capture mobile device are processed with low latency in a media processing system on the cloud and are further loaded in a distribution system is more strongly desired.

In order to implement such a system, it is desired to perform seamless uplink streaming. Here, seamless streaming means, in a case where a moving subject is captured by a camera, streaming in which a live capture stream is not interrupted even when at least one of the subject and the camera travels across the cell C1. In a case where the camera travels across the cell C1, handover is performed between base station devices 200; however, even in a case where such inter-base station handover is performed, seamless uplink streaming is desired.

In, FIG. 1, a streaming system for recording an automobile race relay or the like is illustrated. In a relay of such an automobile race, it is conceivable that the above seamless uplink streaming is desired.

Meanwhile, in the automobile race relay, for example, it is assumed that a large number of base station devices 200, which are base station devices of local 5G that can be installed in a portable manner, are installed at the race site to configure local 5G and to relay the automobile race.

There are cases where there is a constraint that the coverage (range of the cell C1) of the above base station device of the local 5G is less than or equal to one hundred meters. In this case, the frequency of inter-base station handover increases.

Furthermore, as described above, in a streaming system, an application server 300 installed in the vicinity of a base station device 200 performs the media processing of a subsequent stage on images transmitted in the uplink by utilizing the low delay performance which is a 5G feature.

In this case, such media processing is executed by the application server 300 installed in the vicinity of the base station device 200 through which the uplink stream from the terminal device 100 passes. Therefore, for example, when base station devices 200 coupled with the terminal device 100 that transmits an image are switched by inter-base station handover, it is necessary to transfer the function of executing the media processing between application servers 300 as appropriate. Due to the overhead caused by the environment transfer including such a function transfer, there is a possibility that the quality of uplink is degraded and that a seamless uplink streaming that is demanded cannot be implemented.

This is mainly due to the overhead of re-ensuring the resources required for an uplink streaming session at every environment transfer. Here, examples of the resource include a resource (hereinafter, also referred to as a base station resource) used for communication of the base station device 200, a network, and a resource (hereinafter, also referred to as an application resource) for using an application on MEC.

Therefore, in the technology of the present disclosure, it is possible to further mitigate quality degradation by reconfiguring various resources associated with the environment transfer in advance.

More specifically, in the technology of the present disclosure, a schedule for securing resources is generated in order to prepare in advance various resources expected to be used after the environment transfer. Furthermore, in the technology of the present disclosure, a generated schedule is shared in the streaming system. As a result, resources required for uplink streaming can be prepared in a timely manner, the risk of quality degradation in seamless uplink streaming can be reduced, and resource utilization efficiency can be increased. Furthermore, by increasing the resource utilization efficiency, the terminal devices 100 and the base station devices 200 can be efficiently operated, and the power consumption can be further reduced.

Note that the technology of the present disclosure can be applied to a system that produces live content over a relatively wide range, such as the relay of the automobile race or a relay of a road race illustrated in FIG. 1. In such a system, a subject travels across base station devices 200. In addition, a large number of cameras (terminal devices 100) capture images of the subject, and the large number of cameras are each coupled to one of a plurality of base station devices 200 installed in a distributed manner. Furthermore, in such a system, media processing such as selection of a shooting camera, caching of imaging data, and subject tracking is performed at an edge.

Note that the technology of the present disclosure can be applied not only to a case where the base station devices 200 of the above streaming system are base station devices of local 5G that can be installed in a portable manner but also to a case where the base station devices are general 5G base station devices shared by various 5G devices.

In particular, in a case of such a general 5G base station device, there is a possibility that resource contention with sessions of other services or application frequently occurs in reconstructing a network or MEC application resources to be reconstructed upon a handover between terminal devices 100.

Therefore, in order to ensure high-quality recording streaming, it is important to perform optimum resource reservation in advance.

2. CONFIGURATION EXAMPLE OF INFORMATION PROCESSING SYSTEM

<2.1. Overall Configuration Example of Information Processing System>

Next, an information processing system according to the technology of the present disclosure will be described. Such an information processing system can be applied to a part of the streaming system illustrated in FIG. 1.

Figure 2:
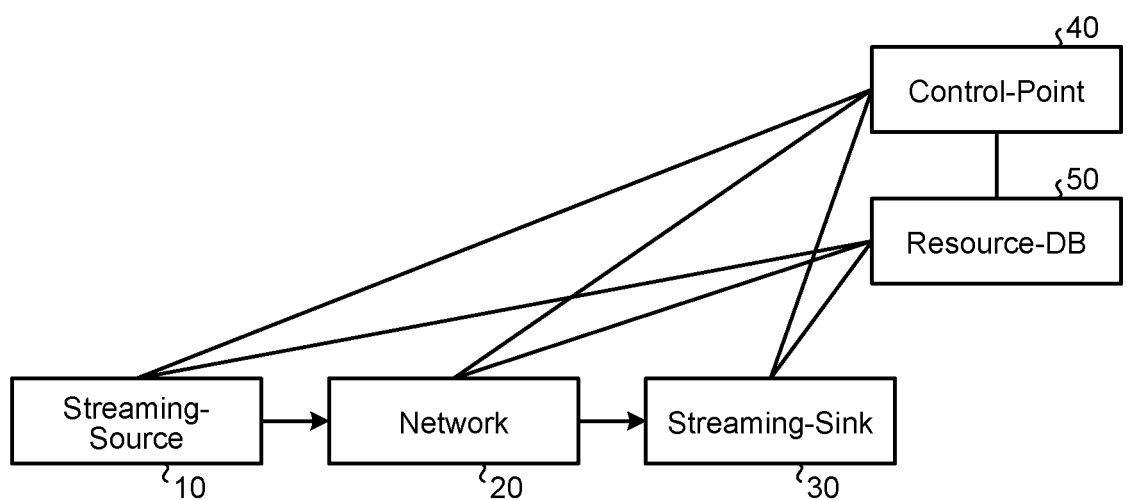
FIG. 2 is a diagram illustrating a configuration example of an information processing system according to an embodiment of the present disclosure.

FIG. 2 is a diagram illustrating a configuration example of an information processing system according to the embodiment of the present disclosure. The information processing system includes a streaming source (Streaming-Source) 10, a network (Network) 20, a streaming sink (Streaming-Sink) 30, a control point (Control-Point) 40, and a resource database (Resource-DB) 50.

The streaming source 10 is a resource (module, application, or device) serving as a source of uplink streaming. The streaming source 10 is included in a terminal device 100 in FIG. 1, for example. The streaming source 10 according to the present embodiment is, for example, a network camera or the like.

The network 20 illustrated in FIG. 2 is a network resource that transfers an uplink stream between the streaming source 10 and the streaming sink 30. For example, the network 20 corresponds to a base station device 200, a core network (not illustrated), or an access network illustrated in FIG. 1.

The streaming sink 30 of FIG. 2 is a resource (module, application, or device) that receives and performs the media processing on an uplink stream transmitted via the uplink from the streaming source 10. For example, the streaming sink 30 is the MEC and an application executed thereon. The streaming sink 30 corresponds to, for example, the application server 300 in FIG. 1.

The control point 40 in FIG. 2 is an entity that controls the uplink streaming session described above. The control point 40 generates a schedule for securing various resources in order to prepare in advance various resources expected to be used after an environment transfer. Furthermore, the control point 40 notifies the generated schedule to the streaming source 10, the network 20, and the streaming sink 30 in advance. As a result, the schedule is shared by the streaming source 10, the network 20, the streaming sink 30, and the control point 40.

The resource database 50 is a database that manages resource attributes of the streaming source 10, the network 20, and the streaming sink 30. The resource database 50 accepts registration of resource attributes by the streaming source 10, the network 20, and the streaming sink 30. In addition, the resource database 50 notifies the control point 40 of information regarding resource attributes in response to an inquiry from the control point 40.

Note that the control point 40 and the resource database 50 are installed in a cloud. Alternatively, the control point 40 and the resource database 50 may be installed in a central cloud in the central portion of the cloud.

Alternatively, at least one of the control point 40 and the resource database 50 may be an entity of the network 20. In this manner, the control point 40 and the resource database 50 can be installed in any point.

<2.2. Configuration Example of Network Architecture>

Figure 3:
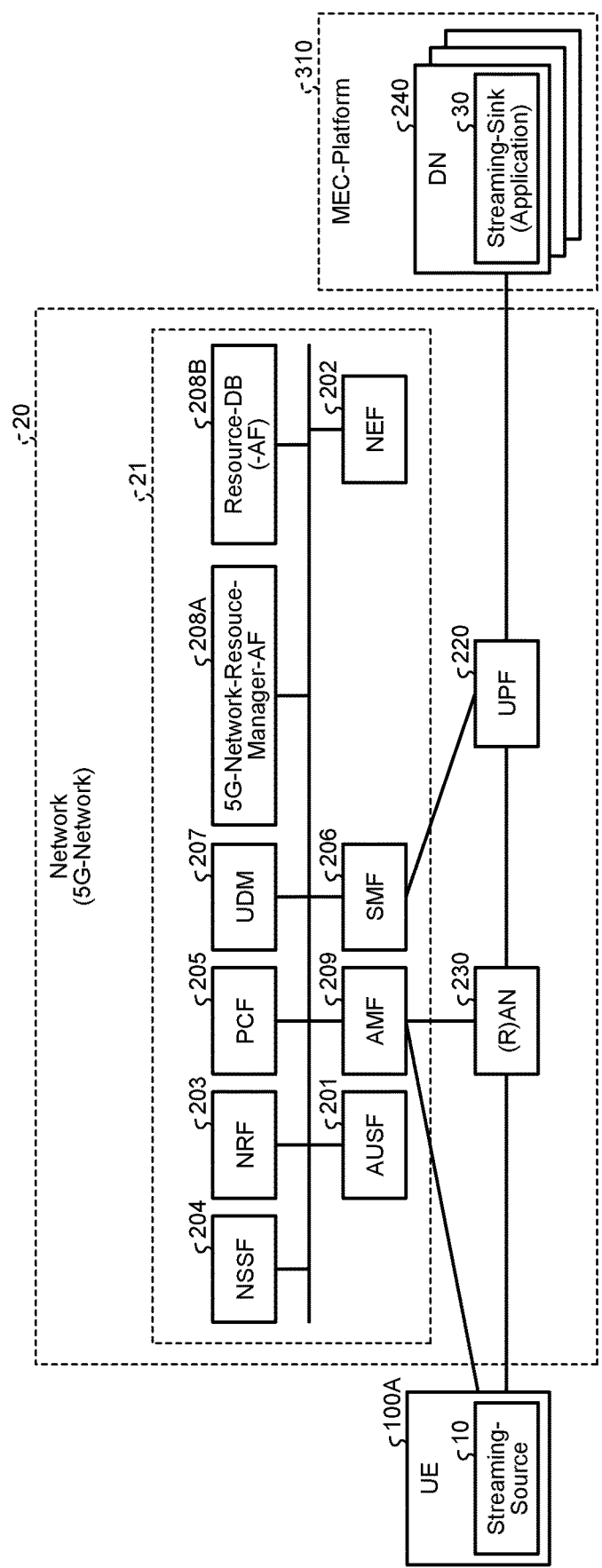
FIG. 3 is a diagram for describing an example of a network architecture according to the embodiment of the present disclosure.

As an example of a network architecture applied to an information processing system according to the embodiment of the present disclosure, details of an architecture of the fifth-generation mobile communication system (5G) are illustrated in a drawing. FIG. 3 is a diagram for describing an example of a network architecture according to the embodiment of the present disclosure.

The 5G architecture includes a user equipment (UE) 100A, the network 20, and a data network (DN) 240.

In the example of FIG. 3, the streaming source 10 corresponds to an application implemented in the UE 100A. An example of the UE 100A is a terminal device 100 of the present embodiment.

Furthermore, in the network 20 of FIG. 3, a network including entities excluding a radio access network (RAN) or an access network (AN) 230 (hereinafter, also referred to as (R)AN 230) is also referred to as a next generation core (NGC) or a 5G core (5GC) or a 5G core network. The 5GC or NGC is coupled with the UE 100A via the (R)AN 230.

The RAN 230 is a base station device that provides a wireless interface, and the AN 230 is, for example, an access point or a router that provides a wired interface. The (R)AN 230 includes a base station device called a gNB or an ng-eNB. An example of the (R)AN 230 is a base station device 200 of the present embodiment.

The 5GC/NGC includes control plane functions 21 and a user plane function (UPF) 220.

The control plane functions 21 include an authentication server function (AUSF) 201, a network exposure function (NEF) 202, a network repository function (NRF) 203, a network slice selection function (NSSF) 204, a policy control function (PCF) 205, a session management function (SMF) 206, a unified data management (UDM) 207, an application function (AF) 208, and an access management function (AMF) 209.

The UDM 207 has functions of generating 3GPP AKA authentication information and processing user IDs. The UDM 207 includes a unified data repository (UDR) that holds and manages subscriber information and a front end (FE) unit that processes the subscriber information.

In addition, the AMF 209 has functions such as registration process, access management, and mobility management of the UE 100A.

The SMF 206 has functions such as session management and IP assignment and management of the UE 100A. The AUSF 201 has an authentication function. The NSSF 204 has a function related to selection of a network slice. The NEF 202 has a function of providing a capability and an event of a network function to a third party, the AF 208, or an edge computing function.

The NRF 203 has a function of finding a network function and holding a profile of the network function. The PCF 205 has a function of policy control.

The AF 208 has a function of interacting with the core network to provide services. The AF 208 according to the present embodiment includes a 5G-Network-Resource-Manager-AF 208A and a Resource-DB-AF 208B. An example of the 5G-Network-Resource-Manager-AF 208A is the control point 40 of the present embodiment. Furthermore, an example of the resource-DB-AF 208B is the resource database 50 of the present embodiment. That is, in FIG. 3, an example in which the control point 40 and the resource database 50 are included in the network 20 is illustrated.

Note that, as described above, the control point 40 and the resource database 50 may be installed in the central cloud. In this case, the control point 40 and the resource database 50 are coupled to the 5GC or NGC via the NEF 202.

In addition, the user plane function (UPF) 220 has a function of the user plane processing. The DN 240 is, for example, an entity that provides access to services unique to an operator, an entity that provides the Internet connection, or an entity that provides access to services of a third-party such as a mobile network operator (MNO). The streaming sink 30 according to the present embodiment is an MEC platform and an MEC application executed thereon and is included in, for example, the DN 240.

The uplink streaming described above is transferred from the streaming source 10 on the UE 100A to the streaming sink 30 included in the DN 240 via the (R)AN 230 and the UPF 220. Note that the uplink streaming may be further transferred from the streaming sink 30 to another media processing application that is a part of an application. The uplink streaming is transferred to the streaming sink 30 and then taken over by, for example, a streaming distribution system for clients.

As described above, the 5G network architecture, particularly, the 5G+MEC architecture is assumed to be applied to the information processing system according to the present embodiment. In addition, although there are various upload interfaces between the UE 100A and the 5G+MEC, here, a framework of the Framework For Live Uplink Streaming (FLUS) discussed in the Third Generation Partnership Project (3GPP) will be described as an example.

Specifically, first, a FLUS-SOURCE implemented on the UE 100A is coupled with a FLUS-SINK on an MEC host. A FLUS-SOURCE is a streaming transmission module implemented on a client that transmits an uplink stream and is an example of the streaming source 10. A FLUS-SINK is a streaming reception module implemented on a server that receives uplink streaming from a FLUS-SOURCE and is an example of the streaming sink 30. The FLUS-SINK is executed as an MEC application.

In this case, a media processing function related to the uplink is executed as an MEC application as a subsequent stage of the FLUS-SINK. A server on which the MEC application is executed is also referred to as an MEC host. In order to accelerate the reduction in delay of streaming or application processing in the vicinity of the UE 100A, there is a possibility that various hardware accelerators such as a GPU board will be mounted in the MEC host.

On the other hand, when the UE 100A (FLUS-SOURCE) travels, inter-base station handover occurs. In this case, the MEC application that has been running in the MEC environment bound to a cell C1 before the transfer (handover) also simultaneously transfers to an MEC environment bound to a cell C1 after the transfer.

The reason why the MEC application travels (transfers) to the MEC environment (for example an MEC host) bound to the cell C1 after the transfer (handover) is to further utilize advantages of the MEC such as low latency and load balancing.

In a local 5G, inter-base station handover frequently occurs since the coverage of cells C1 is narrow. In a case where the MEC environment is bound for every cell C1 (or for every group of a plurality of cells C1), transfer of an MEC application also frequently occurs. Since loads, such as securing network and MEC application resources and a session establishment process, are generated for every transfer, processing loads due to the transfer increase, and the seamless quality of uplink sessions may be lost.

Therefore, in the present embodiment, an mechanism for seamlessly supporting uplink streaming when the UE 100A frequently travels across the boundary of the cell C1, particularly the boundary of the MEC environment, will be described. Such a mechanism can be implemented in capture devices of different vendors or models. It may also be applied to a 5G+MEC architecture (see FIG. 3) including standard interfaces or protocols that support uplink streaming in a network or cloud environment. This can ensure high-quality uplink streaming.

In particular, in the present embodiment, description will be given on a method for selecting/reserving a plurality of cameras for shooting that are controlled in cooperation with each other in accordance with a shooting schedule for following a shooting target, such as an automobile race relay illustrated in FIG. 1. Note that the plurality of cameras may be different types of cameras from different vendors.

In addition, in the present embodiment, description will be given on a method of reserving an execution schedule of an MEC application that performs the media processing of uplink streams, including the network resources with the streaming source 10.

Furthermore, in the present embodiment, description will be given on a method of activating a network resource in an executable state that has been reserved in advance in a cell C1 as the transfer destination when the UE 100A is handed over across cells C1.

3. REGISTRATION PROCESS OF RESOURCE ATTRIBUTES

As described above, the control point 40 selects and reserves a resource on the basis of resource information (hereinafter, also referred to as resource attributes) regarding a resource of each entity registered in the resource database 50 and generates a resource schedule.

The control point 40 binds the resource of each entity that has been reserved on the basis of the resource schedule and generates combination information (hereinafter, also referred to as binding information) regarding a combination of resources. The control point 40 notifies each entity of the binding information to share the information.

Therefore, first, here, resource attributes registered in the resource database 50 for each entity and the registration process of the resource attributes will be described.

<3.1. Registration Process by Streaming Source>

Figure 4:
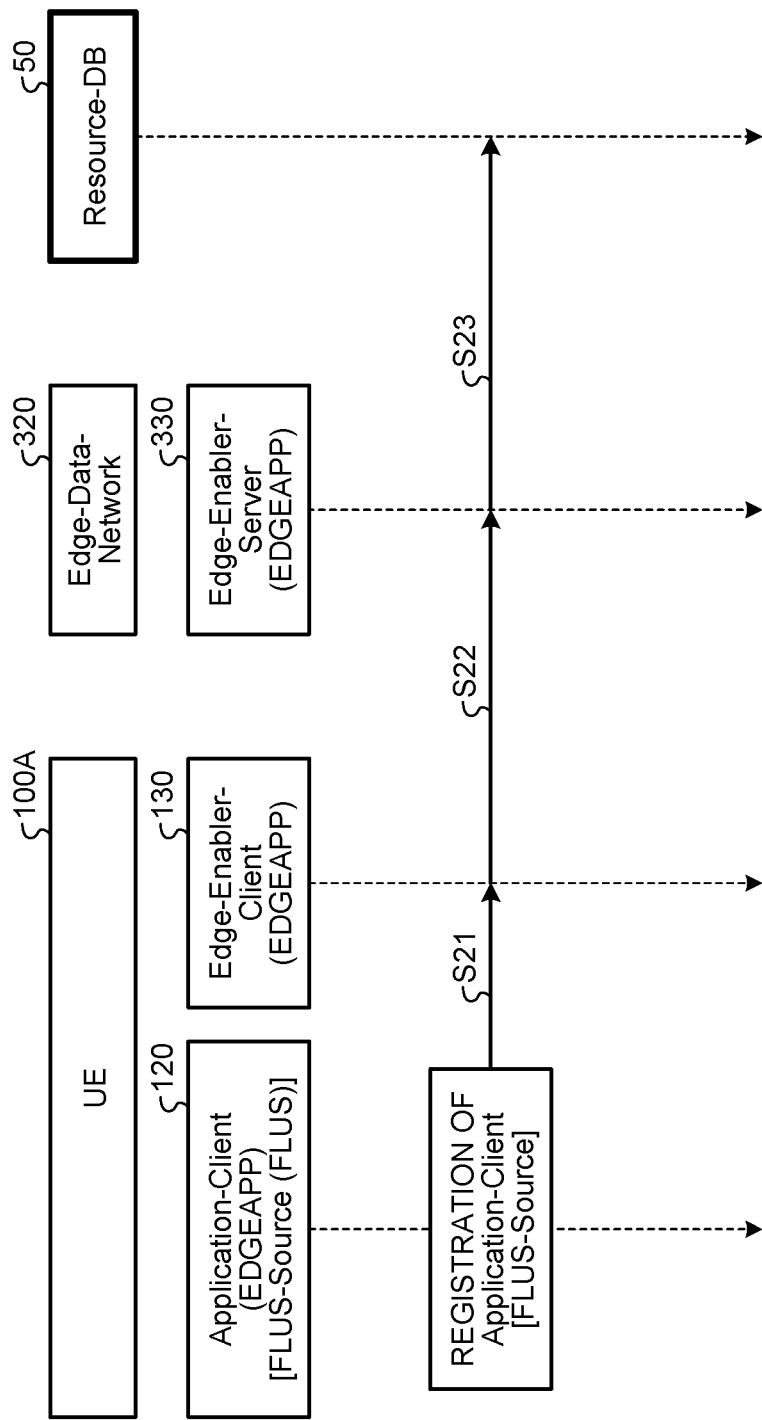
FIG. 4 is a sequence diagram for describing a flow of a registration process of resource attributes according to the embodiment of the present disclosure.

First, the registration process of resource attributes by the streaming source 10 according to the embodiment of the present disclosure will be described with reference to FIG. 4. FIG. 4 is a sequence diagram for describing a flow of a registration process of resource attributes according to the embodiment of the present disclosure.

In FIG. 4, a case where the FLUS-Source, which is the streaming source 10, is an Application-Client 120 of EDGE-APP. Note that EDGEAPP is defined in 3GPP TR 23.758: Study on application architecture for enabling Edge Applications; (Release 17).

As illustrated in FIG. 4, the UE 100A is mounted with the Application-Client 120 which is the streaming source 10 and an Edge-Enabler-Client 130. The Application-Client 120 is an application mounted on the UE 100A, and the Edge-Enabler-Client 130 is an entity that aggregates information of a plurality of applications.

The Application-Client 120 requests the Edge-Enabler-Client 130 to register the resource attribute of the Application-Client 120 (step S21). The Edge-Enabler-Client 130 requests an Edge-Enabler-Server 330 to register the resource attribute of the Application-Client 120 (step S22). The Edge-Enabler-Server 330 is an edge server in the EDGEAPP and is an entity included in an Edge-Data-Network 320.

Upon receiving the request from the Edge-Enabler-Client 130, the Edge-Enabler-Server 330 transfers the registration request of the resource attribute of the Application-Client 120 to the resource database 50 (step S23). As a result, the resource attribute of the Application-Client 120 is registered in the resource database 50.

Note that the case where the resource attribute of the Application-Client 120 is registered in the resource database 50 via the Edge-Enabler-Client 130 and the Edge-Enabler-Server 330 has been illustrated in FIG. 4; however, the present invention is not limited thereto.

The Application-Client 120 may directly request the resource database 50 to register the resource attribute. Alternatively, the Application-Client 120 may request the resource database 50 to register the resource attribute via one of the Edge-Enabler-Client 130 and the Edge-Enabler-Server 330.

Furthermore, here, the case where the Application-Client 120 requests the resource database 50 to register the resource attribute of the Application-Client 120 has been described; however, the present invention is not limited thereto. For example, the Edge-Enabler-Client 130 may register the resource attribute related to the Edge-Enabler-Client 130 in the resource database 50 in association with the resource attribute of the Application-Client 120.

Note that, in a case where the resource attribute is changed, the Application-Client 120 requests the resource database 50 to update the resource attribute in a similar manner to the registration of the resource attribute.

[Resource Attribute]

Next, the resource attribute of the streaming source 10 will be described. Here, an example of the resource attribute in a case where the streaming source 10 is the FLUS-Source will be described.

Streaming source 10 has the following resource attributes as an example. Note that a camera refers to, for example, an imaging device mounted on a terminal device 100 on which the streaming source 10 is mounted.

Photographable area attribute
Encoding capability attribute
Capturing capability attribute
Travelling capability attribute The photographable area attribute is information indicating a range within which the camera can travel and capture an image. Here, it is assumed that the photographable area attribute is bound to a radio access network attribute (expressed by coverage information of a cell C1 defined as one of the network attributes). The photographable area attribute can be, for example, information in which the coverage information of the cell C1 in which the camera is arranged is associated with information indicating which area of the cell C1 can be photographed. For example, the photographable area attribute can be expressed using existing standardized parameters such as OMA_Zonal_Presence_Data or OMAF-ViewPortData.

The encoding capability attribute is a parameter of a codec implemented in the camera. The encoding capability attribute can be expressed using, for example, an encoding parameter indicating a known bit rate such as Encoding-parameters or codec information.

The capturing capability attribute is information indicating the capability of the camera itself. Examples of the capturing capability attribute include information regarding the shutter speed of the camera. For example, the capturing capability attribute can be expressed using an existing standardized parameter such as MORE.CameraMetadata.

The travelling capability attribute is information regarding the travelling capability (azimuth range, travelling speed, etc.) or the pan or tilt speed or the like of the camera. The travelling capability attribute can be expressed using a known standardized parameter such as Direction (Vertical-Range, Horizontal-Range), Max-speed, Pan-tilt-range, or Pan-tilt-max-speed.

Furthermore, the resource attribute may include information indicating the availability time of the streaming source 10 (AvailabilityTime). Here, it is assumed that the availability time is a time represented on a wall-clock time axis shared by all entities (for example, by the global positioning system (GPS), the network time protocol (NTP), the precision time protocol (PTP), or the like).

Here, the resource attribute can be expressed as, for example, a property expressed in JavaScript (registered trademark) object notation (JSON) which is a data exchange format. For example, the travelling capability attribute of the streaming source 10 is represented as "Streaming-Source/Max-speed" in hierarchical representation.

Furthermore, in a case where encoding is performed as a JSON object, the travelling capability attribute can be expressed as the content (JSON object) of a file specified by a streaming source 10 uniform resource locator (URL), for example, a character string Streaming-Source-URL, such as:

{
'Max—speed':'60 km/s'
}
.

Figure 5:
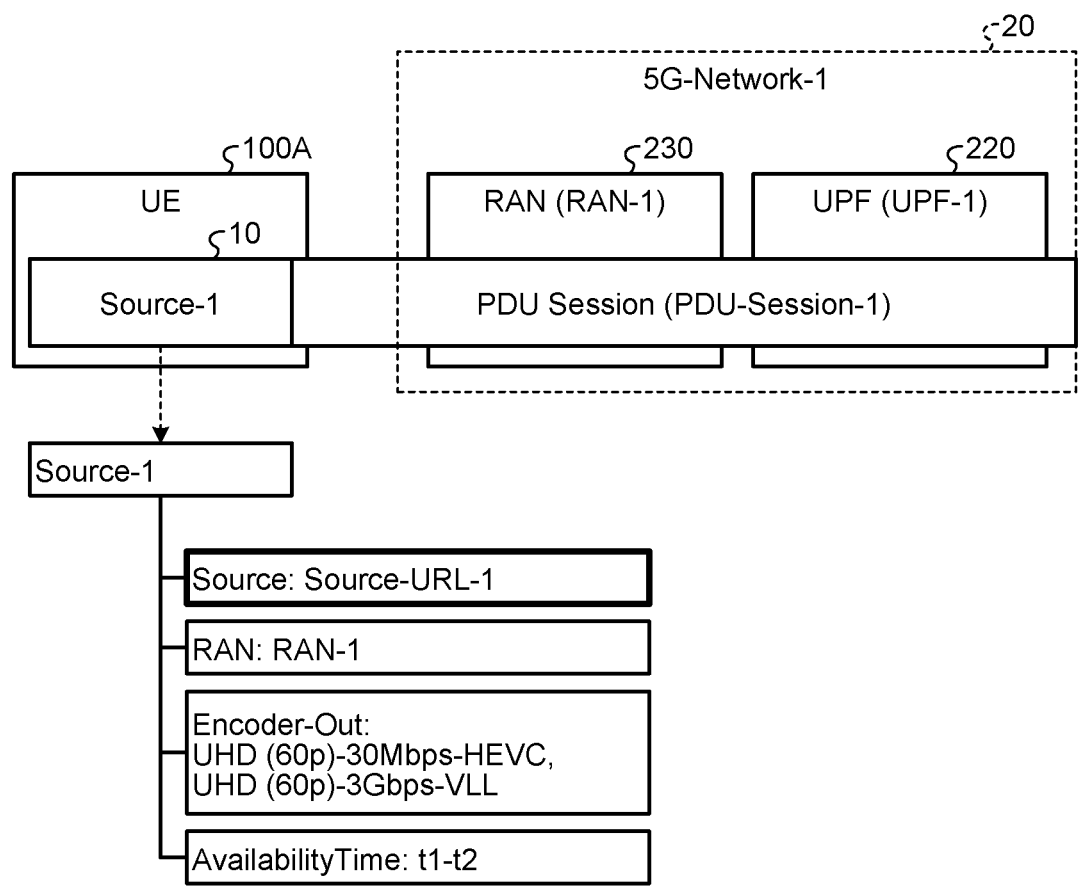
FIG. 5 is a diagram for describing resource attributes of a streaming source according to the embodiment of the present disclosure.

Next, details of the resource attributes will be described with reference to FIG. 5. FIG. 5 is a diagram for describing resource attributes of the streaming source 10 according to the embodiment of the present disclosure. As illustrated in FIG. 5, a PDU session is established between the UE 100A and the UPF 220 via the RAN 230. The streaming source 10 is an application on the UE 100A.

Note that Source-1 illustrated in FIG. 5 is an identifier for identifying the streaming source 10, RAN-1 is an identifier for identifying the RAN 230, and UPF-1 is an identifier for identifying the UPF 220. Furthermore, PDU-Session-1 is an identifier for identifying a PDU session.

The streaming source 10 illustrated in FIG. 5 has the following resource attributes as a specific example.

Source
RAN
Encoder-Out
AvailabilityTime

The streaming source 10 registers these resource attributes in the resource database 50 in association with the identifier "Source-1", for example.

Source is a URL that specifies the camera source (streaming source 10). In FIG. 5, Source of the streaming source 10 is "Source-URL-1".

RAN is coverage information of the RAN 230 expressing an area that can be photographed. In FIG. 5, RAN of the streaming source 10 is represented by "RAN-1" or OMA_Zonal_Presence_Data corresponding to the RAN-1.

Encoder-Out is parameter information of the camera encoder output. In FIG. 5, Encoder-Out includes "UHD (60p)-30 Mbps-HEVC" and "UHD (60p)-3 Gbps-VLL".

AvailabilityTime is information indicating the availability time of the camera (streaming source 10) having the above resource attributes. In FIG. 5, AvailabilityTime is "t1-t2".

Therefore, in FIG. 5, it is illustrated that the streaming source 10 identified by "Source-1" has address Source-URL-1 and can be photographed in the area (cell C1) covered by a RAN 230 identified by RAN-1. Note that the RAN 230 is defined by, for example, an access point and an area of the cell C1 covered by the access point.

Furthermore, in FIG. 5, it is also illustrated that the streaming source 10 identified by "Source-1" supports UHD (60p)-30 Mbps-HEVC or UHD (60p)-3 Gbps-visually loss less (VLL) as the Encoder output and is available from time t1 to time t2.

<3.2. Registration Process by Network>

Figure 6:
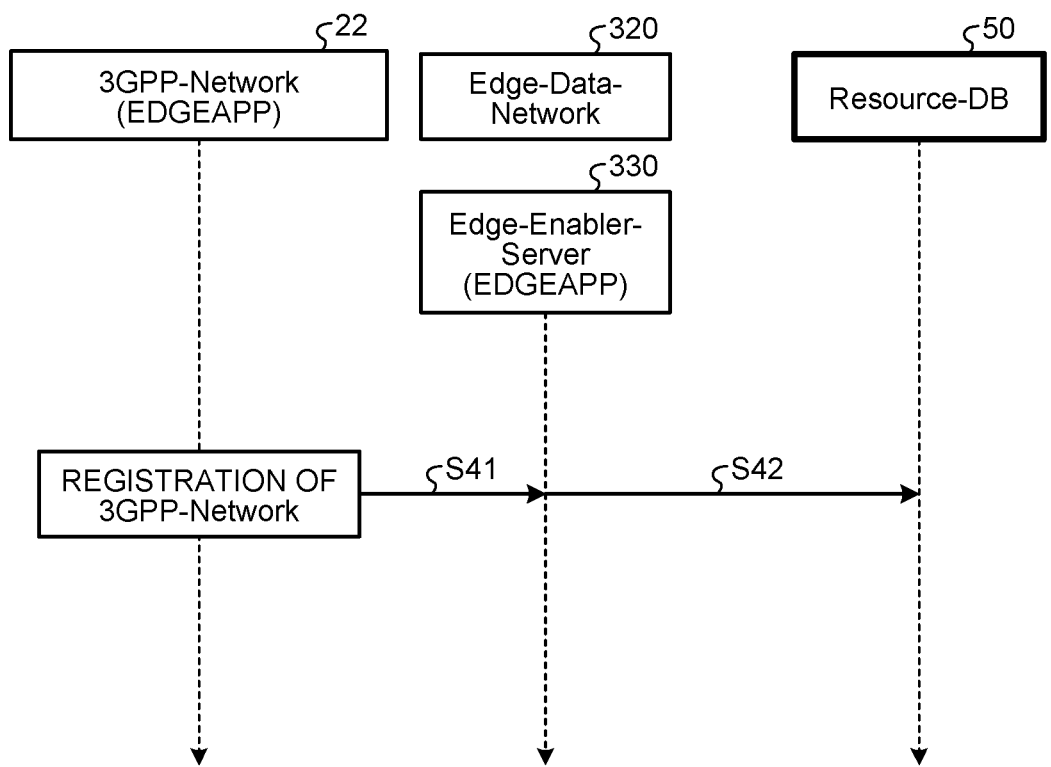
FIG. 6 is a sequence diagram for describing a flow of a registration process of resource attributes according to the embodiment of the present disclosure.

The registration process of the resource attribute by the network 20 according to the embodiment of the present disclosure will be described with reference to FIG. 6. FIG. 6 is a sequence diagram for describing a flow of a registration process of resource attributes according to the embodiment of the present disclosure.

In FIG. 6, a case where the 5G-Network which is the network 20 is the 3GPP-Network 22 of EDGEAPP is illustrated.

As illustrated in FIG. 6, the 3GPP-Network 22 requests the Edge-Enabler-Server 330 to register the resource attribute of the 3GPP-Network 22 (step S41).

When receiving the request from the 3GPP-Network 22, the Edge-Enabler-Server 330 transfers the registration request of the resource attribute of the 3GPP-Network 22 to the resource database 50 (step S42). As a result, the resource attribute of the 3GPP-Network 22 is registered in the resource database 50.

Note that the case where the 3GPP-Network 22 registers the resource attribute in the resource database 50 via the Edge-Enabler-Server 330 has been illustrated in FIG. 6; however, the present invention is not limited thereto. The 3GPP-Network 22 may directly request the resource database 50 to register the resource attribute.

Furthermore, here, the case where the 3GPP-Network 22 requests the resource database 50 to register the resource attribute of the 3GPP-Network 22 has been described; however, the present invention is not limited thereto. For example, the Edge-Enabler-Server 330 may register the resource attribute related to the Edge-Enabler-Server 330 in the resource database 50 in association with the resource attribute of the 3GPP-Network 22.

Note that, in a case where the resource attribute is changed, the 3GPP-Network 22 requests the resource database 50 to update the resource attribute in a similar manner to the registration of the resource attribute.

Furthermore, the 3GPP-Network 22 (network 20) includes a plurality of entities as described above (see FIG. 3). Therefore, an entity included in the 3GPP-Network 22 actually registers the resource attribute via an application programming interface (API) of the resource database 50.

For example, as illustrated in FIG. 3, it is assumed that the 3GPP-Network 22 (network 20) includes the 5G-Network-Resource-Manager-AF 208A. In this case, the 5G-Network-Resource-Manager-AF 208A registers the resource attribute in the resource database 50 (or the Resource-DB-AF 208B). Note that the 5G-Network-Resource-Manager-AF 208A accesses each NetworkFunction (NF) and collects resource attributes to be registered in the resource database 50.

[Resource Attribute]

Next, the resource attribute of the network 20 will be described. Here, an example of resource attributes in a case where the network 20 is a 5G-Network will be described.

The network 20 has, for example, a 5G access network attribute as a resource attribute.

The resource attribute may further include information indicating the availability time of the network 20 (AvailabilityTime). Here, it is assumed that the availability time is a time represented on a wall-clock time axis shared by all entities (for example, by the global positioning system (GPS), the network time protocol (NTP), the precision time protocol (PTP), or the like).

Figure 7:
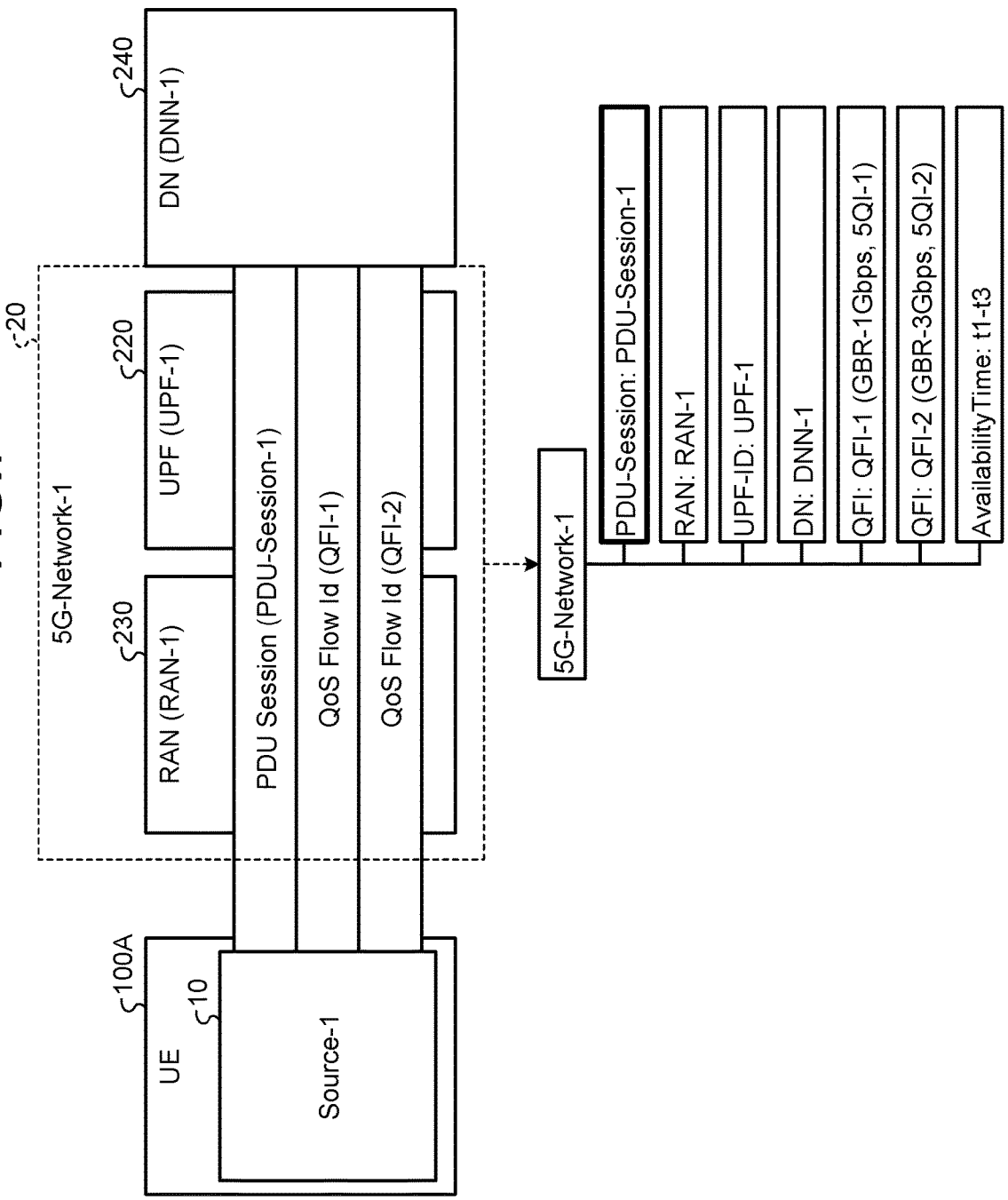
FIG. 7 is a diagram for describing resource attributes of a network according to the embodiment of the present disclosure.

Next, details of the resource attribute will be described with reference to FIG. 7. FIG. 7 is a diagram for describing the resource attribute of the network 20 according to the embodiment of the present disclosure. As illustrated in FIG. 7, a PDU session is established between the UE 100A and the DN 240 via the RAN 230 and the PDU 220.

The PDU session is established between the UE 100A and the DN 240 (and single network slice selection assistance information (S-NSSAI)) via the UPF 220 and transfers data of uplink streaming. The UPF 220 illustrated in FIG. 7 indicates a UPF bound to the RAN 230 and the DN 240. Note that the DN 240 corresponds to the local MEC Platform.

A quality of service (QoS) class (5G QoS identifier (5QI)) is defined for each of a plurality of data flows in a PDU session. Each data flow is identified by a QoS Flow Id. Note that a 5QI is an identifier for identifying the QoS in 5G.

Note that Source-1 illustrated in FIG. 7 is an identifier for identifying the streaming source 10, RAN-1 is an identifier for identifying the RAN 230, UPF-1 is an identifier for identifying the UPF 220, and DN-1 is an identifier for identifying the DN 240. Furthermore, PDU-Session-1 is an identifier for identifying a PDU session. QFI-1 and QFI-2 are identifiers for identifying a QoS Flow.

The network 20 illustrated in FIG. 7 has the following resource attributes as a specific example.

RAN
UPF
DN
PDU-Session
QoS Flow
    AvailabilityTime

Note that there may be a plurality of resource attributes in any of the resource attributes. For example, in the example of FIG. 7, since there are two QoS Flows, there are also two resource attributes for the QoS Flow.

The network 20 registers these resource attributes in the resource database 50 in association with an identifier "5G-Network-1", for example.

RAN is a resource attribute including an identifier for identifying the RAN 230 and includes, for example, information related to the RAN 230 that is specified by OMA_Zonal_Presence_Data. UPF is a resource attribute related to the UPF 220 and includes, for example, an N4 address of the UPF that specifies the UPF 220. The DN is a resource attribute related to the DN 240 and includes, for example, a data network name (DNN).

PDU-Session is a resource attribute related to a PDU session. PDU-Session includes, for example, PDU-Session-ID as an identifier for identifying the PDU session. QoS Flow includes a QoS flow ID (QFI) which is information related to the QoS Flow.

AvailabilityTime is information indicating availability time of the network 20 having the above resource attributes. In FIG. 7, AvailabilityTime is "t1-t3".

In the example of FIG. 7, the network 20 identified by "5G-Network-1" is generated on the RAN 230 identified by RAN-1. In addition, a PDU session identified by PDU-Session-1 is terminated at the UPF 220 identified by UPF-1 bound with the DN 240 identified by DNN-1. The PDU session identified by PDU-Session-1 includes two QoS Flows. A QoS Flow identified by QFI-1 has a guaranteed bit rate (GBR) of 1 Gbps and a 5QI value identified by 5QI-1. A QoS Flow identified by QFI-2 has a guaranteed bit rate (GBR) of 3 Gbps and a 5QI value identified by 5QI-2.

<3.3. Registration Process by Streaming Sink>

Figure 8:
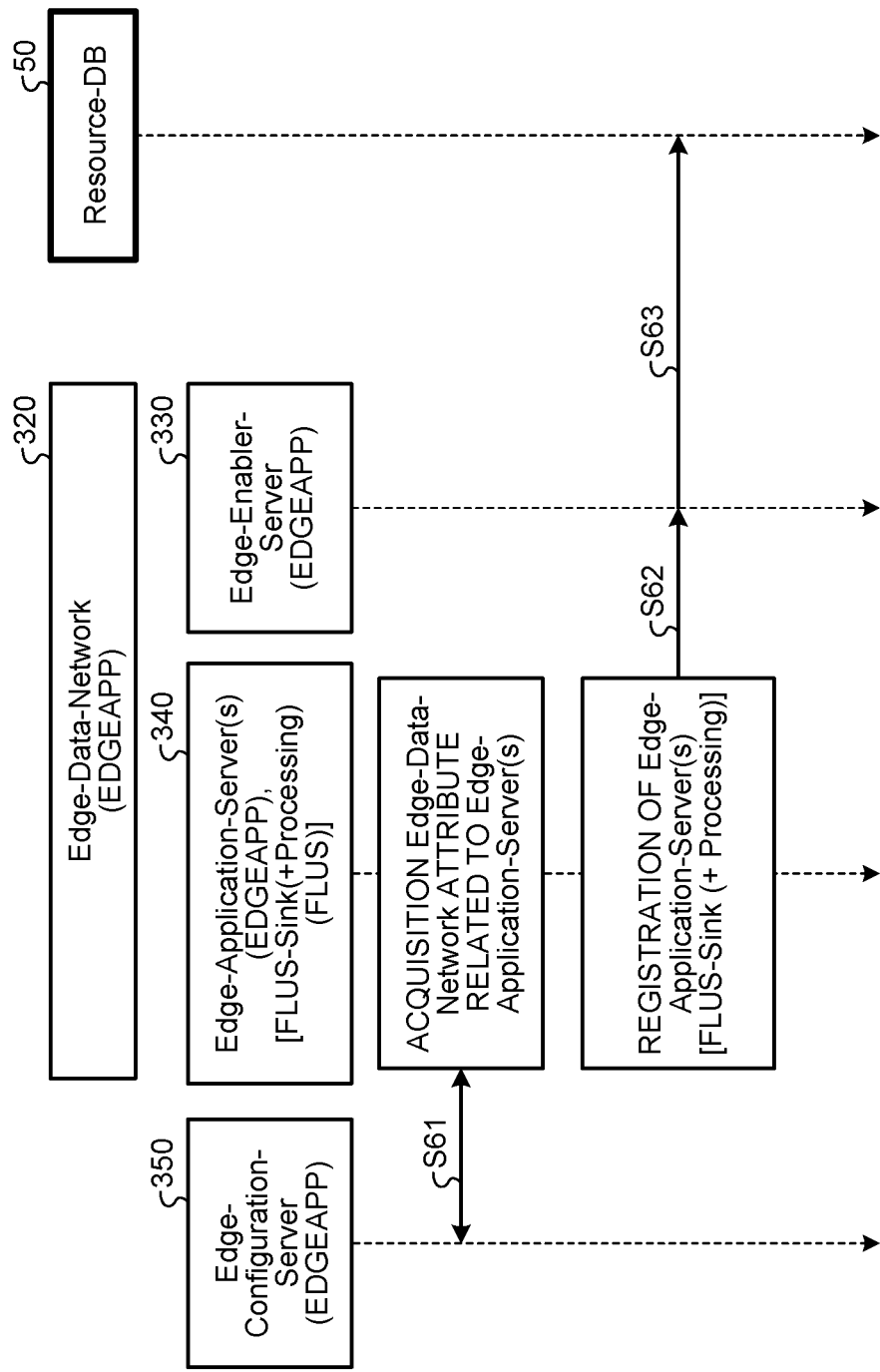
FIG. 8 is a sequence diagram for describing a flow of a registration process of resource attributes according to the embodiment of the present disclosure.

The registration process of resource attributes by the streaming sink 30 according to the embodiment of the present disclosure will be described with reference to FIG. 8. FIG. 8 is a sequence diagram for describing a flow of a registration process of resource attributes according to the embodiment of the present disclosure.

In FIG. 8, a case where FLUS-Sink (or FLUS-Sink and Processing) which is the streaming sink 30 is (an) Edge-Application-Server(s) 340 of EDGEAPP is illustrated.

As illustrated in FIG. 8, the Edge-Data-Network 320 includes the Edge-Application-Server(s) 340 and the Edge-Enabler-Server 330.

First, the Edge-Application-Server(s) 340 acquires the resource attribute of the Edge-Data-Network 320 in which the Edge-Application-Server(s) 340 operate(s) from the Edge-Configuration-Server 350 (step S61). Here, the resource attribute to be acquired may include, for example, information regarding a computing resource, storage, or hardware (HW) accelerator. The Edge-Application-Server(s) 340 associates the resource attribute that has been acquired with the Edge-Application-Server(s) 340's own resource attribute as an execution environment attribute of each application.

The Edge-Application-Server(s) 340 requests the Edge-Enabler-Server 330 to register the resource attributes of the Edge-Application-Server(s) 340 (step S62). The Edge-Enabler-Server 330 transfers a registration request of the resource attributes of the Edge-Application-Server(s) 340 to the resource database 50 (step S63). As a result, the resource attributes of the Edge-Application-Server(s) 340 is registered in the resource database 50.

Note that the case where the resource attributes of the Edge-Application-Server(s) 340 is registered in the resource database 50 via the Edge-Enabler-Server 330 has been illustrated in FIG. 8; however, the present invention is not limited thereto. For example, the Edge-Application-Server(s) 340 may request the resource database 50 to directly register the resource attribute.

Furthermore, here, the case where the Edge-Application-Server(s) 340 requests the resource database 50 to register the resource attributes of the Edge-Application-Server(s) 340 has been described; however, the present invention is not limited thereto. For example, the Edge-Enabler-Server 330 may register the resource attribute related to the Edge-Enabler-Server 330 in the resource database 50 in association with the resource attributes of the Edge-Application-Server(s) 340.

Note that, in a case where the resource attribute is changed, the Edge-Application-Server(s) 340 acquires the updated resource attribute from the Edge-Configuration-Server 350, in a similar manner to the acquisition or registration of the resource attribute and requests the resource database 50 to register the updated resource attribute.

[Resource Attribute]

Next, the resource attribute of the streaming sink 30 will be described. Here, an example of resource attributes in a case where the streaming sink 30 is a FLUS-Sink (or FLUS-Sink and Processing) will be described.

The streaming sink 30 has the following resource attributes as an example.

ADDRESS OR IDENTIFIER OF a media processing application

Resource attribute regarding media processing application itself

MEC Address

Allowable calculation resources, storage, or HW accelerator attribute of MEC

However, the resource attribute of the MEC can be defined as a part of the application attribute defined as a requirement of a media processing application.

Furthermore, the resource attribute may include information indicating the availability time of the streaming sink 30 (AvailabilityTime). Here, it is assumed that the availability time is a time represented on a wall-clock time axis shared by all entities (for example, by the global positioning system (GPS), the network time protocol (NTP), the precision time protocol (PTP), or the like).

Figure 9:
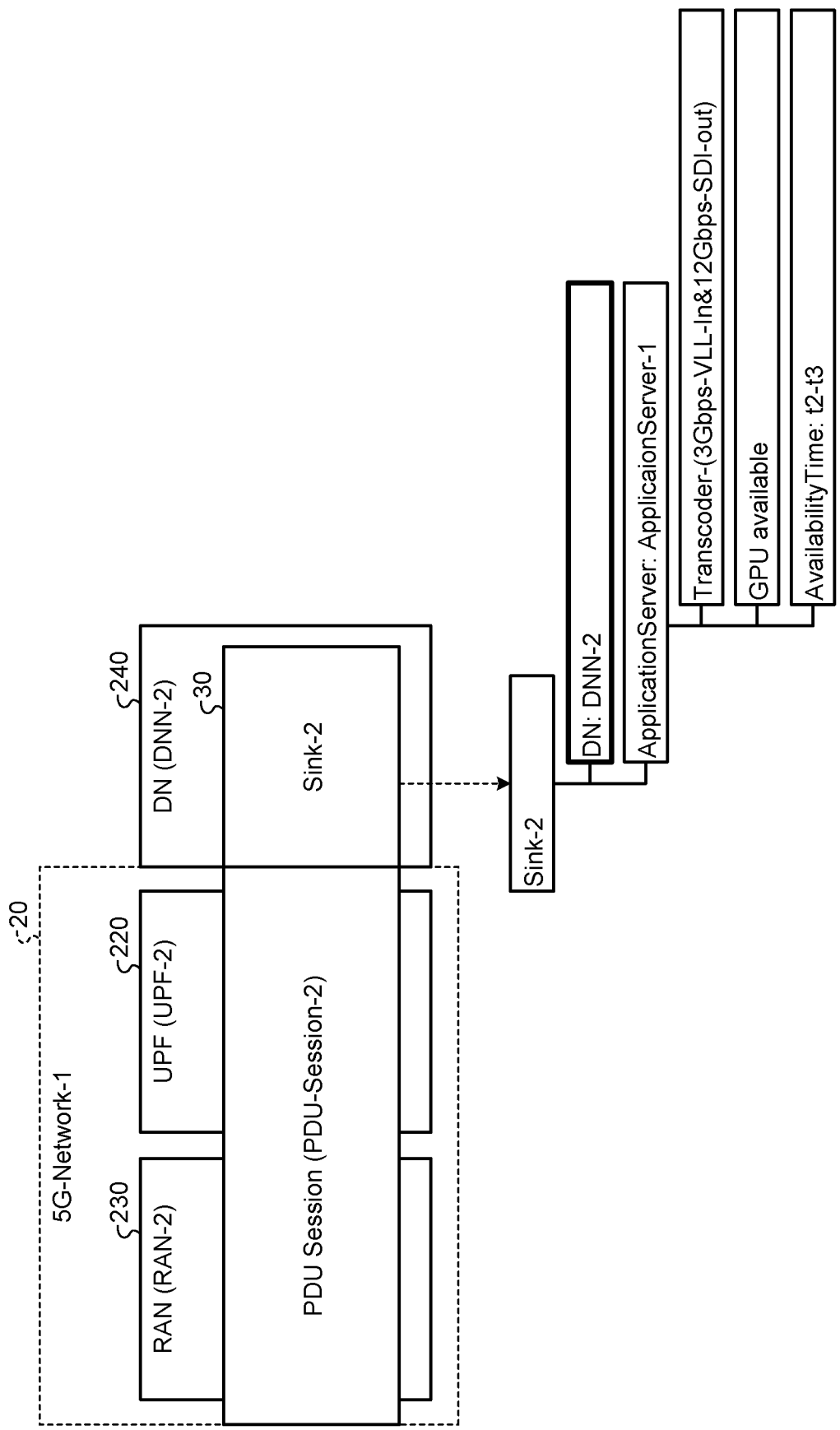
FIG. 9 is a diagram for describing resource attributes of a streaming sink according to the embodiment of the present disclosure.

Next, details of the resource attribute will be described with reference to FIG. 9. FIG. 9 is a diagram for describing resource attributes of the streaming sink 30 according to the embodiment of the present disclosure. As illustrated in FIG. 9, the network 20 identified by "5G-Network-1" is generated on the RAN 230 that is identified by RAN-2. In addition, the PDU session identified by PDU-Session-2 is terminated at the UPF 220 identified by UPF-2 bound with the DN 240 identified by DNN-2. Note that Sink-2 illustrated in FIG. 9 is an identifier for identifying the streaming sink 30.

The streaming sink 30 illustrated in FIG. 9 has the following resource attributes as a specific example.

DN

Application-Server

AvailabilityTime

Note that there may be a plurality of resource attributes in any of the resource attributes.

The streaming sink 30 registers these resource attributes in the resource database 50 in association with an identifier "Sink-2", for example.

The DN is a resource attribute related to the DN 240 and includes, for example, a data network name (DNN). Application-Server includes a media processing application attribute specified by Application-Server-ID or resource attributes of an allowable calculation resource, storage, or HW accelerator of related MEC.

AvailabilityTime is information indicating the availability time of the streaming sink 30 having the above resource attributes. In FIG. 9, AvailabilityTime is "t2-t3".

In the example of FIG. 9, the streaming sink 30 identified by "Sink-2" is the MEC and an application thereon. Furthermore, the streaming sink 30 identified by "Sink-2" is generated on the DN 240 identified by DNN-2. The streaming sink 30 identified by "Sink-2" has an Application-Server identified by Application-Server-1. Application-Server identified by Application-Server-1 is a Transcoder application including a FLUS-Sink function in a preceding stage and generates SDI-out of 12 Gbps from VLL input of 3 Gbps using a GPU accelerator.

4. SCHEDULING PROCESS

As described above, the control point 40 selects and reserves a resource on the basis of resource information (hereinafter, also referred to as resource attributes) regarding a resource of each entity registered in the resource database 50 and generates a resource schedule. Each entity executes a schedule generated by the control point 40. These processes are also collectively referred to as a scheduling process.

Figure 10:
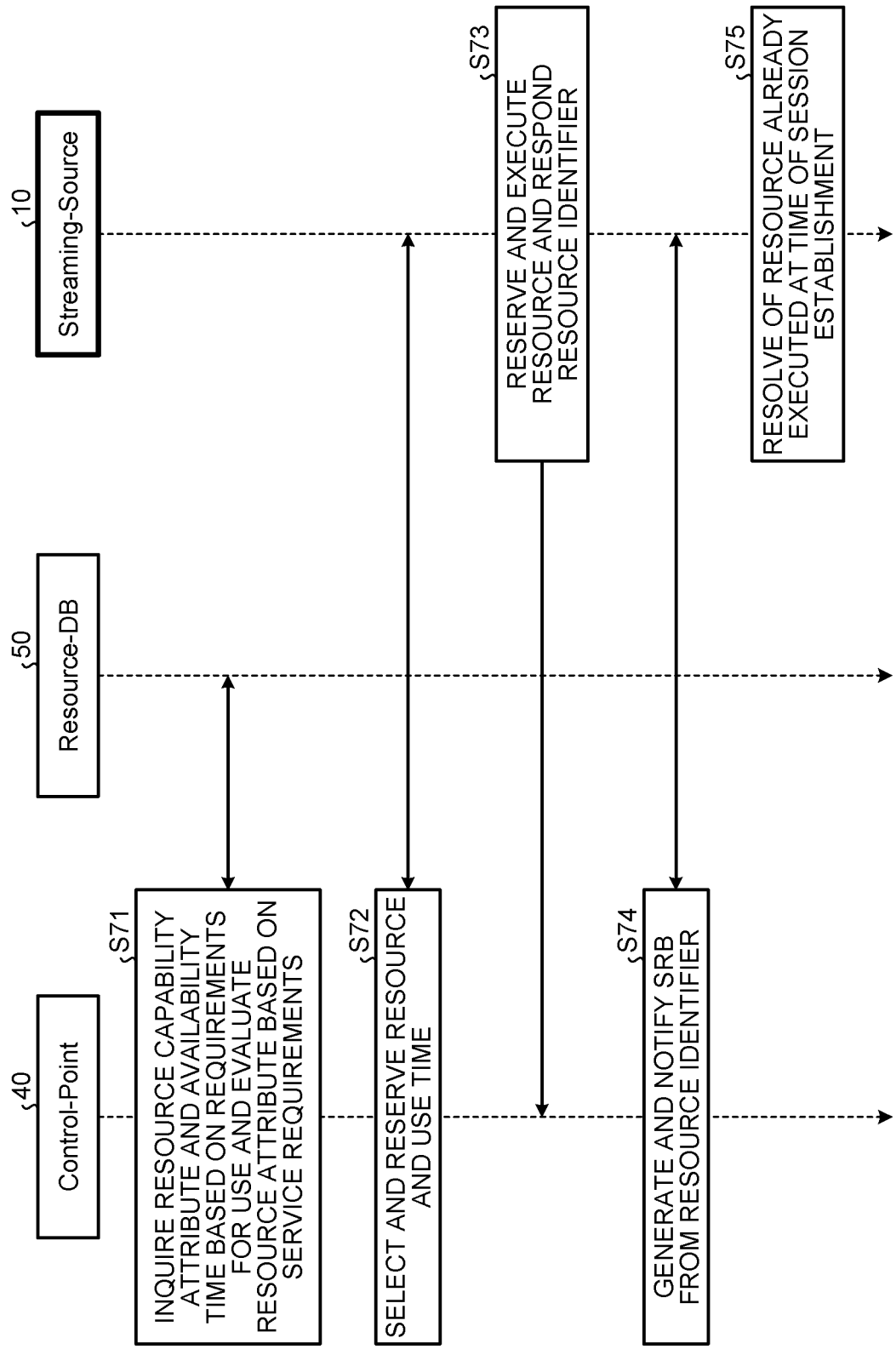
FIG. 10 is a sequence diagram for describing an outline of a scheduling process according to the embodiment of the present disclosure.

Next, the scheduling process executed in the information processing system will be described. First, an outline of the scheduling process will be described with reference to FIG. 10. FIG. 10 is a sequence diagram for describing the outline of the scheduling process according to the embodiment of the present disclosure. Note that, in FIG. 10, in order to simplify the description, a case where the control point 40 performs the scheduling process on the streaming source 10 will be described as an example; however, the control point 40 similarly executes a scheduling process on the network 20 and the streaming sink 30. Note that the control point 40 can be executed on a production system on the network 20 or a browser of a mobile device.

First, the control point 40 inquires the resource database 50 about the resource capability attribute and the availability time on the basis of requirements for use of the information processing system and evaluates the resource attributes that have been acquired on the basis of service requirements (step S71).

Here, the requirements for use of the information processing system are related to services provided by the information processing system and include, for example, a services scenario of recording by streaming and various conditions such as a requirement and a cost constraint. For example, in a case where the information processing system provides relay services of an automobile race as described above, the requirements for use include a situation of the automobile race (such as the position of a traveling automobile) and the like.

The control point 40 evaluates, for example, whether or not the resource attributes that have been acquired satisfy the service requirements (requirements for use).

Subsequently, the control point 40 selects an optimal resource and use time of the resource on the basis of the evaluation result and reserves the selected resource for the streaming source 10 for the selected use time (step S72).

The streaming source 10 reserves and executes the resource on the basis of an instruction from the control point 40 and returns a resource identifier for identifying the reserved and executed resource to the control point 40 (step S73). A resource identifier is information identifying an instance of a resource that has been executed or will be generated and executed in the future by the streaming source 10.

The control point 40 generates scheduled resource binding (SRB) from the resource identifier and notifies the SRB to the streaming source 10 (step S74). Here, the SRB is information obtained by combining resource information (for example, resource identifiers) related to resources. Note that details of the SRB will be described later.

The streaming source 10 activates a resource on the basis of the SRB and resolves a resource that has already been activated (executed) at the time of establishing the session (step S75). Specifically, the streaming source 10 resolves the resource that has already been executed or instantiated. Note that the SRB can be notified from the control point 40 to the streaming source 10 at the time of establishing the session, for example.

Note that the streaming source 10 may activate the resource for a period longer than the availability time of the resource. For example, the resource may be activated at timing earlier by a predetermined time than the start time of the availability time of the resource, and the resource may be deactivated at timing later by a predetermined time than the end time. In this manner, by activating the resource for a period longer than the availability time of the resource, the resource can be used more reliably during the availability time.

In addition, the control point 40 updates the schedule, for example, when a resource attribute registered in the resource database 50 is updated or every predetermined period.

As described above, the control point 40 executes, as the scheduling process, the inquiry process, selection process, and reservation process of the resource attributes, the SRB generation process, and the SRB notification process. In addition, the streaming source 10, the network 20, and the streaming sink 30 execute a session establishment process using the SRB in a case where the use of a resource is started.

Details of each process will be described below.

<4.1. Inquiry Process>

Figure 11:
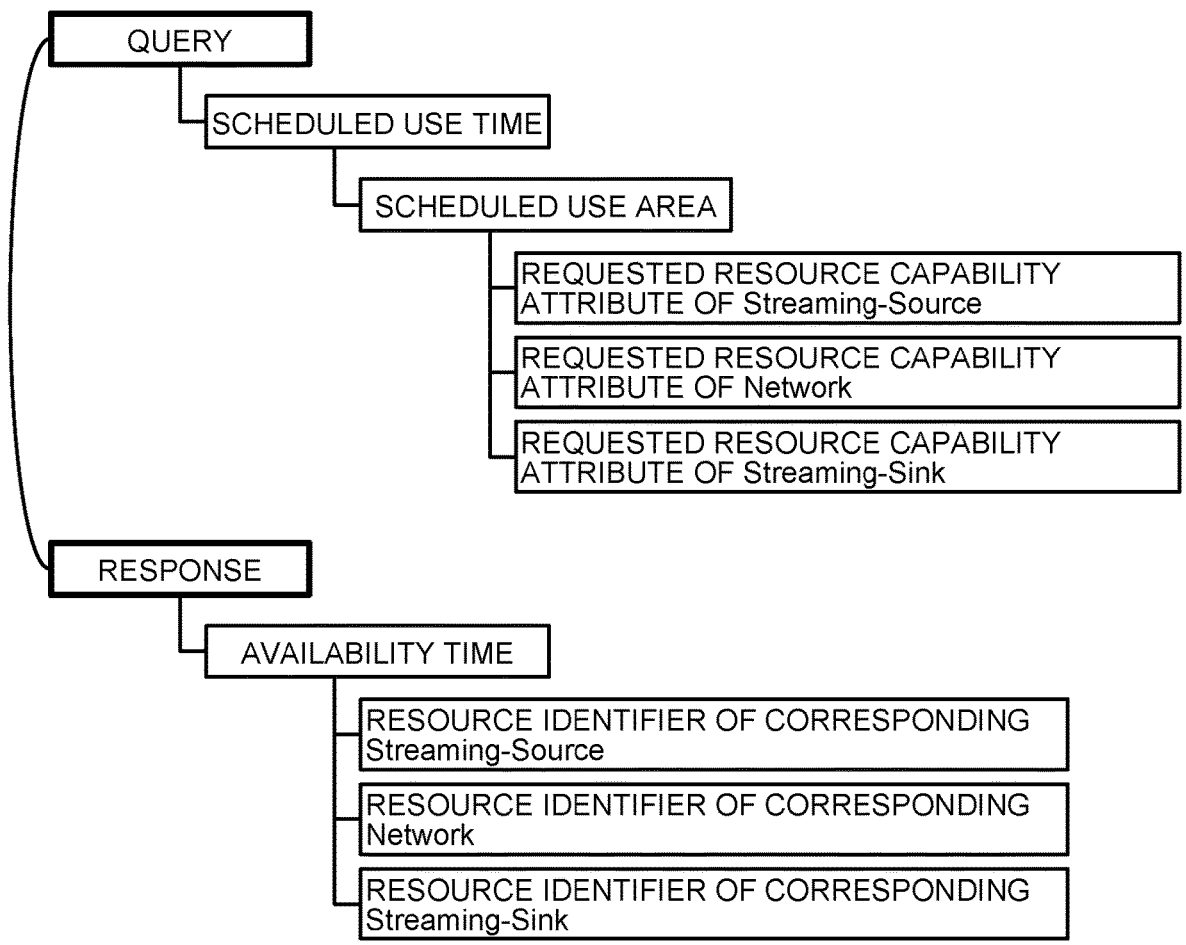
FIG. 11 is a diagram for describing an inquiry process of resource attributes according to the embodiment of the present disclosure.
Figure 12:
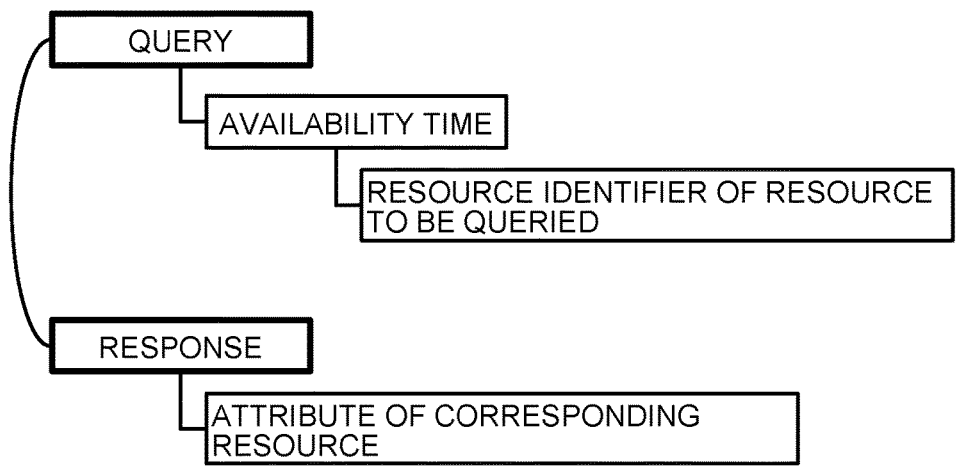
FIG. 12 is a diagram for describing an inquiry process of resource attributes according to the embodiment of the present disclosure.

First, an inquiry process of resource attributes by the control point 40 will be described. FIGS. 11 and 12 are diagrams for describing an inquiry process of resource attributes according to the embodiment of the present disclosure.

The control point 40 inquires the resource database 50 about the resource attribute and the availability time using a query illustrated in FIG. 11 on the basis of the requirements for use such as a recording scenario. When receiving the query from the control point 40, the resource database 50 returns a response illustrated in FIG. 11.

In the example of FIG. 11, the control point 40 inquires resource attributes using a query having a scheduled use time and scheduled use areas associated with the scheduled use time as the search attributes. The scheduled use area can be associated with, for example, search attributes such as a requested resource capability attribute of the streaming source 10, a requested resource capability attribute of the network 20, and a requested resource capability attribute of the streaming sink 30. Here, a requested resource capability attribute is information indicating the capability of the resource requested to each entity on the basis of requirements for use.

In response to this, the resource database 50 returns the availability time to the control point 40 as a response. The availability time is associated with a resource identifier of each of the streaming source 10, the network 20, and the streaming sink 30 that correspond to the query.

In this manner, the control point 40 acquires resource information regarding resources satisfying a predetermined requirement at the time and in the area in which the resources are desired to be used by inquiring the resource database 50 of the resource information.

Note that the control point 40 can inquire the resource database 50 of the details of the resource attributes associated with the resource identifiers acquired using the query of FIG. 11 using the query illustrated in FIG. 12.

In the example of FIG. 12, the control point 40 inquires the resource database 50 of the details of the resource attributes using a query having the availability time and the resource identifiers of the resources, which are to be inquired and associated with the availability time, as search attributes.

The resource database 50 returns the attributes of the resources corresponding to the resource identifiers as a response to the query.

These queries and responses can be exchanged between the control point 40 and the resource database 50 using, for example, a RESTful-API of the hypertext transfer protocol (HTTP).

<4.2. Selection Process>

Next, the resource selection process of the control point 40 will be described. Hereinafter, in order to facilitate the description, a resource selection process executed by the control point 40 in the information processing system illustrated in FIG. 13 will be described.

Figure 13:
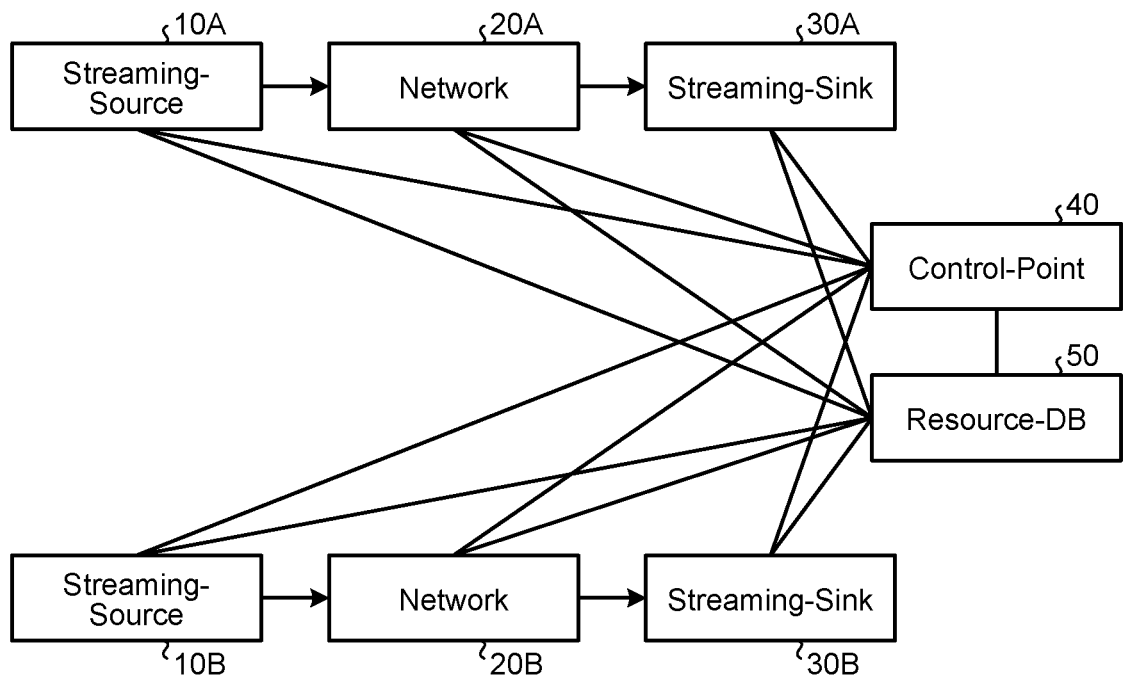
FIG. 13 is a diagram illustrating a configuration example of an information processing system according to the embodiment of the present disclosure.

FIG. 13 is a diagram illustrating a configuration example of the information processing system according to the embodiment of the present disclosure. As illustrated in FIG. 13, the information processing system includes two streaming sources 10, two networks 20, and two streaming sinks 30. The configuration other than the number of entities is the same as that of the information processing system illustrated in FIG. 2.

In the following description, it is assumed that a streaming source 10A first performs uplink streaming in which a subject (not illustrated) is recorded. Thereafter, it is assumed that the streaming source 10B performs uplink streaming as the subject travels.

Meanwhile, the streaming source 10A in FIG. 13 is identified by "Source-1", and a streaming source 10B is identified by "Source-2". In addition, a network 20A is identified by "5G-Network-1", and a network 20B is identified by "5G-Network-2". A streaming sink 30A is identified by "Sink-1", and a streaming sink 30B is identified by "Sink-2".

Figure 14:
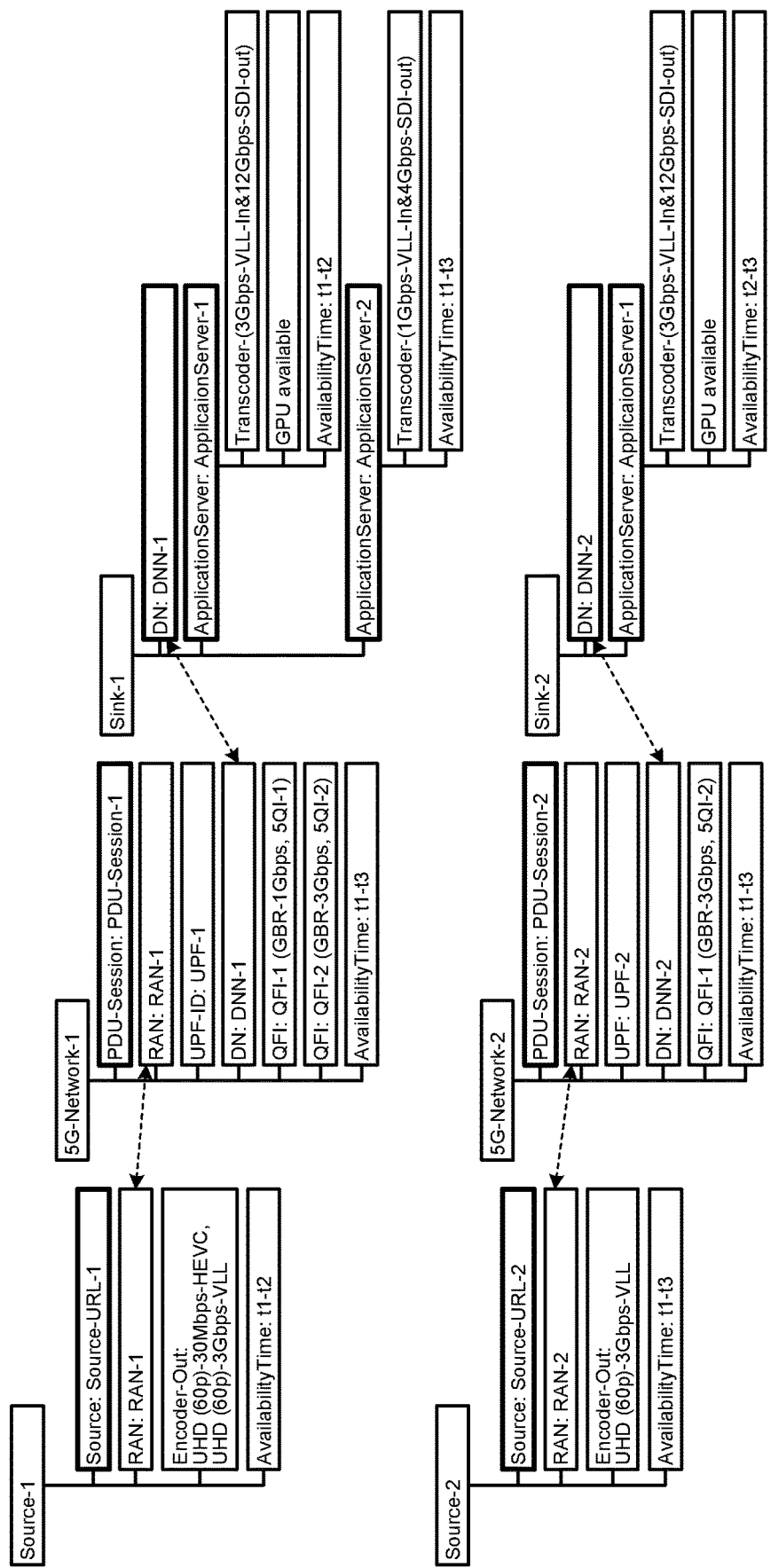
FIG. 14 is a diagram for describing resource attributes of each entity of the information processing system illustrated in FIG. 13.
Figure 15A:
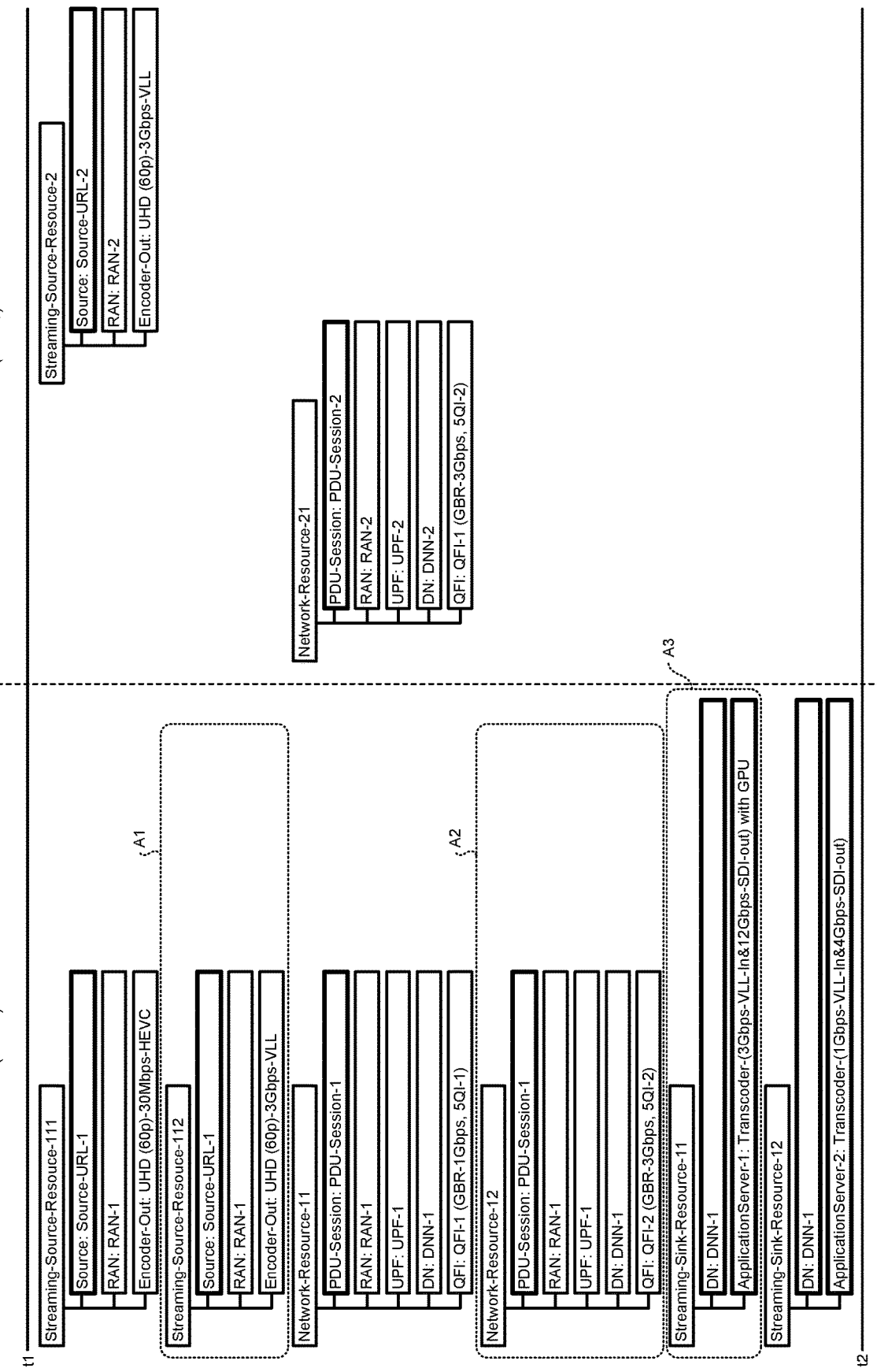
FIG. 15A is a diagram for describing resource attributes of each entity of the information processing system illustrated in FIG. 13.
Figure 15B:
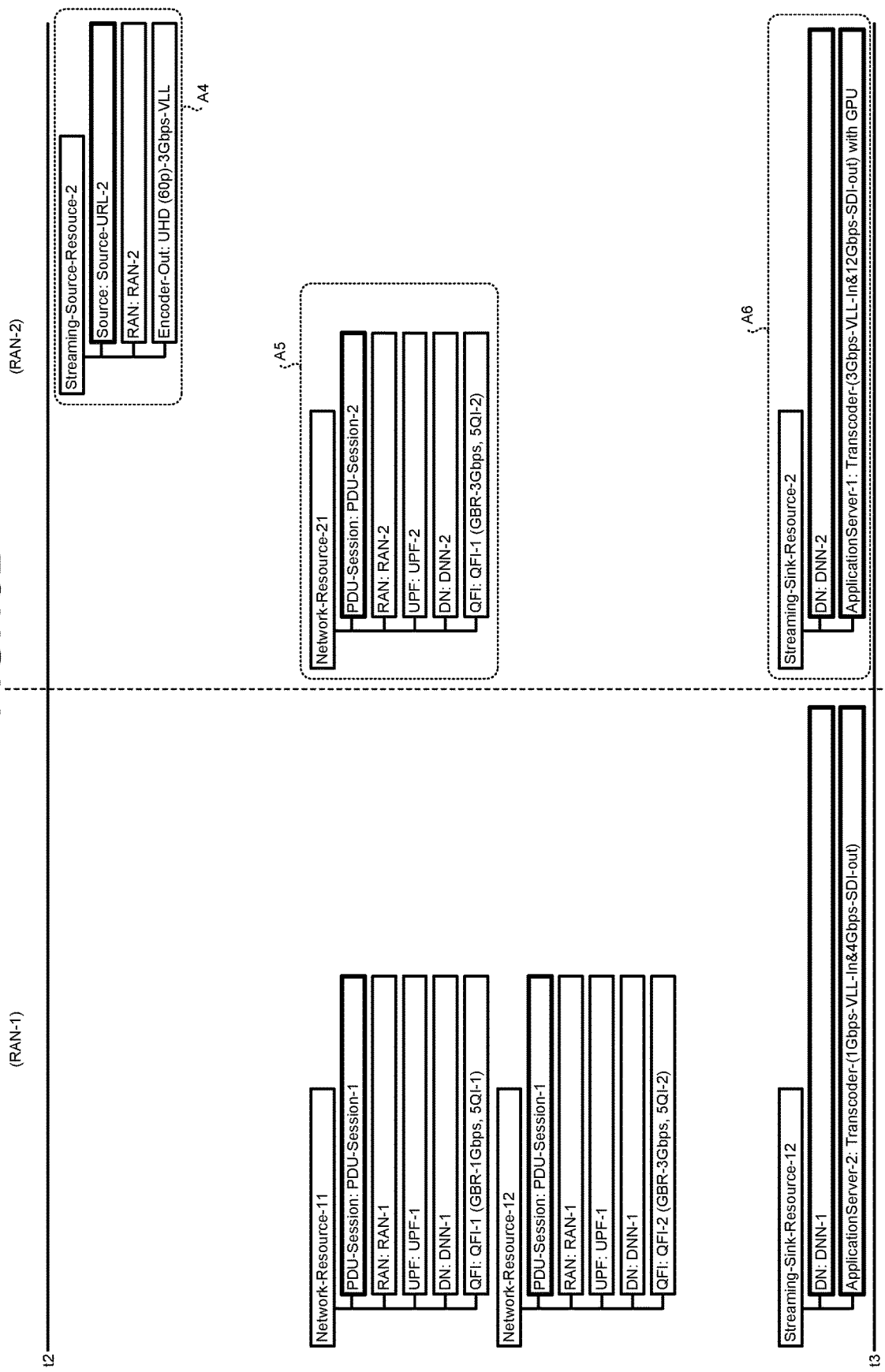
FIG. 15B is a diagram for describing resource attributes of each entity of the information processing system illustrated in FIG. 13.

FIGS. 14, 15A, and 15B are diagrams for describing resource attributes of each entity of the information processing system illustrated in FIG. 13. It is assumed that the resource attributes illustrated in FIGS. 14, 15A, and 15B are registered in the resource database 50 by the above registration process.

The resource attributes of FIG. 14 indicate that the streaming source 10A identified by Source-1 has address Source-URL-1. It is also indicated that the streaming source 10A identified by Source-1 can capture an image in an area (cell C1) covered by a RAN 230 identified by RAN-1 and supports UHD (60p)-30 Mbps-HEVC or UHD (60p)-3 Gbps-VLL as Encoder output. It is also illustrated that the streaming source 10A identified by Source-1 is available from time t1 to t2.

Furthermore, the resource attributes in FIG. 14 indicate that the streaming source 10B identified by Source-2 has address Source-URL-2. It is also illustrated that the streaming source 10B identified by Source-2 can capture an image in an area (cell C1) covered by a RAN 230 identified by RAN-2 and supports UHD (60p)-3 Gbps-VLL as Encoder output. It is also illustrated that the streaming source 10B identified by Source-2 is available from time t1 to time t3.

The network 20A identified by 5G-Network-1 of FIG. 14 is generated on the RAN 230 identified by RAN-1. A PDU session identified by PDU-Session-1 is terminated at a UPF 220 identified by UPF-1 bound with a DN 240 identified by DNN-1. A PDU session identified by PDU-Session-1 has two QoS Flows. A first QoS Flow is identified by QFI-1, has a guaranteed bit rate (GBR) of 1 Gbps, and has a 5QI value identified by 5QI-1. A second QoS Flow is identified by QFI-2, has a guaranteed bit rate (GBR) of 3 Gbps, and has a 5QI value identified by 5QI-2. The network 20A identified by 5G-Network-1 is available from time t1 to t3.

In addition, the network 20B identified by 5G-Network-2 in FIG. 14 is generated on the RAN 230 identified by RAN-2. A PDU session identified by PDU-Session-2 is terminated at a UPF 220 identified by UPF-2 bound with a DN 240 identified by DNN-2. A PDU session 2 identified by PDU-Session-2 has one QoS Flow. Such a QoS Flow has a guaranteed bit rate (GBR), which is identified by QFI-1, of 3 Gbps and a 5QI value identified by 5QI-2. In addition, the network 20B identified by 5G-Network-2 is available from time t1 to t3.

The streaming sink 30A identified by Sink-1 in FIG. 14 is the MEC and an application thereon and is generated on the DN 240 identified by DNN-1. The streaming sink 30A identified by Sink1 has an Application-Server identified by Application-Server-1.

The Application-Server identified by Application-Server-1 is a Transcoder application including a FLUS-Sink function in a preceding stage and can generate SDI-out of 12 Gbps from VLL input of 3 Gbps using a GPU accelerator. The streaming sink 30A identified by Sink-1 can use an Application-Server identified by Application-Server-1 from time t1 to t2.

The streaming sink 30A identified by Sink1 further has an Application-Server identified by Application-Server-2. The Application-Server identified by Application-Server-2 is a Transcoder application including a FLUS-Sink function in a preceding stage and can generate SDI-out of 4 Gbps from VLL input of 1 Gbps without using a GPU accelerator. The streaming sink 30A identified by Sink-1 can use an Application-Server identified by Application-Server-2 from time t1 to t3.

In addition, the streaming sink 30B identified by Sink-2 in FIG. 14 is the MEC and an application thereon and is generated on the DN 240 identified by DNN-2. The streaming sink 30B identified by Sink2 has an Application-Server identified by Application-Server-1.

The Application-Server identified by Application-Server-1 is a Transcoder application including a FLUS-Sink function in a preceding stage and can generate SDI-out of 12 Gbps from VLL input of 3 Gbps using a GPU accelerator. The streaming sink 30B identified by Sink-2 can use an Application-Server identified by Application-Server-1 from time t2 to t3.

As illustrated in FIG. 14, the RAN 230 to which the streaming source 10A identified by Source-1 is coupled and the RAN 230 in which the network 20A identified by 5G-Network-1 is generated are the same RAN 230 identified by RAN-1.

Furthermore, the RAN 230 to which the streaming source 10B identified by Source-2 is coupled and the RAN 230 in which the network 20B identified by 5G-Network-2 is generated are the same RAN 230 identified by RAN-2.

The DN 240 at the end of the PDU session identified by PDU-Session-1 and the DN 240 in which the streaming sink 30A identified by Sink-1 is generated are the same DN 240 identified by DNN-1.

The DN 240 at the end of the PDU session identified by PDU-Session-2 and the DN 240 in which the streaming sink 30B identified by Sink-2 is generated are the same DN 240 identified by DNN-2.

In FIGS. 15A and 15B, the sets of resource attributes illustrated in FIG. 14 are illustrated for each time slot and area. In FIG. 15A, sets of resource attributes from time t1 to time t2 are illustrated, and in FIG. 15B sets of resource attributes from time t2 to time t3 are illustrated. In addition, on the left sides of FIGS. 15A and 15B, sets of resource attributes of entities related to a cell C1 of the area RAN-1, that is, the RAN 230 identified by RAN-1 are illustrated. On the right sides of FIGS. 15A and 15B, sets of resource attributes of entities related to a cell C1 of the area RAN-2, that is, the RAN 230 identified by RAN-2 are illustrated.

In addition, in FIGS. 15A and 15B, a set of resource attributes including two or more resources in a resource attribute illustrated in FIG. 14 is set as separate sets of resource attributes, and identifiers different from that in FIG. 14 is assigned in order to distinguish each one of the sets of resource attributes.

For example, in FIG. 15A, as a set of resource attributes of the streaming source 10A associated with the area RAN-1 from time t1 to time t2, two resources of Streaming-Source-Resouce-111 and Streaming-Source-Resouce-112 are illustrated. These two sets of resource attributes are obtained by dividing the set of resource attributes of the streaming source 10A identified by Source-1 in FIG. 14 into two for each Encoder-Out. That is, the Encoder-Out of the Streaming-Source-Resouce-111 illustrated in FIG. 15A is the UHD (60p)-30 Mbps-HEVC, and the Encoder-Out of the Streaming-Source-Resouce-112 is the same as the resource attribute of the Source-1 in FIG. 14 except that the Encoder-Out is the UHD (60p) −3 Gbps-VLL.

Similarly, in FIGS. 15A and 15B, as a set of resource attributes of the network 20A related to the area RAN-1, two resources of Network-Resouce-11 and Network-Resouce-12 are illustrated. These two sets of resource attributes are obtained by dividing a set of resource attributes of the network 20A identified by 5G-Network-1 in FIG. 14 into two for each QoS Flow. That is, the QoS Flow of the Network-Resouce-11 illustrated in FIG. 15A is the QoS Flow identified by QFI-1, and a QoS Flow of Network-Resouce-12 is the same as the resource attribute of 5G-Network-1 of FIG. 14, except that the QoS Flow of Network-Resouce-12 is the QoS Flow identified by QFI-2.

In FIG. 15A, as a set of resource attributes of the streaming sink 30A associated with the area RAN-1 from time t1 to time t2, two resources of Streaming-Sink-Resouce-11 and Streaming-Sink-Resouce-12 are illustrated. These two sets of resource attributes are obtained by dividing the set of resource attributes of the streaming sink 30A identified by Sink-1 in FIG. 14 into two for each Application-Server. That is, an Application-Server of Streaming-Sink-Resouce-11 illustrated in FIG. 15A is Application-Server-1, and an Application-Server of Streaming-Sink-Resouce-12 is the same as the resource attribute of the Sink-1 in FIG. 14, except that the Application-Server is Application-Server-2. Note that, since an Application-Server identified by Application-Server-2 is available also from time t2 to time t3, Streaming-Sink-Resouce-12 is illustrated also in FIG. 15B.

Furthermore, in FIGS. 15A and 15B, Streaming-Source-Resouce-2 is illustrated as a set of resource attributes of the streaming source 10B associated with the area RAN-2. This corresponds to the set of resource attributes of the streaming source 10B identified by Source-2 of FIG. 14.

In FIGS. 15A and 15B, Network-Resouce-21 is illustrated as a set of resource attributes of the network 20B related to the area RAN-2. This corresponds to a set of resource attributes of the network 20B identified by 5G-Network-2 of FIG. 14.

In FIG. 15B, from time t2 to time t3, Streaming-Sink-Resouce-2 is illustrated as a set of resource attributes of the streaming sink 30B associated with the area RAN-2. This corresponds to the set of resource attributes of the streaming sink 30B identified by Sink-2 of FIG. 14.

The control point 40 selects a resource satisfying the service requirements from the resource attributes illustrated in FIGS. 14, 15A, and 15B. Hereinafter, description will be given on the assumption that the service requirements are that "a subject travels within the area RAN-1 between time t1 and time t2 and travels within the area RAN-2 between time t2 and time t3" and that "uplink of recording including live distribution is performed with a bandwidth guarantee at UHD (60p)-3 Gbps-VLL and that input to cloud production is performed by a 12 Gbps-SDI."

Figure 16:
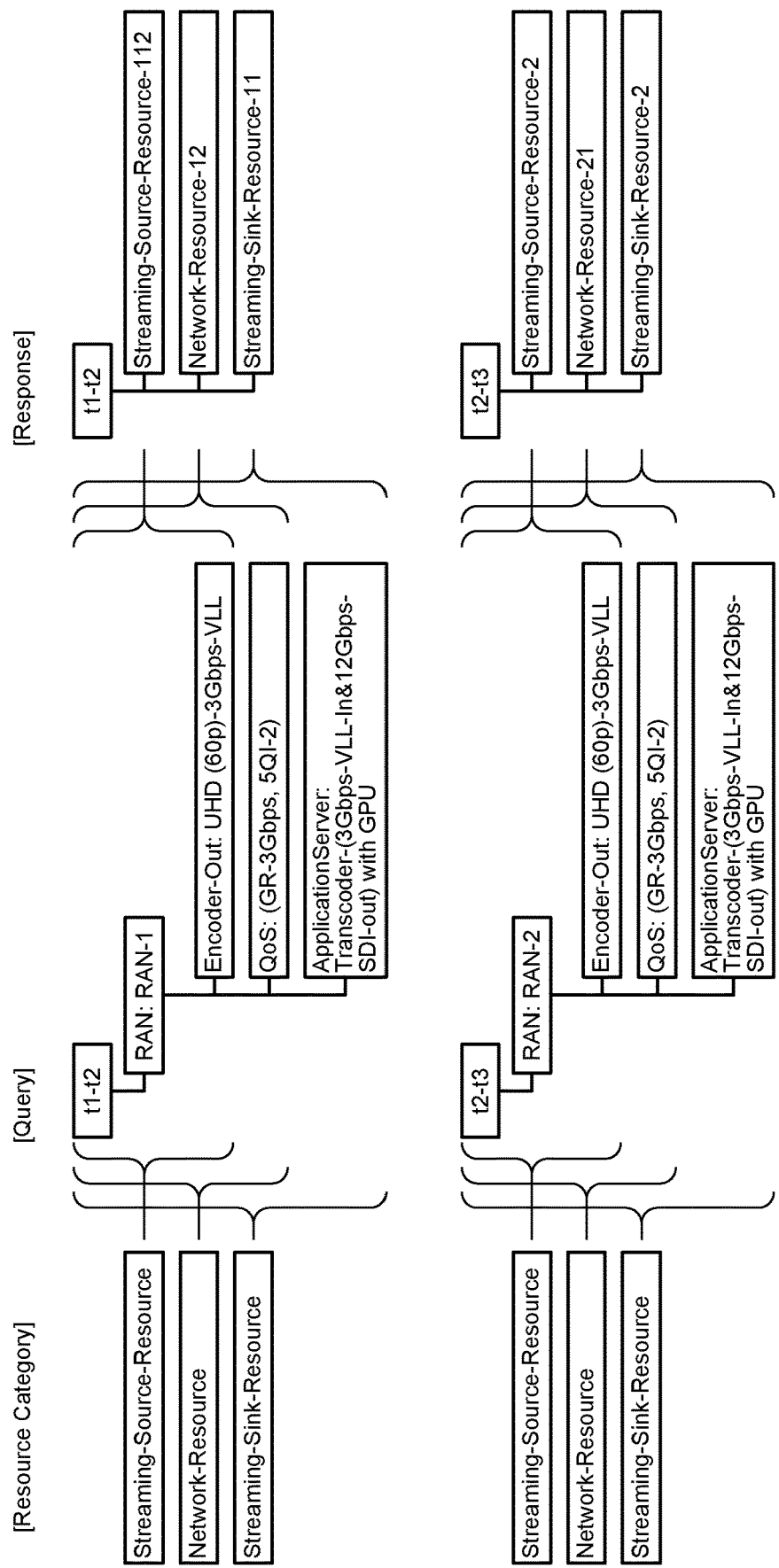
FIG. 16 is a diagram for describing an example of queries used by a control point according to the embodiment of the present disclosure.

In order to search for a resource attribute that satisfies the above service requirements, the control point 40 makes an inquiry to the resource database 50 using, for example, the query illustrated in FIG. 16. FIG. 16 is a diagram for describing an example of queries used by the control point 40 according to the embodiment of the present disclosure.

On the left side of FIG. 16, the category of resources that the control point 40 searches for in the resource database 50 is illustrated. The control point 40 searches for a resource of the streaming source 10 (Streaming-Source-Resource), a resource of the network 20 (Network-Resource), and a resource of the streaming sink 30 (Streaming-Sink-Resource) as resource categories.

Specifically, the control point 40 searches for a resource related to the area RAN-1 and having Encoder-Out of UHD (60p)-3 Gbps-VLL and GBR of 3 Gbps from time t1 to time t2 using a query illustrated in the center of FIG. 16. As for the resource category, this is a search related to the resources of the streaming source 10.

Furthermore, the control point 40 searches for a resource related to the area RAN-1 and performing a QoS Flow having a 5QI value of 5QI-2 from time t1 to time t2 using a query illustrated in the center of FIG. 16. As for the resource category, this is a search related to the resources of the network 20.

Similarly, in the control point 40, the Application-Server is a Transcoder application provided including a FLUS-Sink function in a preceding stage and searches for a resource that generates SDI-out of 12 Gbps from VLL input of 3 Gbps using a GPU accelerator. As for the resource category, this is a search related to the resources of the streaming sink 30.

In addition, the control point 40 similarly inquires of the resource database 50 about the resource attribute from time t2 to time t3. As illustrated in the center of FIG. 16, the query used for the inquiry from time t2 to time t3 is the same as the case where the availability time is from time t1 to time t2, except that the availability time is from time t2 to time t3 and the area is RAN-2.

The resource database 50 returns the resource attributes illustrated on the right side of FIG. 16 as a response to the query from the control point 40.

For example, in the example of FIG. 16, the resource database 50 returns Streaming-Source-Resouce-112 (see A1 of FIG. 15A) as the resource attribute of the streaming source 10 related to the area RAN-1 from time t1 to time t2. Furthermore, the resource database 50 returns Network-Resouce-12 (see A2 in FIG. 15A) as the resource attribute of the network 20. The resource database 50 returns Streaming-Sink-Resouce-11 (see A3 in FIG. 15A) as the resource attribute of the streaming sink 30.

Furthermore, the resource database 50 returns Streaming-Source-Resouce-2 (see A4 of FIG. 15B) as the resource attribute of the streaming source 10 related to the area RAN-2 from time t2 to time t3. Furthermore, the resource database 50 returns Network-Resouce-21 (see A5 in FIG. 15B) as the resource attribute of the network 20. The resource database 50 returns Streaming-Sink-Resouce-2 (see A6 in FIG. 15B) as the resource attribute of the streaming sink 30.

Figure 17:
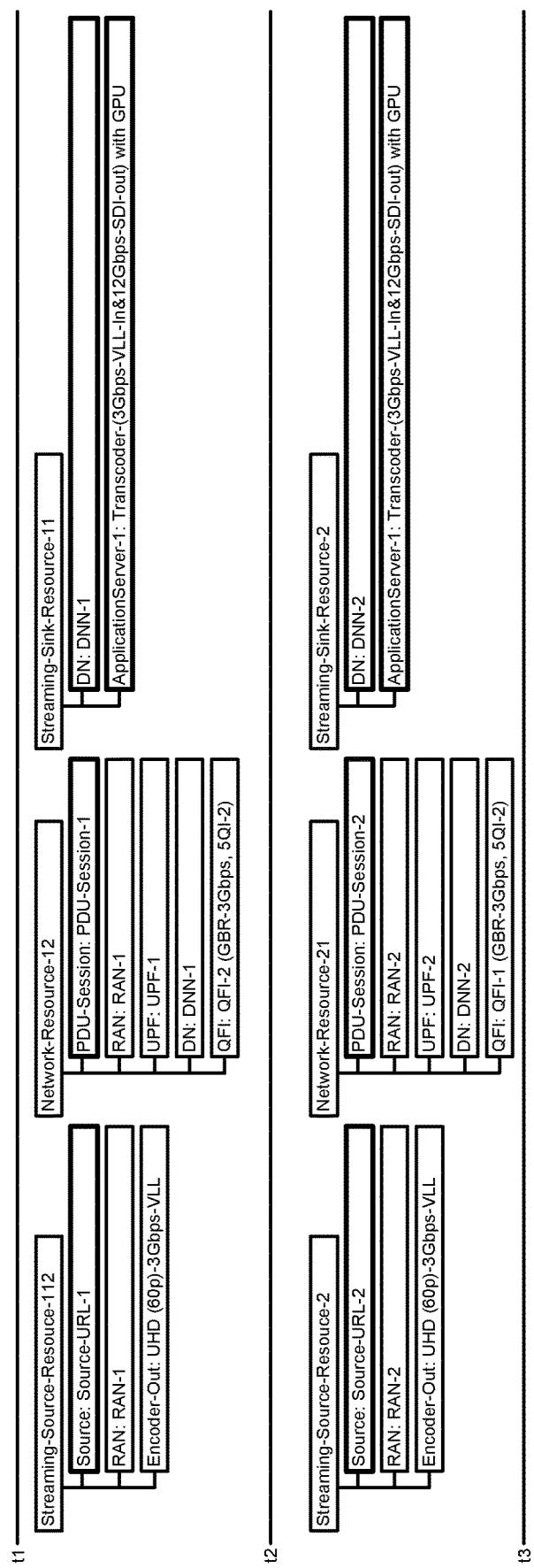
FIG. 17 is a diagram for describing an example of resource attributes according to the embodiment of the present disclosure.

FIG. 17 is a diagram for describing an example of resource attributes according to the embodiment of the present disclosure. In FIG. 17, resource attributes identified by resource identifiers included in the response of the resource database 50 are arranged in time series (see A1 to A3 in FIG. 15A and A4 to A6 in FIG. 15B).

The control point 40 executes a reservation process of each resource using a set of resource attributes illustrated in FIG. 17 as a candidate.

<4.3. Reservation Process>

When a resource is selected, the control point 40 executes a reservation process of the resource. The control point 40 requests each of the streaming source 10, the network 20, and the streaming sink 30 to reserve the resource that has been selected. The streaming source 10, the network 20, and the streaming sink 30 each return the availability of the requested resource reservation as a reservation response. As a result, the control point 40 confirms the resource reservation.

Figure 18:
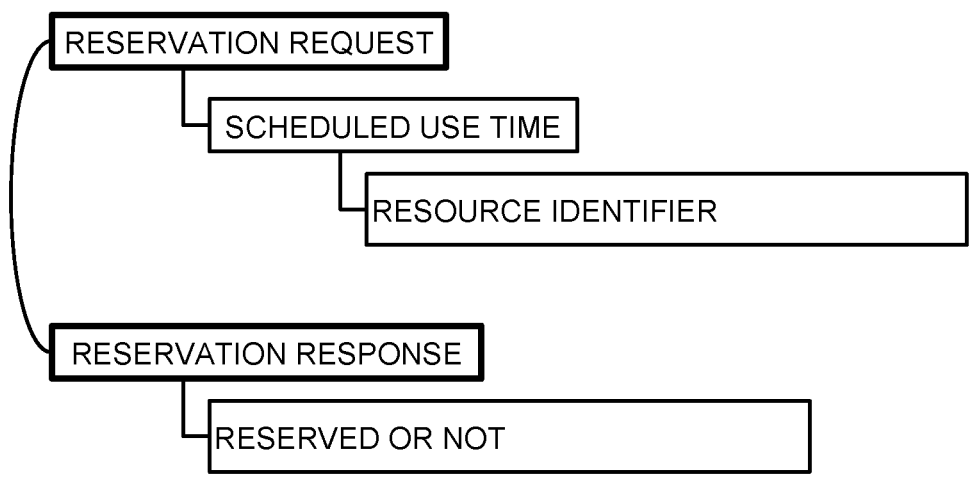
FIG. 18 is a diagram for describing an example of a reservation process by the control point according to the embodiment of the present disclosure.

FIG. 18 is a diagram for describing an example of a reservation process by the control point 40 according to the embodiment of the present disclosure. As illustrated in FIG. 18, the control point 40 transmits a reservation request including scheduled use time which is time for reserving a resource and a resource identifier for identifying the resource to be reserved to each of the streaming source 10, the network 20, and the streaming sink 30.

When the reservation request is received, the streaming source 10, the network 20, and the streaming sink 30 respond whether or not the resource can be reserved.

These requests and responses can be exchanged between the streaming source 10, the network 20, and the streaming sink 30 and the control point 40 using, for example, a RESTful-API of the HTTP.

Here, the streaming source 10, the network 20, and the streaming sink 30 inquire the resource database 50 of the details of resource attributes associated with a resource identifier and determines whether or not the resource can be reserved in accordance with the query result.

Note that a query by which the streaming source 10, the network 20, and the streaming sink 30 make an inquiry to the resource database 50 and a response from the resource database 50 are the same as those in FIG. 12, and thus description thereof is omitted.

These queries and responses can be exchanged between the streaming source 10, the network 20, and the streaming sink 30 and the resource database 50 using, for example, a RESTful-API of the HTTP.

Hereinafter, an example of the reservation process performed by the control point 40 for each of the streaming source 10, the network 20, and the streaming sink 30 will be described.

[Streaming Source]

Figure 19:
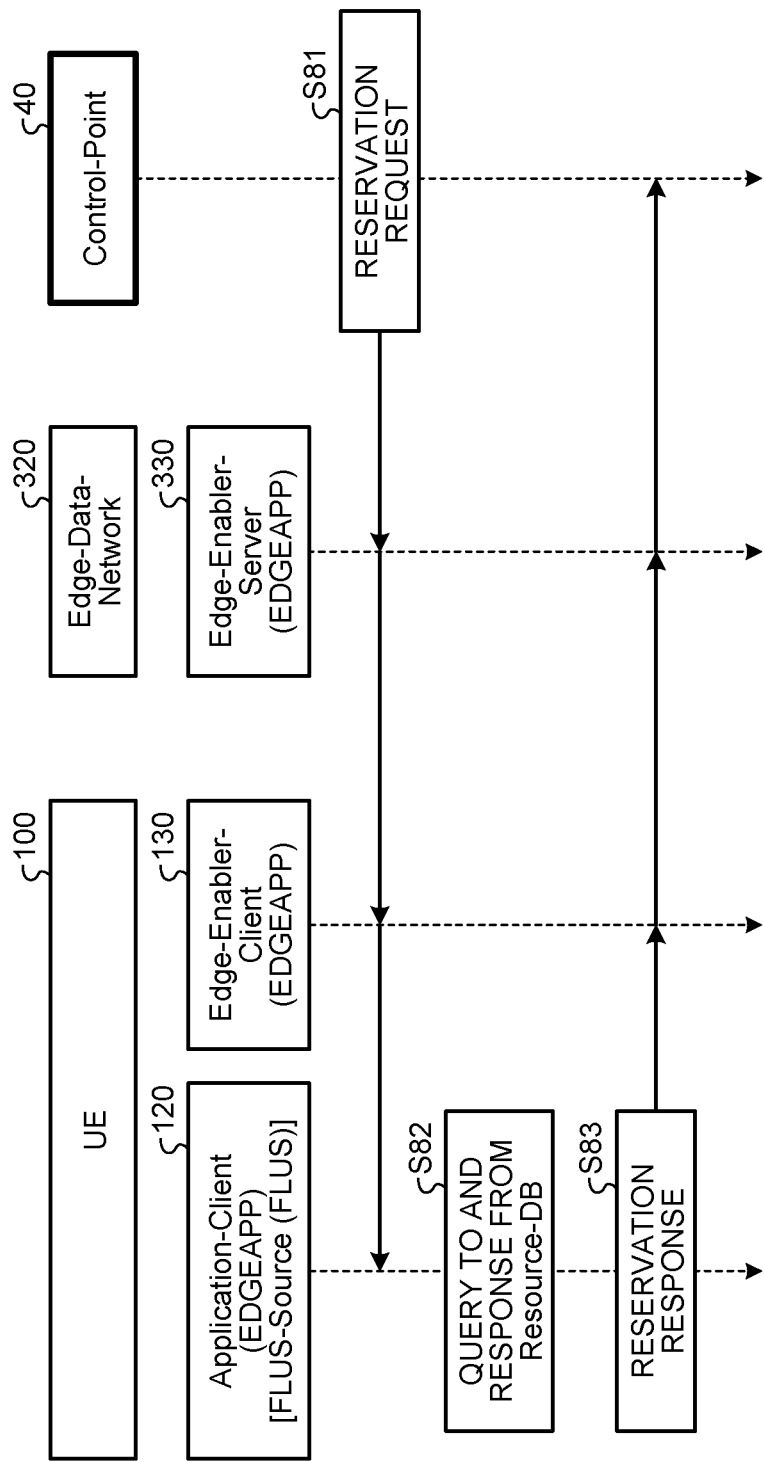
FIG. 19 is a sequence diagram illustrating an example of a flow of a reservation process by the control point according to the embodiment of the present disclosure.
Figure 20:
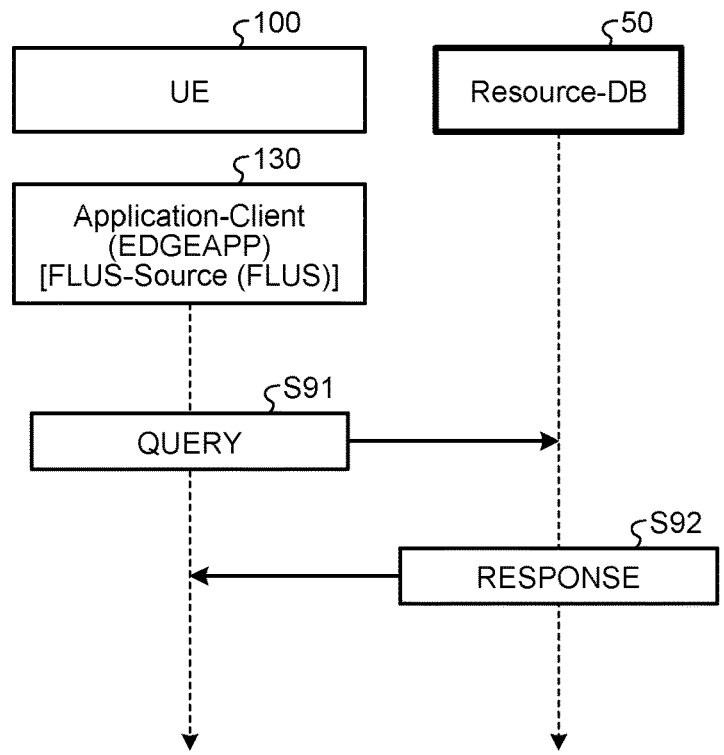
FIG. 20 is a sequence diagram illustrating an example of a flow of a resource inquiry by a streaming source according to the embodiment of the present disclosure.

First, the reservation process in which the control point 40 reserves a resource of the streaming source 10 will be described with reference to FIGS. 19 and 20. FIG. 19 is a sequence diagram illustrating an example of a flow of the reservation process by the control point 40 according to the embodiment of the present disclosure. FIG. 20 is a sequence diagram illustrating an example of a flow of a resource inquiry by the streaming source 10 according to the embodiment of the present disclosure.

Here, a case where FLUS-Source, which is the streaming source 10, is the Application-Client 120 of EDGEAPP will be described.

The Application-Client 120 is associated with the Edge-Enabler-Client 130. Therefore, as illustrated in FIG. 19, the control point 40 first transmits a reservation request to the Application-Client 120 via the Edge-Enabler-Server 330 and the Edge-Enabler-Client 130 (step S81).

The Application-Client 120 that has received the reservation request transmits a query to the resource database 50 and receives a response (step S82).

Here, the interaction between the Application-Client 120 and the resource database 50 will be described with reference to FIG. 20.

As illustrated in FIG. 20, the Application-Client 120 transmits a query for inquiring details of resource attributes to the resource database 50 (step S91). Note that, here, the resource attribute for which the Application-Client 120 inquires about details is related to the resource requested for reservation from the control point 40 in step S81 of FIG. 19.

In FIG. 20, the resource database 50 transmits a response to the Application-Client 120 (step S92).

Let us return to FIG. 19. Having received the response regarding the details of the resource attribute, the Application-Client 120 reserves the resource on the basis of the details of the resource attributes that have been received. The Application-Client 120 transmits the reservation result (whether the reservation can be made) as a reservation response to the control point 40 via the Edge-Enabler-Client 130 and the Edge-Enabler-Server 330 (step S83).

Note that, here, the streaming source 10 which is the Application-Client 120 interacts with the control point 40 via the Edge-Enabler-Client 130 and the Edge-Enabler-Server 330; however, the present invention is not limited thereto. The streaming source 10 may interact directly with the control point 40 or may interact via one of the Edge-Enabler-Client 130 and the Edge-Enabler-Server 330.

[Network]

Figure 21:
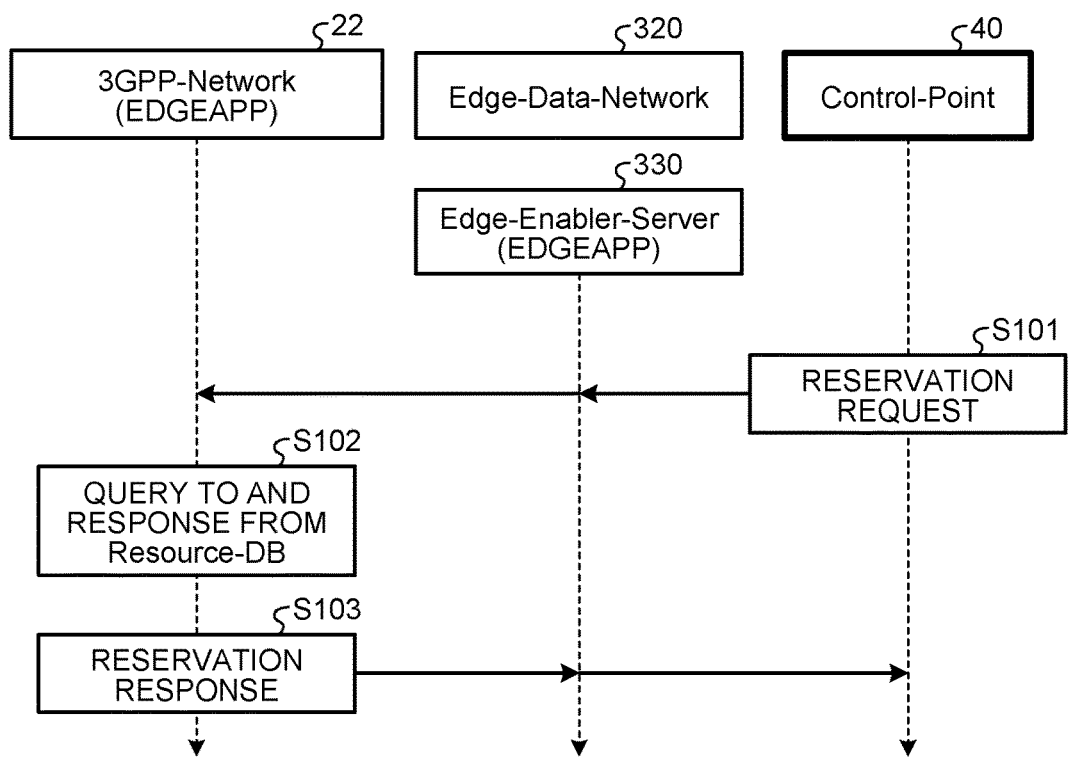
FIG. 21 is a sequence diagram illustrating an example of a flow of a reservation process by the control point according to the embodiment of the present disclosure.
Figure 22:
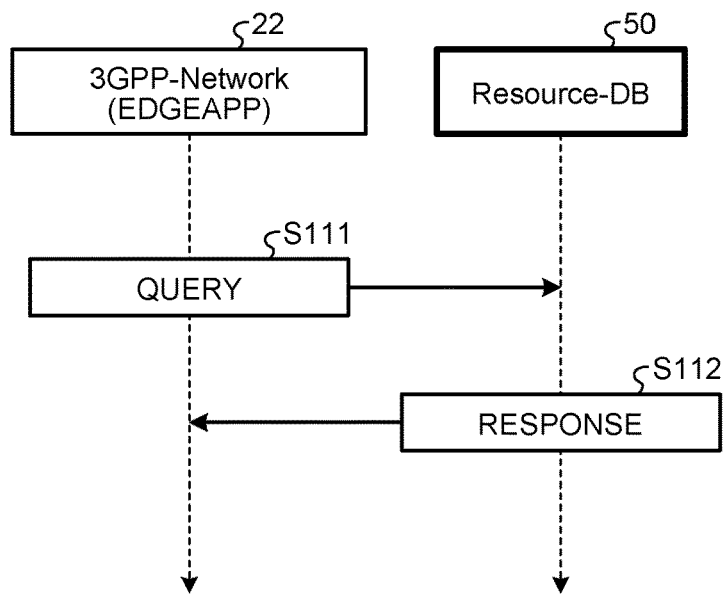
FIG. 22 is a sequence diagram illustrating an example of a flow of a resource inquiry by the network according to the embodiment of the present disclosure.

The reservation process in which the control point 40 reserves a resource of the network 20 will be described with reference to FIGS. 21 and 22. FIG. 21 is a sequence diagram illustrating an example of a flow of the reservation process by the control point 40 according to the embodiment of the present disclosure. FIG. 22 is a sequence diagram illustrating an example of a flow of a resource inquiry by the network 20 according to the embodiment of the present disclosure.

Here, a case where the 5G-Network which is the network 20 is the 3GPP-Network 22 of EDGEAPP will be described.

The 3GPP-Network 22 is associated with the Edge-Enabler-Server 330. Therefore, as illustrated in FIG. 21, the control point 40 first transmits a reservation request to the 3GPP-Network 22 via the Edge-Enabler-Server 330 (step S101).

The 3GPP-Network 22 that has received the reservation request transmits a query to the resource database 50 and receives a response (step S102).

Here, the interaction between the 3GPP-Network 22 and the resource database 50 will be described with reference to FIG. 22.

As illustrated in FIG. 22, the 3GPP-Network 22 transmits a query for inquiring details of resource attributes to the resource database 50 (step S111). Note that, here, the resource attribute for which the 3GPP-Network 22 inquires about details is related to the resource requested for reservation from the control point 40 in step S101 of FIG. 21.

In FIG. 22, the resource database 50 transmits a response to the 3GPP-Network 22 (step S112).

Let us return to FIG. 21. The 3GPP-Network 22 that has received the response regarding the details of the resource attribute reserves the resource on the basis of the details of the resource attributes that have been received. The 3GPP-Network 22 transmits a reservation result (whether or not a reservation can be made) as a reservation response to the control point 40 via the Edge-Enabler-Server 330 (step S103).

Note that, here, the network 20 which is the 3GPP-Network 22 interacts with the control point 40 via the Edge-Enabler-Server 330; however, the present invention is not limited thereto. The streaming source 10 may interact directly with the control point 40.

[Streaming Sink]

Figure 23:
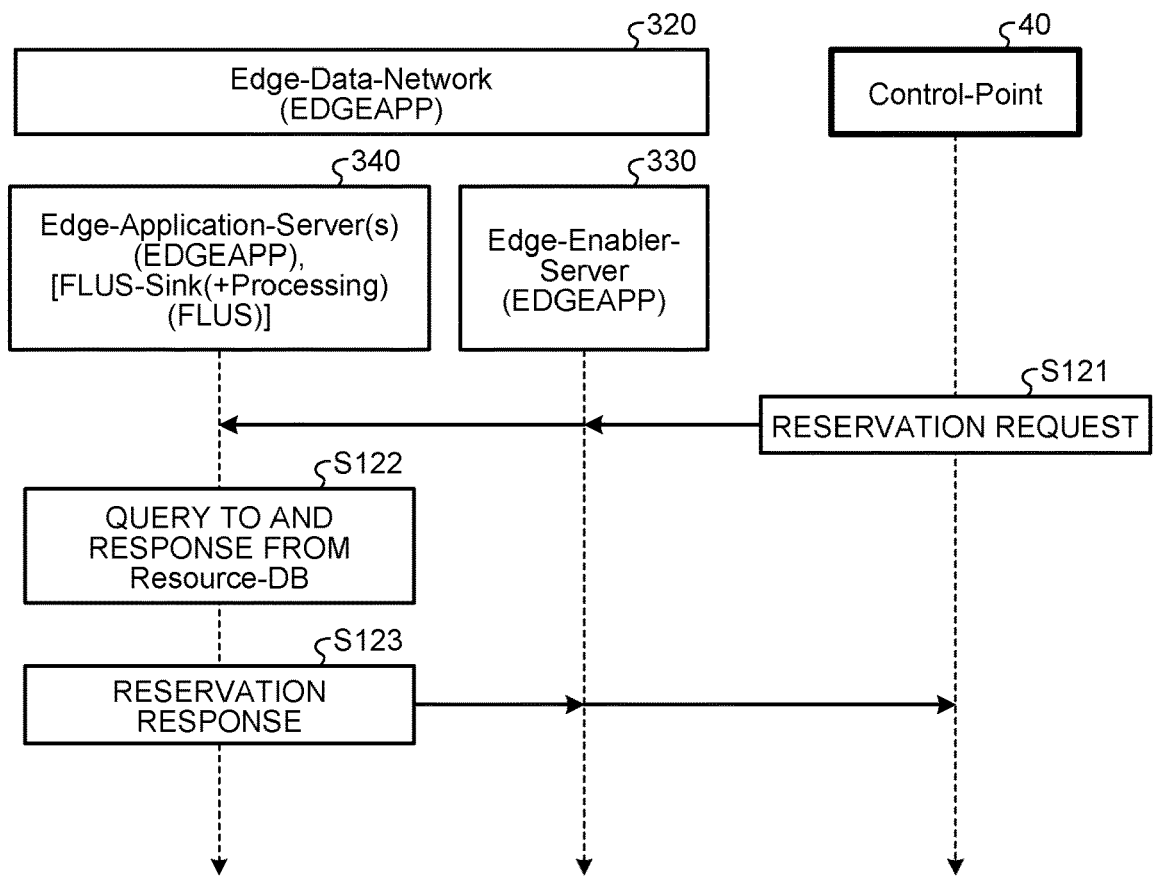
FIG. 23 is a sequence diagram illustrating an example of a flow of a reservation process by the control point according to the embodiment of the present disclosure.
Figure 24:
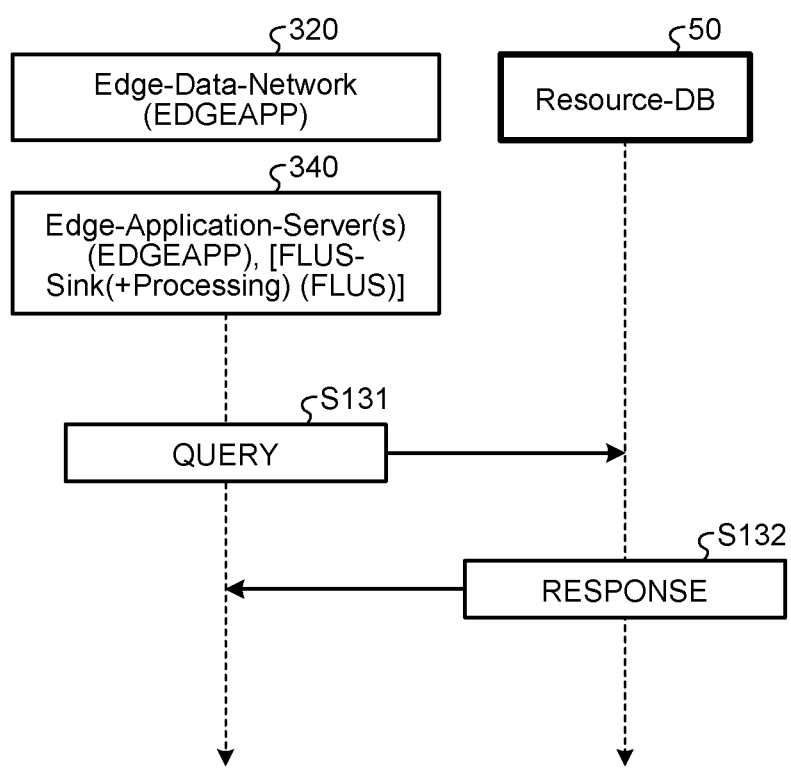
FIG. 24 is a sequence diagram illustrating an example of a flow of a resource inquiry by the streaming sink according to the embodiment of the present disclosure.

First, the reservation process in which the control point 40 reserves a resource of the streaming sink 30 will be described with reference to FIGS. 23 and 24. FIG. 23 is a sequence diagram illustrating an example of a flow of the reservation process by the control point 40 according to the embodiment of the present disclosure. FIG. 24 is a sequence diagram illustrating an example of a flow of a resource inquiry by the streaming sink 30 according to the embodiment of the present disclosure.

Here, a case where FLUS-Sink (or FLUS-Sink and Processing), which is the streaming sink 30, is the Edge-Application-Server(s) 340 of EDGEAPP will be described.

The Edge-Application-Server(s) 340 is(are) associated with the Edge-Enabler-Server 330. Therefore, as illustrated in FIG. 23, the control point 40 first transmits a reservation request to the Edge-Application-Server(s) 340 via the Edge-Enabler-Server 330 (step S121).

The Edge-Application-Server(s) 340 that has/have received the reservation request transmit(s) a query to the resource database 50 and receive(s) a response (step S122).

Here, the interaction between the Edge-Application-Server(s) 340 and the resource database 50 will be described with reference to FIG. 24.

As illustrated in FIG. 24, the Edge-Application-Server(s) 340 transmit(s) a query for inquiring details of resource attributes to the resource database 50 (step S131). Note that, here, the resource attributes for which the Edge-Application-Server(s) 340 inquires of their details are regarding the resource requested for reservation from the control point 40 in step S121 of FIG. 23.

In FIG. 24, the resource database 50 transmits a response to the Edge-Application-Server(s) 340 (step S132).

Let us return to FIG. 23. Having received the response regarding the details of the resource attribute, the Edge-Application-Server(s) 340 reserves the resource on the basis of the details of the resource attributes that have been received. The Edge-Application-Server(s) 340 transmits the reservation result (whether or not the reservation can be made) as a reservation response to the control point 40 via the Edge-Enabler-Server 330 (step S123).

Note that, here, the streaming sink 30 which is the Edge-Application-Server(s) 340 interacts with the control point 40 via the Edge-Enabler-Server 330; however, the present invention is not limited thereto. The streaming sink 30 may interact directly with the control point 40.

<4.4. SRB Generation Process>

When the resource is successfully reserved, the control point 40 generates scheduled resource binding information (SRB). The SRB is information including a combination of pieces of resource information related to a resource that has been successfully reserved. More specifically, the SRB includes a time slot and a list of identifiers identifying resources of each of the streaming source 10, the network 20, and the streaming sink 30 that are guaranteed to be in an executable state in the time slot.

Figure 25:
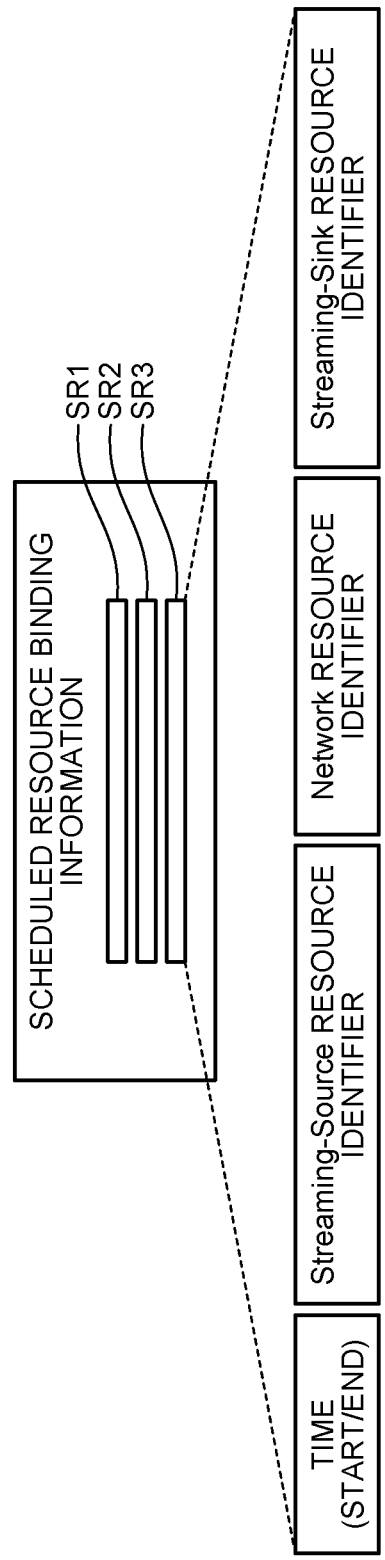
FIG. 25 is a diagram illustrating an example of SRB according to the embodiment of the present disclosure.

FIG. 25 is a diagram illustrating an example of SRB according to the embodiment of the present disclosure. As illustrated in FIG. 25, the SRB includes a plurality of pieces of resource information SR1 to SR3. One piece of resource information SR includes resource use start time and end time, a resource identifier of the streaming source 10, a resource identifier of the network 20, and a resource identifier of the streaming sink 30.

The resource information SR is regarded as a token for identifying a set of instantiated resources specified by each resource identifier. A token is like a reservation number. In a case where the combination of four items included in the resource information SR illustrated in FIG. 25 is encoded with JSON or the like, the token can be defined as a text normalized by JSON. Alternatively, the token may be a short token obtained by normalizing the entire SRB and then hashing.

The control point 40, the streaming source 10, the network 20, and the streaming sink 30 can inquire the resource database 50 about the details of an attribute value of a resource attribute specified by each resource identifier by using the token as a key.

Figure 26:
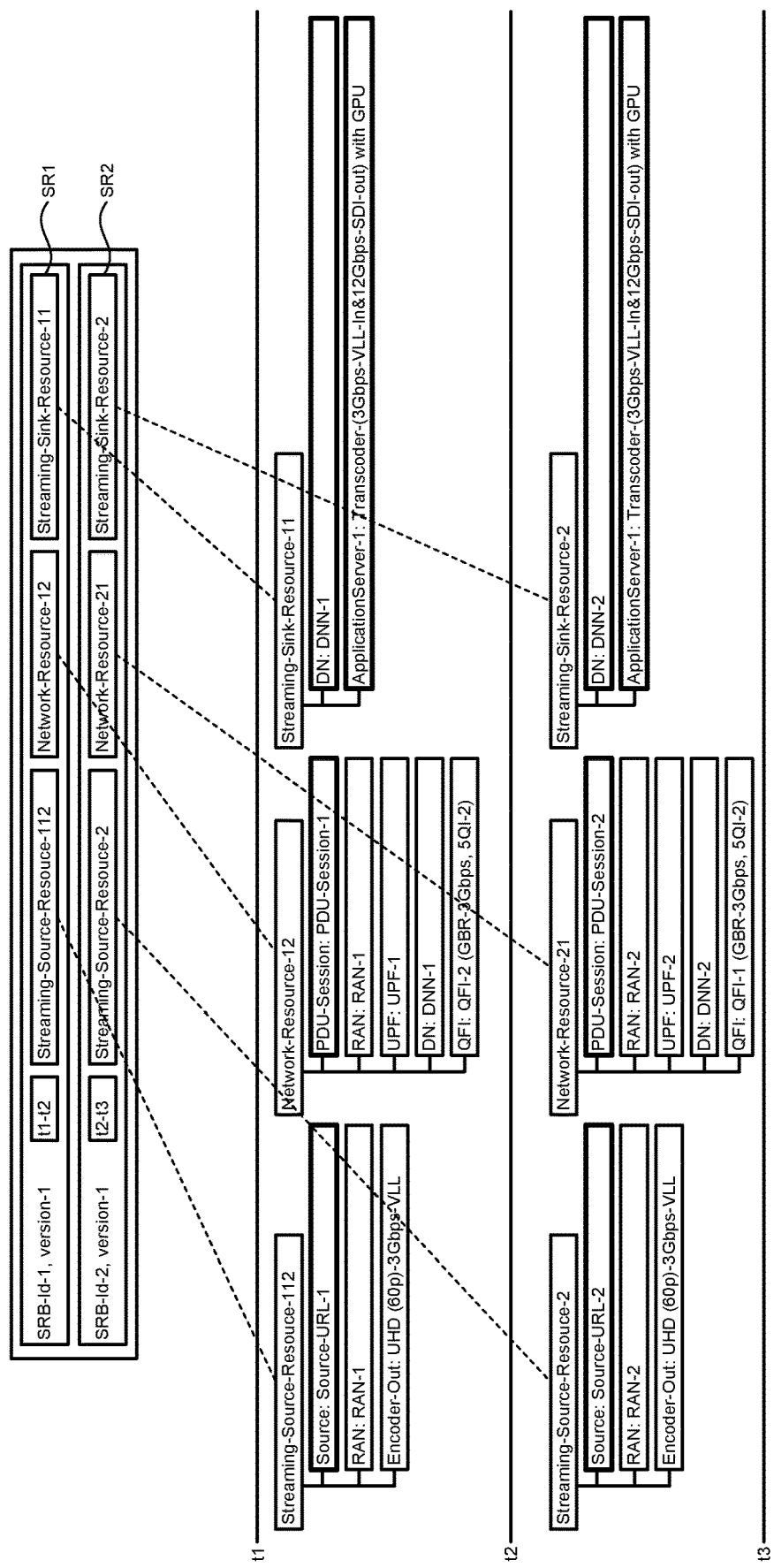
FIG. 26 is a diagram for describing details of the SRB according to the embodiment of the present disclosure.

FIG. 26 is a diagram for describing details of SRB according to the embodiment of the present disclosure. Here, SRB generated by the control point 40 in a case where the resource attributes illustrated in FIG. 17 are successfully reserved is illustrated.

The SRB illustrated in the upper diagram of FIG. 26 is information obtained by binding resource information SR1 and SR2. The resource information SR1 includes a start time t1, an end time t2, Streaming-Source-Resouce-112, Network-Resouce-12, and Streaming-Sink-Resouce-11 and is uniquely identified by SRB-Id-1 and version-1.

The resource information SR2 includes a start time t2, an end time t3, Streaming-Source-Resouce-2, Network-Resouce-21, and Streaming-Sink-Resouce-2 and is uniquely identified by SRB-Id-2 and version-1.

Note that version-n indicates the number of times of update of the resource information, and version-1 indicates that the number of times of update is zero.

The resource information SR is uniquely identified by an identifier (SRB-Id) and the number of times of update (version). That is, even if identifiers (SRB-Id) are the same, resource information SR having different number of times of update (version) is different in at least one of the resource identifiers and the times included in the resource information SR.

In the lower diagram of FIG. 26, resource attributes corresponding to the resource identifier included in the SRB are illustrated. Such resource attributes are the same as those illustrated in FIG. 17. As illustrated in FIG. 26, the resource identifiers included in the SRB each correspond to a resource attribute.

<4.5. SRB Notification Process>

Then, the control point 40 that has generated the SRB notifies the SRB that has been generated to each of the streaming source 10, the network 20, and the streaming sink 30.

Hereinafter, an example of the notification process performed by the control point 40 will be described for each of the streaming source 10, the network 20, and the streaming sink 30.

[Streaming Source]

Figure 27:
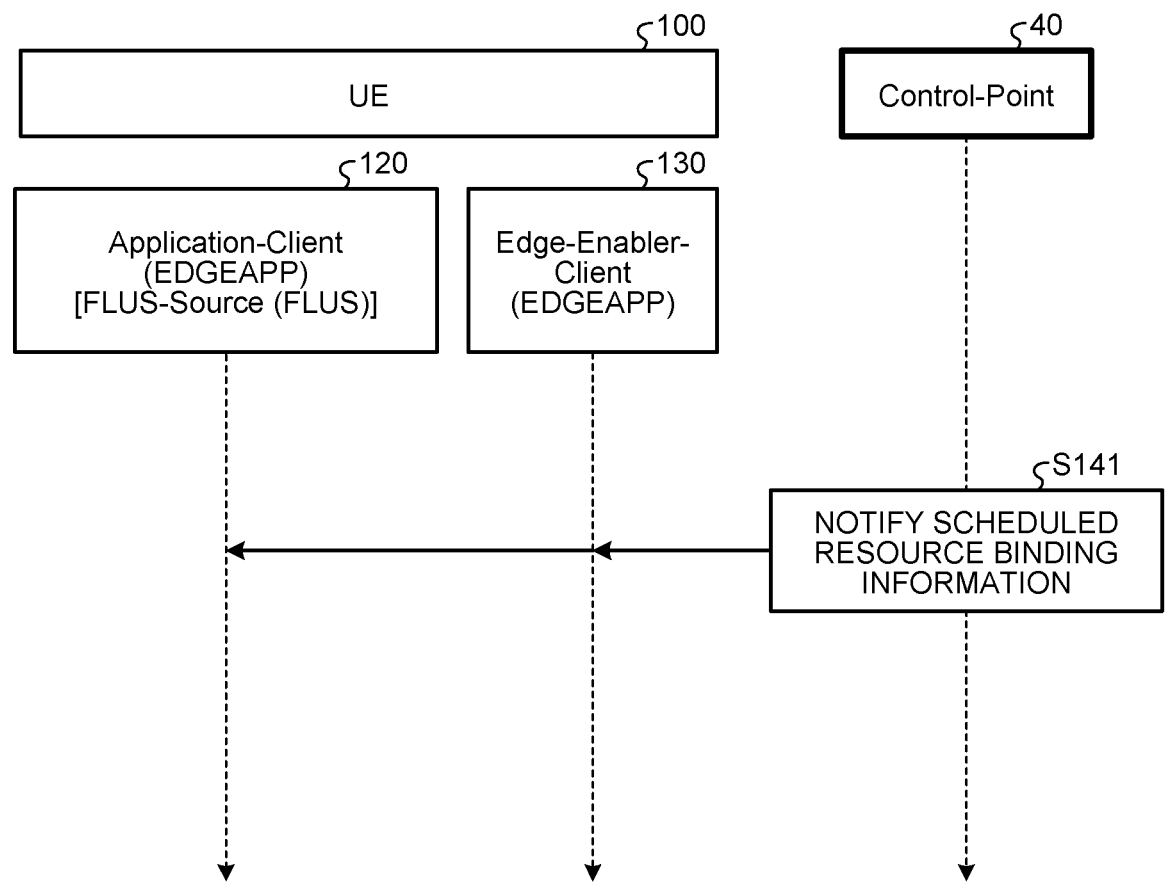
FIG. 27 is a sequence diagram illustrating an example of a flow of a notification process by the control point according to the embodiment of the present disclosure.

First, the notification process in which the control point 40 notifies the streaming source 10 of the SRB will be described with reference to FIG. 27. FIG. 27 is a sequence diagram illustrating an example of a flow of the notification process by the control point 40 according to the embodiment of the present disclosure.

Here, a case where FLUS-Source, which is the streaming source 10, is the Application-Client 120 of EDGEAPP will be described.

As illustrated in FIG. 27, the control point 40 notifies the scheduled binding information SRB to the Edge-Enabler-Client 130 (step S131). Since the Application-Client 120 is associated with the Edge-Enabler-Client 130, the Edge-Enabler-Client 130 forwards the SRB to the Application-Client 120.

Note that, here, the streaming source 10 which is the Application-Client 120 interacts with the control point 40 via the Edge-Enabler-Client 130; however, the present invention is not limited thereto. The streaming source 10 may interact directly with the control point 40 or may interact via the Edge-Enabler-Server 330.

Figure 28:
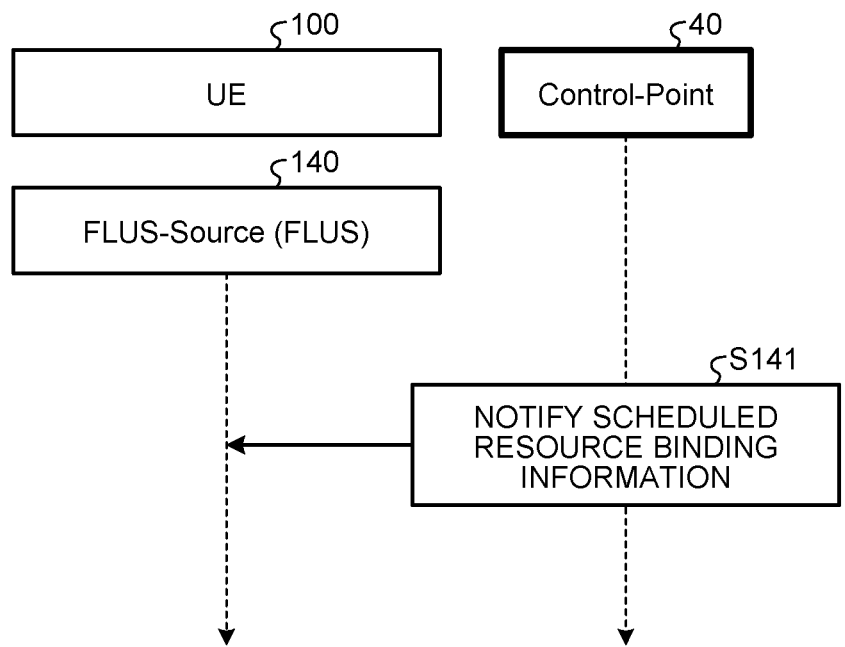
FIG. 28 is a sequence diagram illustrating an example of a flow of a notification process by the control point according to the embodiment of the present disclosure.

FIG. 28 is a sequence diagram illustrating another example of a flow of the notification process by the control point 40 according to the embodiment of the present disclosure. In FIG. 28, the control point 40 notifies the FLUS-Source 140, which is the streaming source 10, of the resource binding information SRB as a Remote-Command of FLUS (step S141). Note that the Remote-Command is a command scheduled to be defined in the future.

Note that, in a case where the scheduled resource binding information SRB is updated, the control point 40 notifies the streaming source 10 of the updated SRB in a similar manner to that in FIG. 27 or 28.

[Network]

Figure 29:
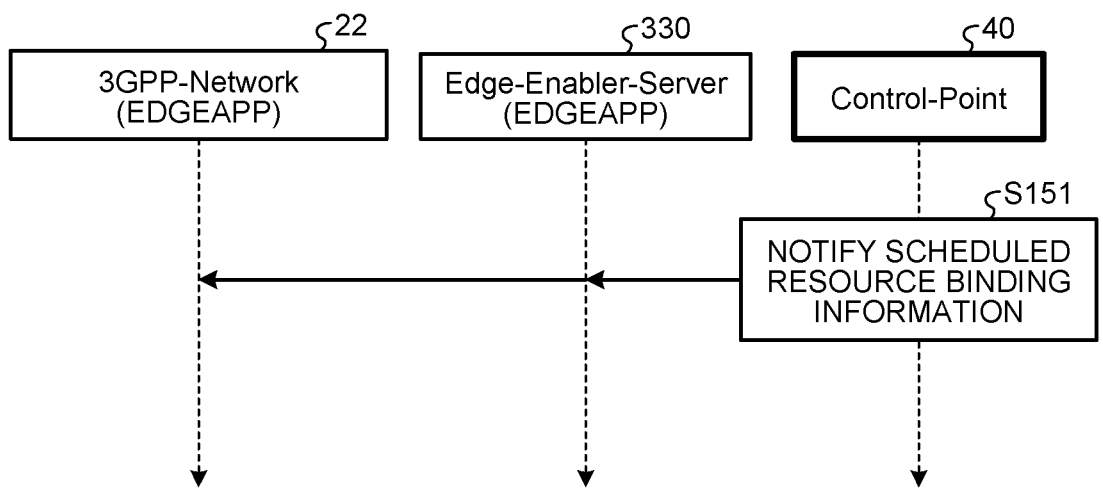
FIG. 29 is a sequence diagram illustrating an example of a flow of a notification process by the control point according to the embodiment of the present disclosure.

First, the notification process in which the control point 40 notifies the network 20 of the SRB will be described with reference to FIG. 29. FIG. 29 is a sequence diagram illustrating an example of a flow of the notification process by the control point 40 according to the embodiment of the present disclosure.

Here, a case where the 5G-Network which is the network 20 is the 3GPP-Network 22 of EDGEAPP will be described.

As illustrated in FIG. 29, the control point 40 notifies the Edge-Enabler-Server 330 of the scheduled binding information SRB (step S151). Since the 3GPP-Network 22 is associated with the Edge-Enabler-Server 330, the Edge-Enabler-Server 330 forwards the SRB to the 3GPP-Network 22.

Note that, here, the network 20 which is the 3GPP-Network 22 interacts with the control point 40 via the Edge-Enabler-Server 330; however, the present invention is not limited thereto. The streaming source 10 may interact directly with the control point 40.

Meanwhile, in a case where the scheduled resource binding information SRB is updated, the control point 40 notifies the network 20 of the updated SRB in a similar manner to that in FIG. 29.

It is assumed that the scheduled resource binding information SRB is received and processed by an AF of the 3GPP-Network 22, for example. Such an AF is, for example, the 5G-Network-Resource-Manager-AF 208A described above.

[Streaming Sink]

Figure 30:
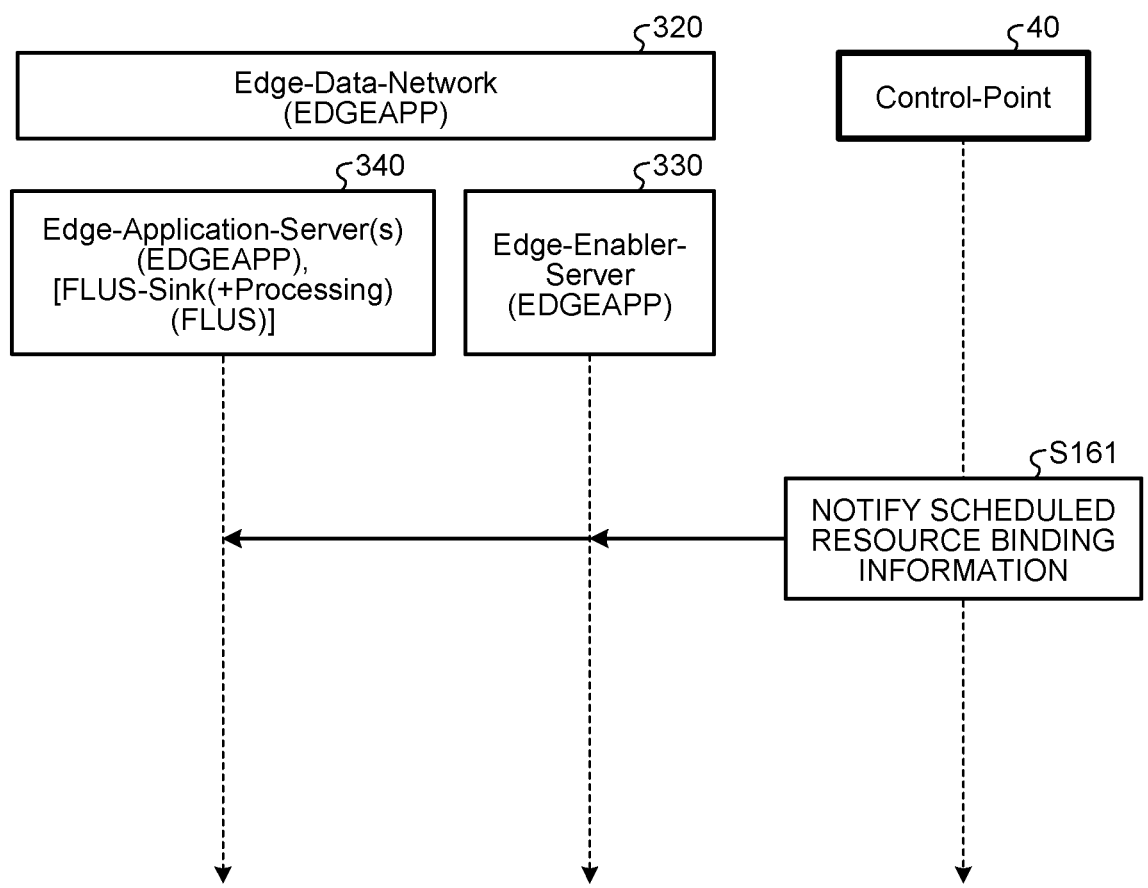
FIG. 30 is a sequence diagram illustrating an example of a flow of a notification process by the control point according to the embodiment of the present disclosure.

First, the notification process in which the control point 40 notifies the streaming sink 30 of the SRB will be described with reference to FIG. 30. FIG. 30 is a sequence diagram illustrating an example of a flow of the notification process by the control point 40 according to the embodiment of the present disclosure.

Here, a case where FLUS-Sink (or FLUS-Sink and Processing), which is the streaming sink 30, is the Edge-Application-Server(s) 340 of EDGEAPP will be described.

As illustrated in FIG. 30, the control point 40 notifies the Edge-Enabler-Server 330 of the scheduled binding information SRB (step S161). Since the Edge-Application-Server(s) 340 is(are) associated with the Edge-Enabler-Server 330, the Edge-Enabler-Server 330 forwards the SRB to the Edge-Application-Server(s) 340.

Note that, here, the streaming sink 30 which is the Edge-Application-Server(s) 340 interacts with the control point 40 via the Edge-Enabler-Server 330; however, the present invention is not limited thereto. The streaming sink 30 may interact directly with the control point 40.

Furthermore, in a case where the scheduled resource binding information SRB is updated, the control point 40 notifies the streaming sink 30 of the updated SRB in a similar manner to that in FIG. 30.

<4.6. Session Process>

The streaming source 10, the network 20, and the streaming sink 30 that have received the SRB activate (execute) the reserved resource upon the start of the resource use to establish a session and executes uplink streaming.

At this time, since each entity is notified of the SRB in advance, the resource can be prepared in advance on the basis of the SRB. Furthermore, the SRB can also be used as a token for resolving an instance of the resource that has been activated (executed) at the time of session establishment.

Hereinafter, session establishment between the streaming source 10 and the network 20 and session establishment between the streaming source 10 and the streaming sink 30 will be described.

[Session Between Streaming Source and Network]

Figure 31:
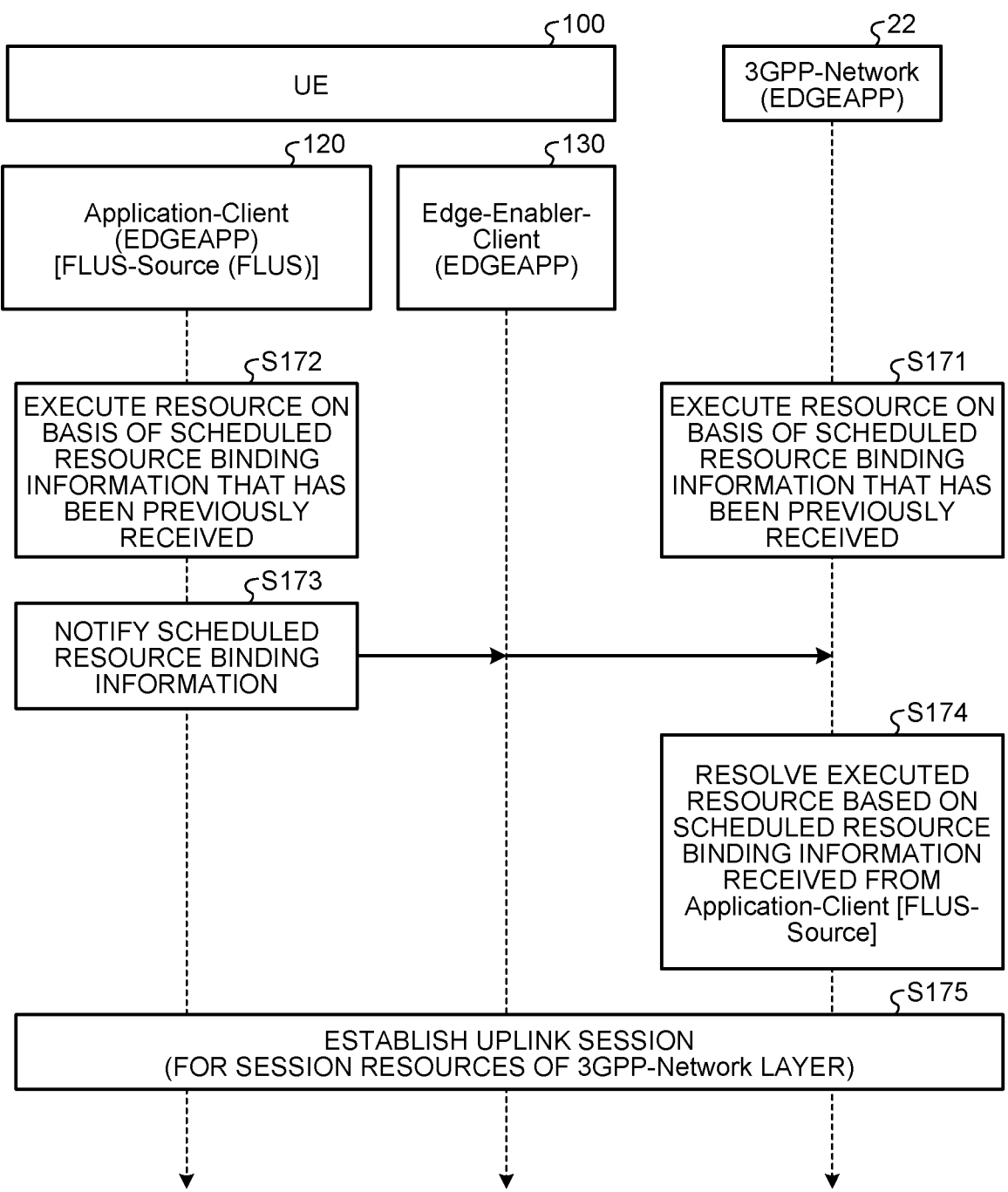
FIG. 31 is a sequence diagram illustrating an example of a session establishment process between a streaming source and a network according to the embodiment of the present disclosure.

First, a session establishment process between the streaming source 10 and the network 20 will be described with reference to FIG. 31. FIG. 31 is a sequence diagram illustrating an example of a session establishment process between the streaming source 10 and the network 20 according to the embodiment of the present disclosure.

Here, a case where FLUS-Source, which is the streaming source 10, is the Application-Client 120 of EDGEAPP and the 5G-Network, which is the network 20, is the 3GPP-Network 22 of EDGEAPP will be described.

As illustrated in FIG. 31, the 3GPP-Network 22 activates (executes) a resource on the basis of scheduled binding information SRB that has been previously received (step S171). Similarly, the Application-Client 120 activates (executes) the resource on the basis of the scheduled binding information SRB that has been previously received (step S172).

The Application-Client 120 notifies the 3GPP-Network 22 of the scheduled binding information SRB after activation via the Edge-Enabler-Client 130 (step S173).

The 3GPP-Network 22 resolves an instance of the resource on the basis of the scheduled binding information SRB received from the Application-Client 120 in step S173 (step S174). As a result, an uplink session is established between the UE 100A and the 3GPP-Network 22 for the session resource of a 3GPP-Network layer (step S175).

Note that, here, the streaming source 10, which is the Application-Client 120, interacts with the 3GPP-Network 22 via the Edge-Enabler-Client 130; however, the present invention is not limited thereto. The streaming source 10 may interact directly with the 3GPP-Network 22 or may interact via the Edge-Enabler-Server 330.

[Session Between Streaming Source and Streaming Sink]

Figure 32:
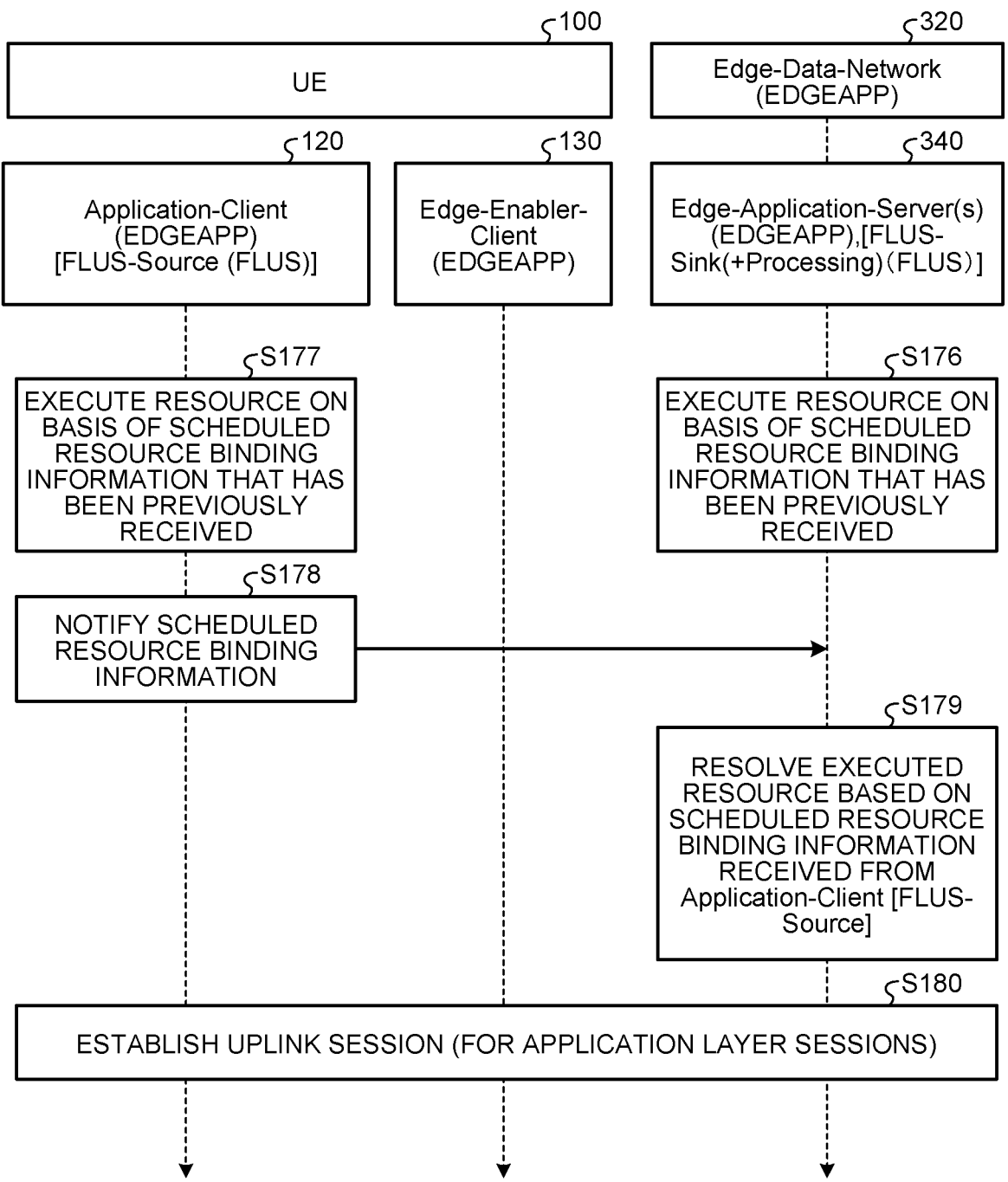
FIG. 32 is a sequence diagram illustrating an example of a session establishment process between a streaming source and a streaming sink according to the embodiment of the present disclosure.

The session establishment process between the streaming source 10 and the streaming sink 30 will be described with reference to FIG. 32. FIG. 32 is a sequence diagram illustrating an example of the session establishment process between the streaming source 10 and the streaming sink 30 according to the embodiment of the present disclosure.

Here, a case where FLUS-Source, which is the streaming source 10, is the Application-Client 120 of EDGEAPP and FLUS-Sink (alternatively, FLUS-Sink and Processing), which is the streaming sink 30, is the Edge-Application-Server(s) 340 of EDGEAPP will be described.

As illustrated in FIG. 32, the Edge-Application-Server(s) 3402 activates (executes) the resource on the basis of the scheduled binding information SRB that has been previously received (step S176). Similarly, the Application-Client 120 activates (executes) the resource on the basis of the scheduled binding information SRB that has been previously received (step S177).

The Application-Client 120 notifies the Edge-Application-Server(s) 340 of the scheduled binding information SRB after activation via the Edge-Enabler-Client 130 (step S178).

The Edge-Application-Server(s) 340 resolves an instance of the resource on the basis of the scheduled binding information SRB received from the Application-Client 120 in step S178 (step S179). As a result, an uplink session is established between the UE 100A and the Edge-Application-Server(s) 340 for the session resource of the application layer (step S180).

Note that, here, the streaming source 10, which is the Edge-Application-Server(s) 340, interacts with the Edge-Application-Server(s) 340 via the Edge-Enabler-Client 130; however, the present invention is not limited thereto. The streaming source 10 may interact with the Edge-Application-Server(s) 340 or may interact via the Edge-Enabler-Server 330.

5. PROCESS FLOW IN ENTIRE SYSTEM

Figure 33:
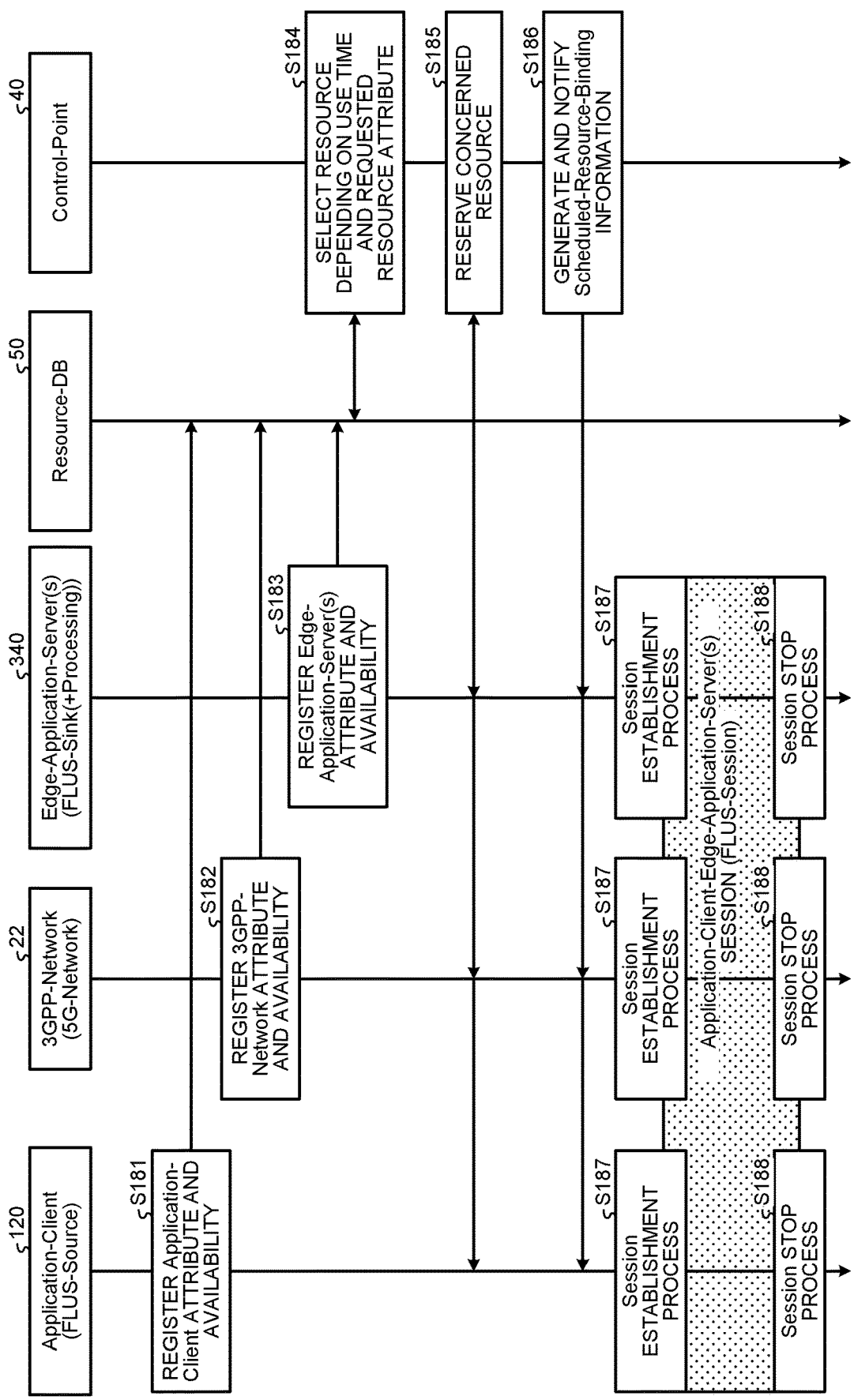
FIG. 33 is a sequence diagram illustrating an example of a flow of information processing executed in the information processing system according to the embodiment of the present disclosure.
Figure 34:
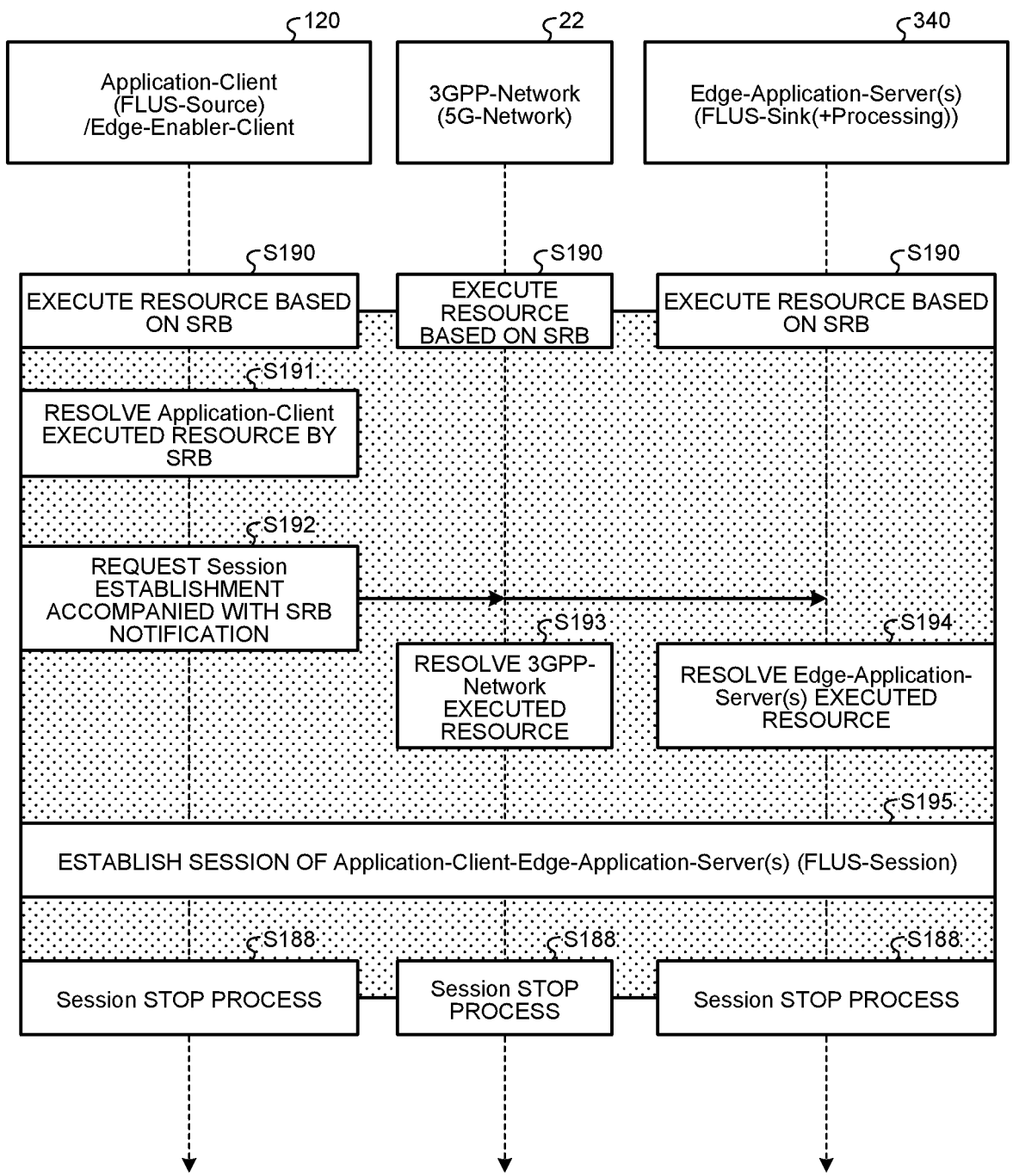
FIG. 34 is a sequence diagram illustrating an example of a flow of information processing executed in the information processing system according to the embodiment of the present disclosure.

Next, a process flow in the entire information processing system according to the embodiment of the present disclosure will be described with reference to FIGS. 33 and 34. FIGS. 33 and 34 are sequence diagrams illustrating an example of a flow of information processing executed in the information processing system according to the embodiment of the present disclosure.

In FIGS. 33 and 34, the flows of the series of processes described in 4. Scheduling Process are illustrated all together.

In FIGS. 33 and 34, it is also assumed that FLUS-Source, which is the streaming source 10, is the Application-Client 120 of EDGEAPP and 5G-Network, which is the network 20, is the 3GPP-Network 22 of EDGEAPP. It is also assumed that FLUS-Sink (or FLUS-Sink and Processing), which is the streaming sink 30, is the Edge-Application-Server(s) 340 of EDGEAPP.

As illustrated in FIG. 33, the Application-Client 120 registers its own resource attributes and availability in the resource database 50 (step S181). Note that availability includes a time (availability time) during which the Application-Client 120 can operate.

Similarly, the 3GPP-Network 22 and the Edge-Application-Server(s) 340 also register their own resource attributes and availability in the resource database 50 (Steps S182 and S183).

The control point 40 executes resource selection depending on a use time and requested resource attribute (step S804). More specifically, the control point 40 inquires the resource database 50 about the use time and a resource attribute that satisfy the service requirement and selects a resource to be reserved on the basis of the query result.

The control point 40 reserves the resource (selected resource) (step S185). The control point 40 transmits a reservation request of the selected resource to each entity and receives a reservation response from each entity.

The control point 40 generates scheduled resource binding information on the basis of the resource reservation result and notifies each entity of the scheduled resource binding information (step S186).

The Application-Client 120, the 3GPP-Network 22, and the Edge-Application-Server(s) 340 execute the session establishment process before the use start time of the reserved resource on the basis of the SRB (step S187).

As a result, a session is kept established until the Application-Client 120, the 3GPP-Network 22, and the Edge-Application-Server(s) 340 execute a session termination process (step S188) after the use end time elapses. Such a session is an Application-Client-Edge-Application-Server(s) session (FLUS-Session).

Next, details of the session establishment process will be described with reference to FIG. 34.

As illustrated in FIG. 34, as the session establishment process, the Application-Client 120, the 3GPP-Network 22, and the Edge-Application-Server(s) 340 first activate (execute) the reserved resource on the basis of the SRB (step S190).

Next, the Application-Client 120 resolves the resource executed by the Application-Client 120 by the SRB (step S191). The Application-Client 120 resolves, for example, a resource instance that has been activated using the SRB.

The Application-Client 120 transmits a session establishment request accompanied with the SRB to the 3GPP-Network 22 and the Edge-Application-Server(s) 340 (step S192).

The 3GPP-Network 22 and the Edge-Application-Server(s) 340 each resolve a resource activated (executed) by itself (steps S193 and S194). The 3GPP-Network 22 and the Edge-Application-Server(s) 340 have already activated the reserved resource in step S190. Therefore, the 3GPP-Network 22 and the Edge-Application-Server(s) 340 that have received the session establishment request from the Application-Client 120 in steps S193 and S194 resolve the activated resource on the basis of the SRB attached to the request (specify an instance that is already in the activated (operating) state). As a result, the session is kept established until a session stop process is performed in step S188.

Note that, in FIGS. 33 and 34, the Application-Client 120 performs the registration process of the resource attribute, the session establishment process, and the like; however, the present invention is not limited thereto. Instead of the Application-Client 120, the Edge-Enabler-Client 130 may execute the processes illustrated in FIGS. 33 and 34.

Figure 35:
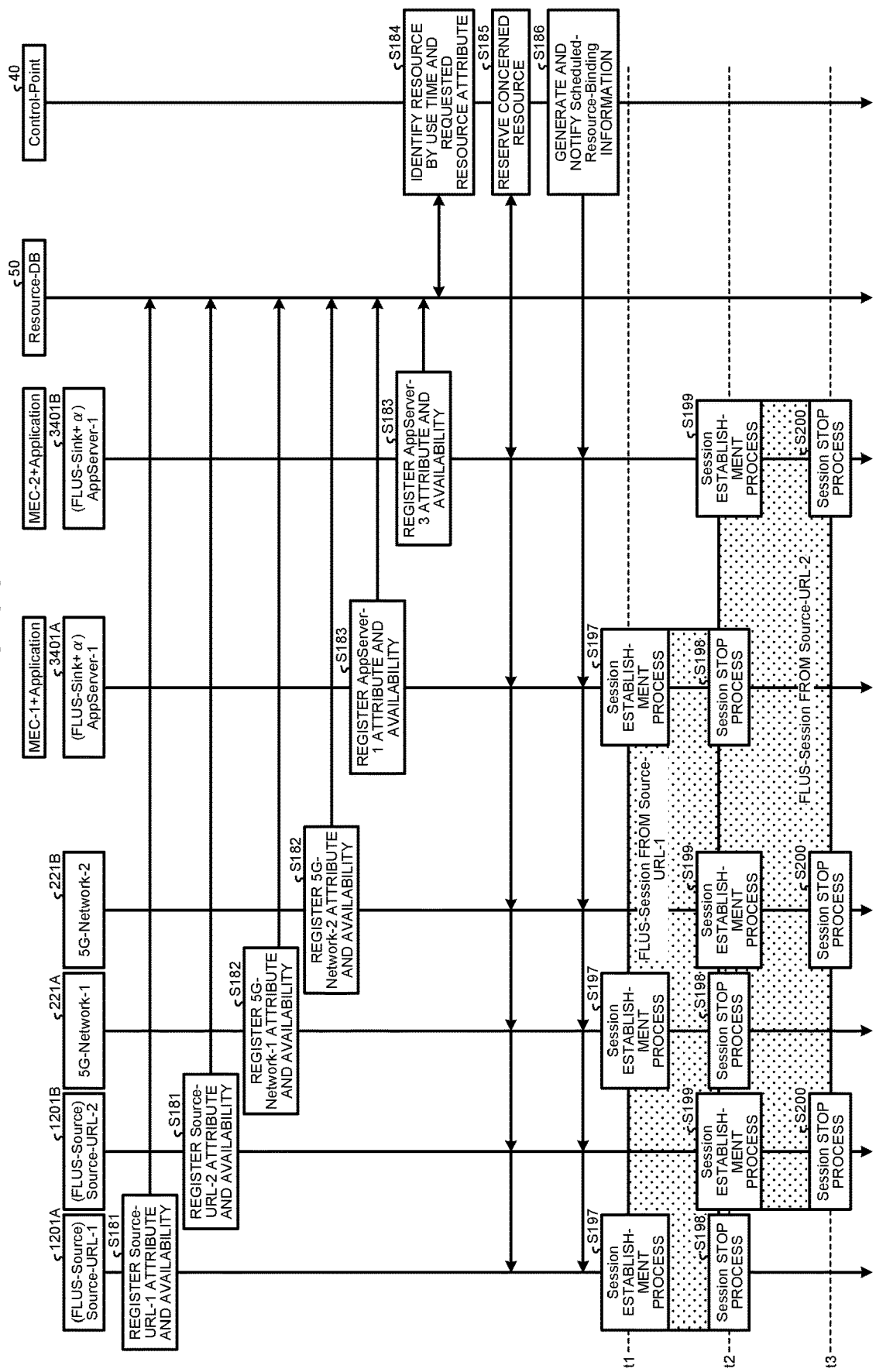
FIG. 35 is a sequence diagram illustrating an example of a flow of information processing executed in the information processing system according to the embodiment of the present disclosure.
Figure 36:
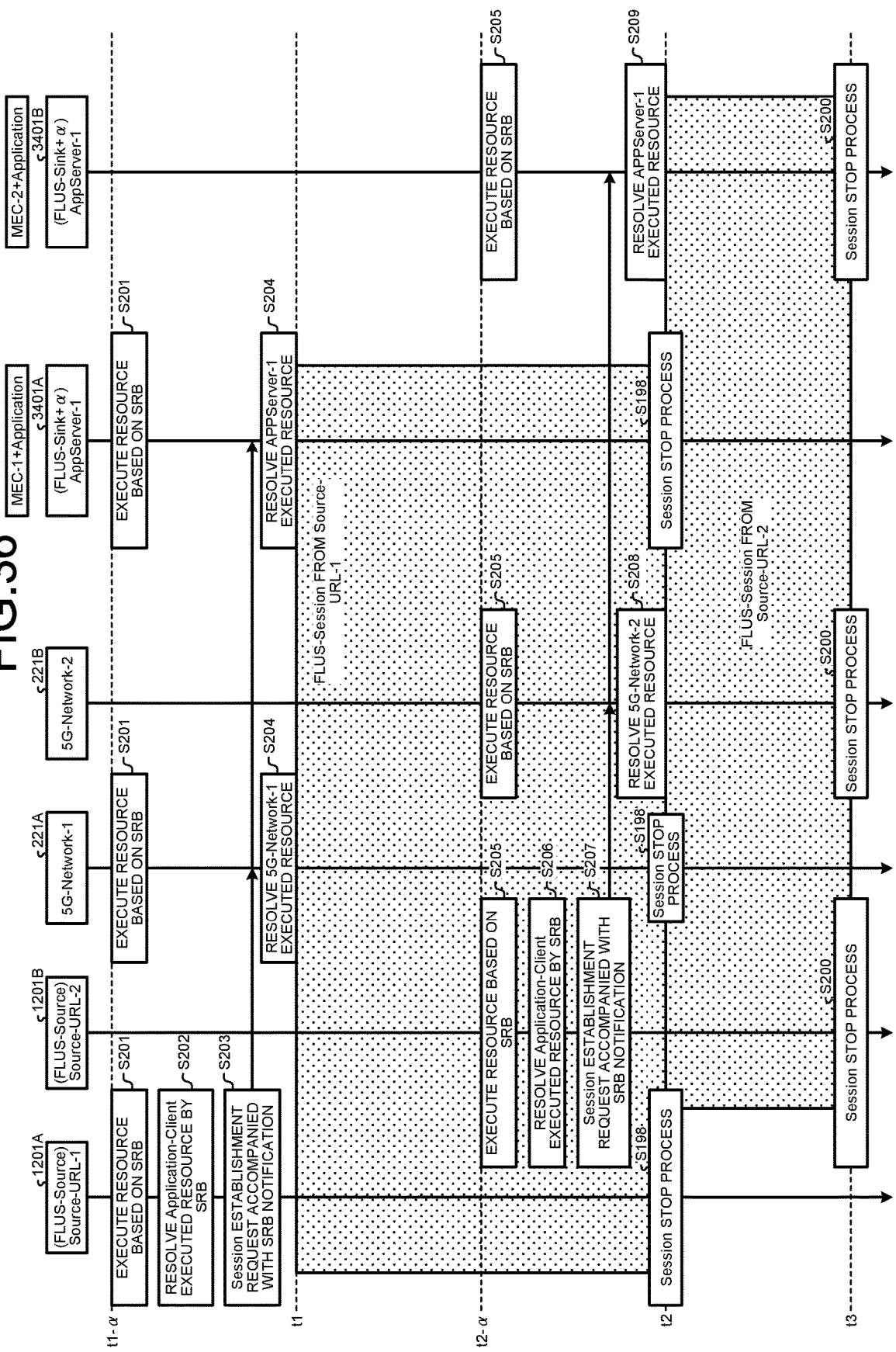
FIG. 36 is a sequence diagram illustrating an example of a flow of information processing executed in the information processing system according to the embodiment of the present disclosure.

Next, the processes in a case where there are pluralities of streaming sources 10, networks 20, and streaming sinks 30 will be described with reference to FIGS. 35 and 36. FIGS. 35 and 36 are sequence diagrams illustrating an example of a flow of information processing executed in the information processing system according to the embodiment of the present disclosure. In FIGS. 35 and 36, a flow of information processing executed by the information processing system illustrated in FIG. 13, for example, is illustrated.

Note that, in FIGS. 35 and 36, the plurality of streaming sources 10 includes a FLUS-Source 1201A having address Source-URL-1 and a FLUS-Source 1201B having address Source-URL-2. Meanwhile, the plurality of networks 20 include a 5G-Network 221A identified by 5G-Network-1 and a 5G-Network 221B identified by 5G-Network-2. In addition, the plurality of streaming sinks 30 include MEC-1 and an application thereover, which is FLUS-Sink+α 3401A having Application-Server identified by AppServer-1 and MEC-2 and an application thereover, which is FLUS-Sink+α 3401B having Application-Server identified by AppServer-1. Note that α as in FLUS-Sink+α 3401 represents, for example, Processing.

Steps S181 to S183 in FIG. 35 are the same processes as steps S181 to S183 in FIG. 33 except that the plurality of FLUS-Sources 1201 (corresponding to the Application-Client 120), the plurality of 5G-Networks 221 (corresponding to the 3GPP-Network 22), and the FLUS-Sink+αs 3401 (corresponding to the Edge-Application-Server(s) 340) register resource attributes and the like. Similarly, steps S184 to S186 in FIG. 35 are the same processes as steps S184 to S186 in FIG. 33 except that the control point 40 performs resource selection, reservation, notification, and the like of the plurality of FLUS-Sources 1201 (corresponding to the Application-Client 120), the plurality of 5G-Networks 221 (corresponding to the 3GPP-Network 22), and the FLUS-Sink+α 3401 (corresponding to the Edge-Application-Server(s) 340).

The FLUS-Sources 1201, the 5G-Networks 221, and the FLUS-Sink+α 3401 execute the session establishment process before the use start time of a reserved resource.

In the example of FIG. 35, the FLUS-Source 1201A, the 5G-Network 221A, and the FLUS-Sink+α 3401A execute the session establishment process before time t1 (step S197).

As a result, the session is kept established until FLUS-Source 1201A, 5G-Network 221A, and FLUS-Sink+α 3401A execute the session termination process (step S198) after time t2 has elapsed. Such a session is a FLUS-Session from the Source-URL-1.

Likewise, the FLUS-Source 1201B, the 5G-Network 221B, and the FLUS-Sink+α 3401B execute the session establishment process before time t2 (step S199).

As a result, the session is kept established until the FLUS-Source 1201A, the 5G-Network 221A, and the FLUS-Sink+α 3401A execute the session termination process (step S200) after time t3 has elapsed. Such a session is a FLUS-Session from the Source-URL-2.

Next, details of the session establishment process will be described with reference to FIG. 36.

As illustrated in FIG. 36, as the session establishment process, the FLUS-Source 1201A, the 5G-Network 221A, and the FLUS-Sink+α 3401A first activate (execute) a reserved resource at time t1−α that is α hours earlier than the use start time t1 on the basis of the SRB (step S201).

Next, the FLUS-Source 1201A resolves the resource executed by itself by the SRB (step S202). The FLUS-Source 1201A, for example, resolves a resource instance that has been activated using the SRB.

The FLUS-Source 1201A transmits a session establishment request accompanied with the SRB to the 5G-Network 221A and the FLUS-Sink+α 3401A (step S203).

The 5G-Network 221A and the FLUS-Sink+α 3401A each solve a resource that has been activated (executed) by itself (step S204). The 5G-Network 221A and the FLUS-Sink+α 3401A have already activated a reserved resource in step S201. Therefore, the 5G-Network 221A and the FLUS-Sink+α 3401A that have received the session establishment request from the FLUS-Source 1201A in step S203 resolve the resource that has been activated on the basis of the SRB attached to the request (specify an instance that is already in the activated (operating) state). As a result, the session is kept established until the session stop process is performed at time t2 (step S198).

As the session establishment process, the FLUS-Source 1201B, the 5G-Network 221B, and the FLUS-Sink+α 3401B first activate (execute) a reserved resource at time t2−α that is α hours earlier than the use start time t2 on the basis of the SRB (step S205).

Next, the FLUS-Source 1201B resolves the resource executed by itself by the SRB (step S206). The FLUS-Source 1201B, for example, resolves a resource instance that has been activated using the SRB.

The FLUS-Source 1201B transmits a session establishment request accompanied with the SRB to the 5G-Network 221B and the FLUS-Sink+α 3401B (step S207).

The 5G-Network 221B and the FLUS-Sink+α 3401B each solve a resource that has been activated (executed) by itself (step S208). The 5G-Network 221B and the FLUS-Sink+α 3401B have already activated a reserved resource in step S205. Therefore, the 5G-Network 221B and the FLUS-Sink+α 3401B that have received the session establishment request from the FLUS-Source 1201B in step S207 resolve the resource that has been activated on the basis of the SRB attached to the request (specify an instance that is already in the activated (operating) state). As a result, the session is kept established until the session stop process is performed at time t3 (step S200).

As described above, in the information processing system, the control point 40 selects and reserves a resource on the basis of resource information regarding different resources of different entities. In addition, the control point 40 generates combination information (scheduled binding information SRB) regarding a combination of pieces of resource information regarding resources that are reserved.

As a result, the streaming source 10, the network 20, and the streaming sink 30 can secure resources and establish a session on the basis of the combination information and can perform uplink streaming seamlessly. For example, as illustrated in FIG. 36, since the session is not interrupted at time t2, the information processing system according to the embodiment of the present disclosure can perform uplink streaming without interruption from time t1 to time t3.

6. SRB UPDATE PROCESS

Next, an SRB update process performed by the control point 40 when a resource attribute registered in the resource database 50 is updated will be described.

Figure 37:
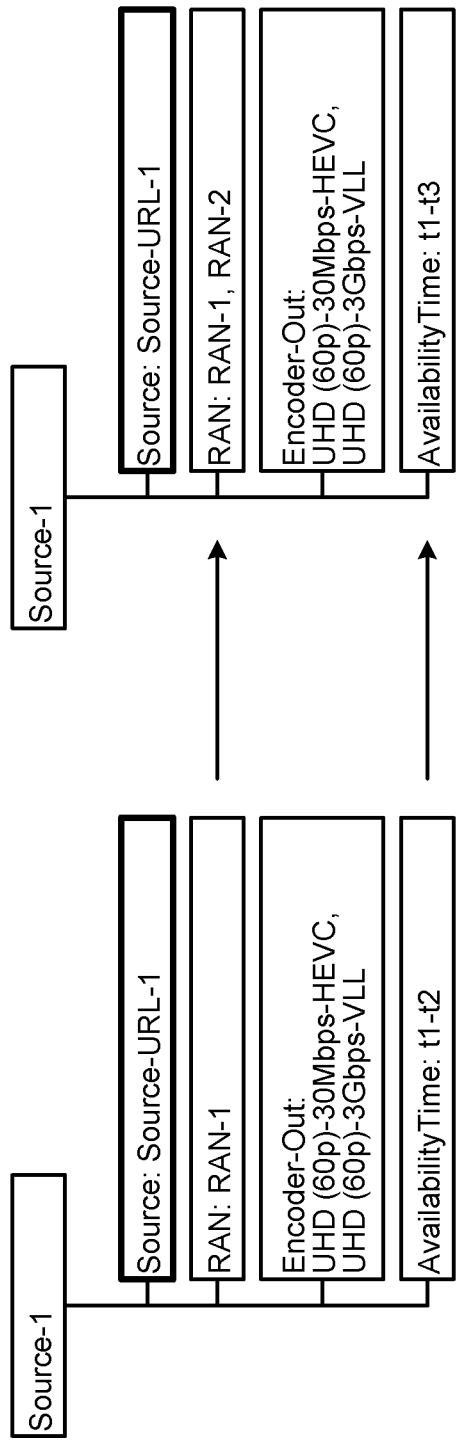
FIG. 37 is a diagram for describing updating of resource attributes according to the embodiment of the present disclosure.
Figure 38A:
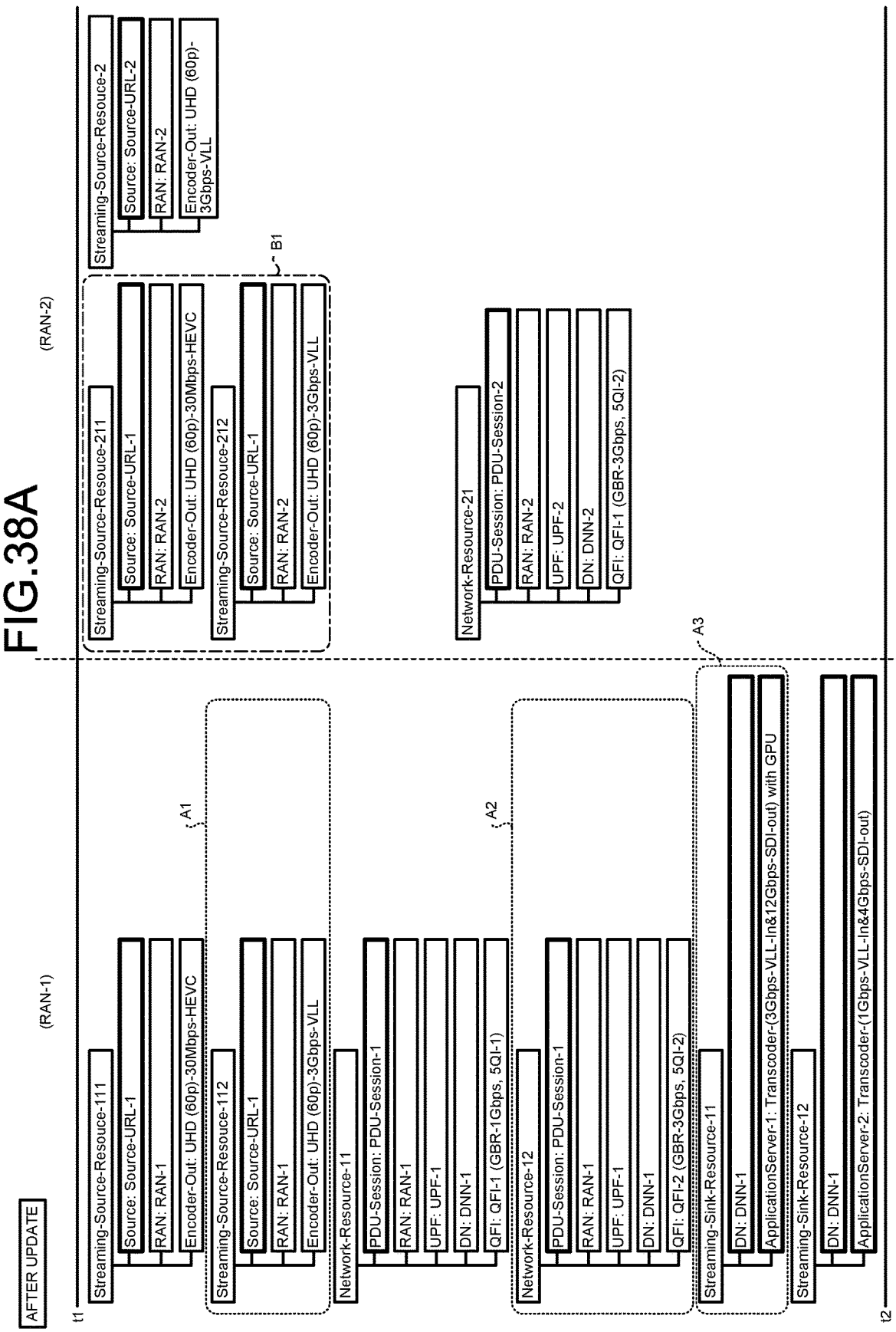
FIG. 38A is a diagram for describing updating of resource attributes according to the embodiment of the present disclosure.
Figure 38B:
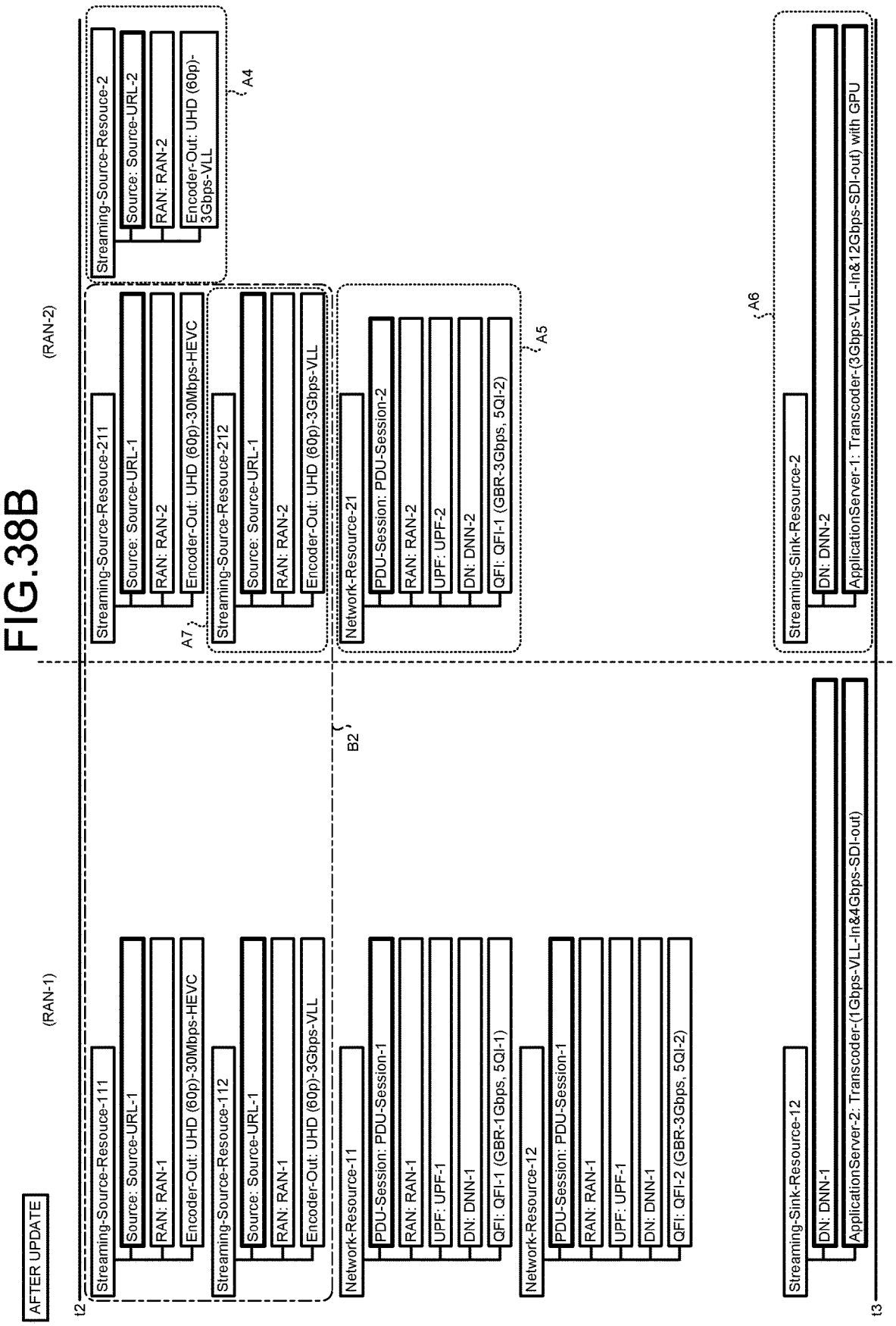
FIG. 38B is a diagram for describing updating of resource attributes according to the embodiment of the present disclosure.

FIGS. 37, 38A, and 38B are diagrams for describing updating of resource attributes according to the embodiment of the present disclosure.

Here, as illustrated in FIG. 37, it is assumed that the availability time of the streaming source 10 identified by Source-1 that has been initially available in the area RAN-1 from time t1 to time t2 is updated from time t1 to time t3 at time t1.5. It is also assumed that the support area of the streaming source 10 identified by Source-1 is extended to the RAN-2 in addition to the RAN-1 at time t1.5.

In this case, the streaming source 10 identified by Source-1 updates the resource attributes with respect to the resource database 50. As a result, as illustrated in B1 of FIG. 38A and B2 of FIG. 38B, the updated resource attributes are added to the resource database 50. Note that, in FIGS. 38A and 38B, sets of resource attributes are illustrated for each time slot (t1-t2, t2-t3) and area (RAN-1, RAN-2) as in FIGS. 15A and 15B.

For example, as illustrated in FIG. 38A, the Streaming-Source-Resouce-211 and the Streaming-Source-Resouce-212 are added by the update. The Streaming-Source-Resouce-211 and the Streaming-Source-Resouce-212 have the same resource attributes as those of the Streaming-Source-Resouce-111 and the Streaming-Source-Resouce-112 except that the areas are different from each other.

Furthermore, as illustrated in FIG. 38B, the Streaming-Source-Resouce-111, the Streaming-Source-Resouce-112, the Streaming-Source-Resouce-211, and the Streaming-Source-Resouce-212 are added by the update. These have the same resource attributes as those of the Streaming-Source-Resouce-111, the Streaming-Source-Resouce-112, the Streaming-Source-Resouce-211, and the Streaming-Source-Resouce-212 illustrated in FIG. 38A except for the availability time.

When the resource attributes are updated, the resource database 50 performs an update process of a response to a query (hereinafter, also referred to as a previous query) that has been processed in the past.

For example, the resource database 50 stores previous queries and specifies a previous query (hereinafter, also referred to as a target previous query) related to the updated resource attribute in a case where a resource attribute is updated.

Figure 39:
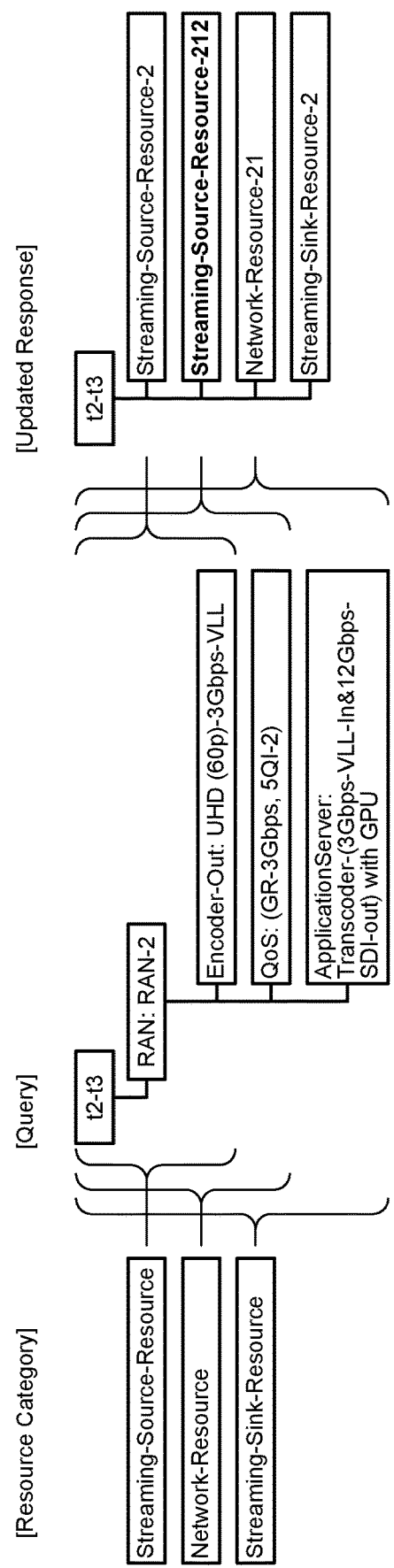
FIG. 39 is a diagram for describing a response update process performed by a resource database according to the embodiment of the present disclosure.

For example, the resource database 50 specifies a query illustrated in the center of FIG. 39 as the target previous query. Note that FIG. 39 is a diagram for describing the response update process performed by the resource database 50 according to the embodiment of the present disclosure.

The resource database 50 transmits an update response (Update Response) illustrated on the right side of FIG. 39 to the control point 40 as a post-update response to the target previous query. Note that the update response is the same as the response illustrated in FIG. 16 except that the update response includes the Streaming-Source-Resource-212.

After receiving the update response from the resource database 50, the control point 40 evaluates the update response that has been received and reselects a resource attribute. When a new resource attribute is selected as a result of the reselection, the control point 40 updates the SRB and generates a new version of the SRB. The control point 40 notifies the updated SRB to each of the streaming source 10, the network 20, and the streaming sink 30.

For example, let us assume that the control point 40 that has received the response after the update illustrated in FIG. 39 changes the selected resource attribute from Streaming-Source-Resource-2 to Streaming-Source-Resource-212.

That is, the control point 40 before the update of the resource attribute has been scheduled to use the streaming source 10 identified by Source-2 in the area RAN-2 from time t2 to time t3. However, since the streaming source 10 identified by Source-1 has become available in the area RAN-2 continuously from time t2 to time t3 due to the update, it is assumed that the streaming source 10 identified by Source-1 is determined to be used also during this period.

Figure 40:
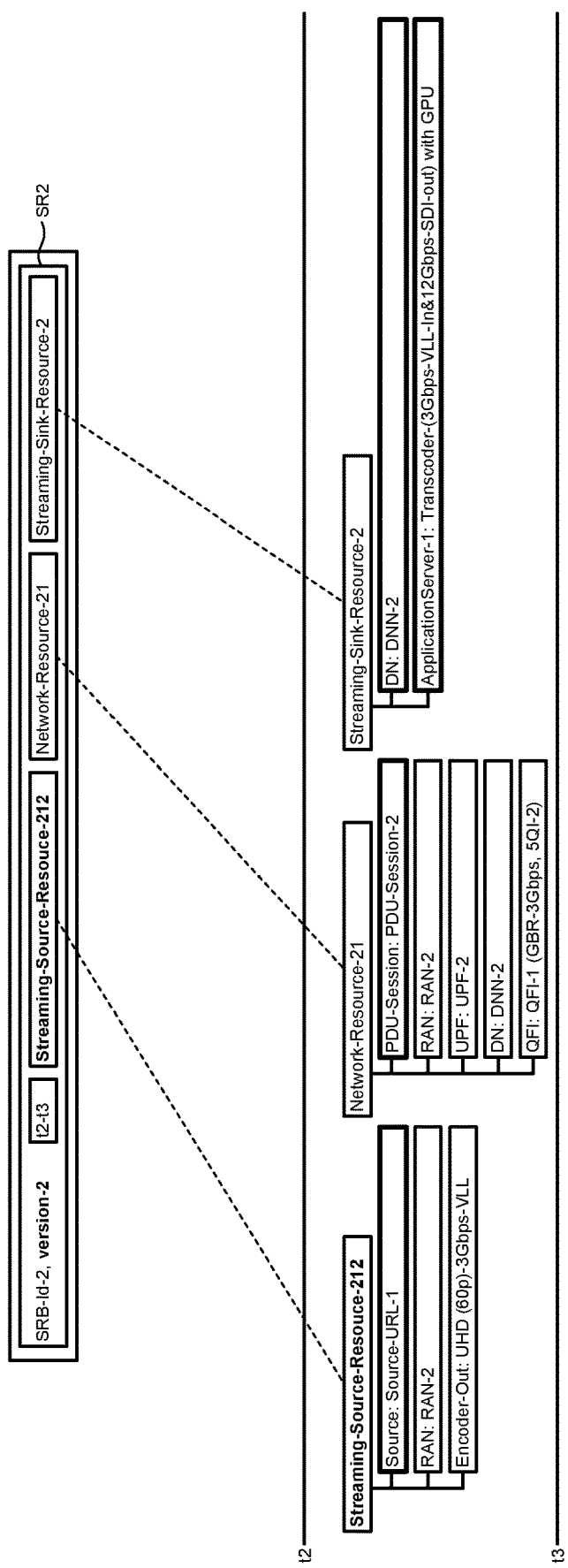
FIG. 40 is a diagram for describing an example of SRB according to the embodiment of the present disclosure.

In this case, as illustrated in FIG. 40, the control point 40 generates SRB including Streaming-Source-Resource-212 as the resource identifier and notifies the SRB to the streaming source 10, the network 20, and the streaming sink 30.

Note that FIG. 40 is a diagram for describing an example of the SRB according to the embodiment of the present disclosure. Resource information SR2 of the SRB illustrated in FIG. 40 is the same as the resource information SR2 illustrated in FIG. 27 except that the version is version-2 and includes Streaming-Source-Resource-212 instead of Streaming-Source-Resource-2. Meanwhile, since the resource attribute has been updated at time t1.5, a resource having time t1 as the start time has already been executed. Therefore, the SRB illustrated in FIG. 40 does not include the resource information SR1 (see FIG. 27).

In the lower diagram of FIG. 40, resource attributes (see A5 to A7 in FIG. 38B) corresponding to the resource identifiers included in the resource information SR2 are illustrated side by side.

Figure 41:
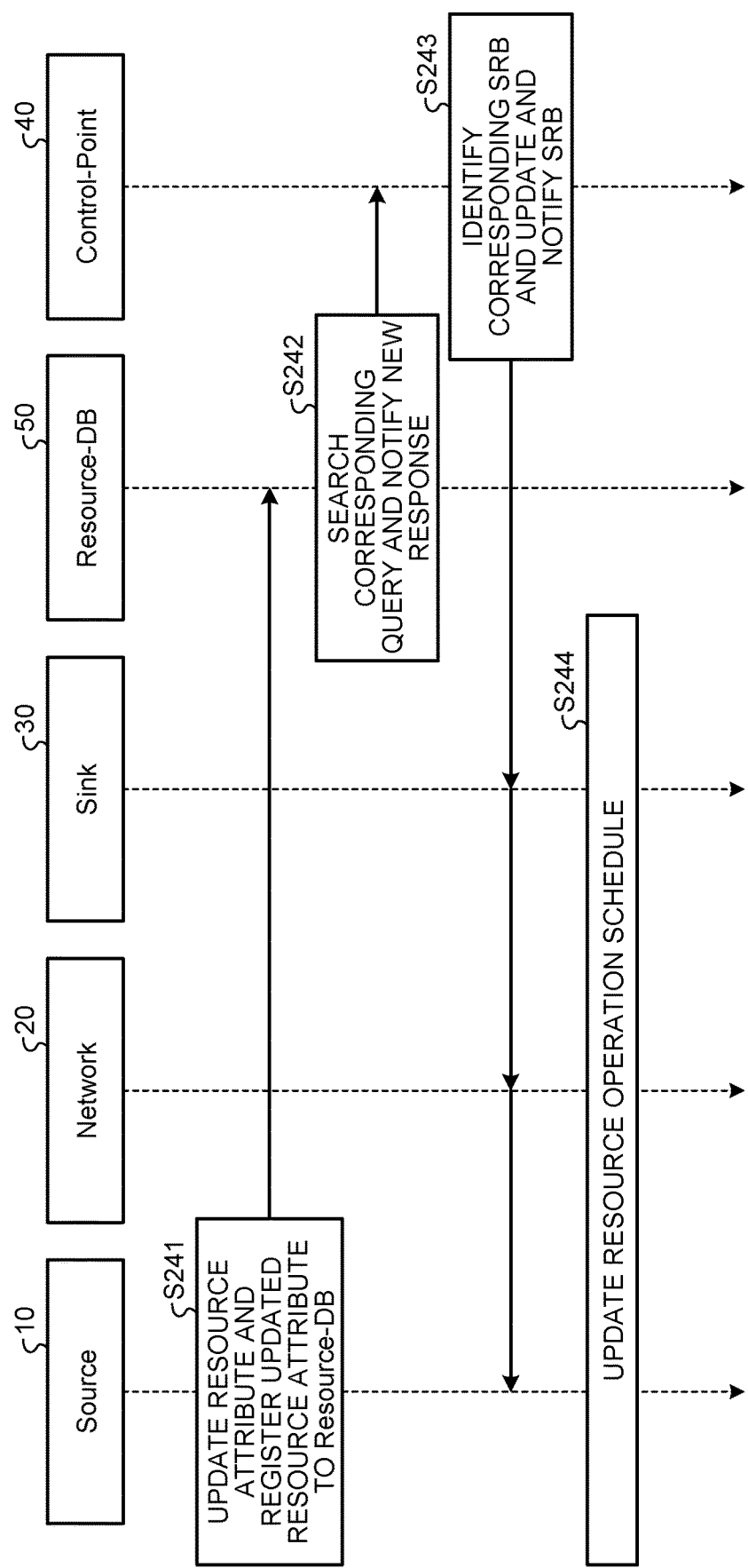
FIG. 41 is a sequence diagram for describing an example of an SRB update process according to the embodiment of the present disclosure.

Here, the flow of the SRB update process by the control point 40 will be described with reference to FIG. 41. FIG. 41 is a sequence diagram for describing an example of the SRB update process according to the embodiment of the present disclosure.

As illustrated in FIG. 41, in a case where the resource attribute is changed, the streaming source (Source) 10 executes an update of the resource attribute and registration to the resource database 50 (step S241).

After accepting the registration of the updated resource attribute, the resource database 50 performs a search by a corresponding query (target previous query) and notification of a new response (update response) with respect to the control point 40 (step S242).

The control point 40 specifies SRB (corresponding SRB) that corresponds to the update response and updates and notifies the specified SRB (step S243). In a case where the SRB is updated, the control point 40 notifies the streaming source 10, the network 20, and the streaming sink (Sink) 30 of the updated SRB.

The streaming source 10, the network 20, and the streaming sink 30 update the resource operation schedule in accordance with the updated SRB that has been received (step S244). For example, the streaming source 10, the network 20, and the streaming sink 30 replace the SRB that has already been received with the updated SRB and execute resource reservation, execution, session establishment, and the like on the basis of the updated SRB.

Figure 42:
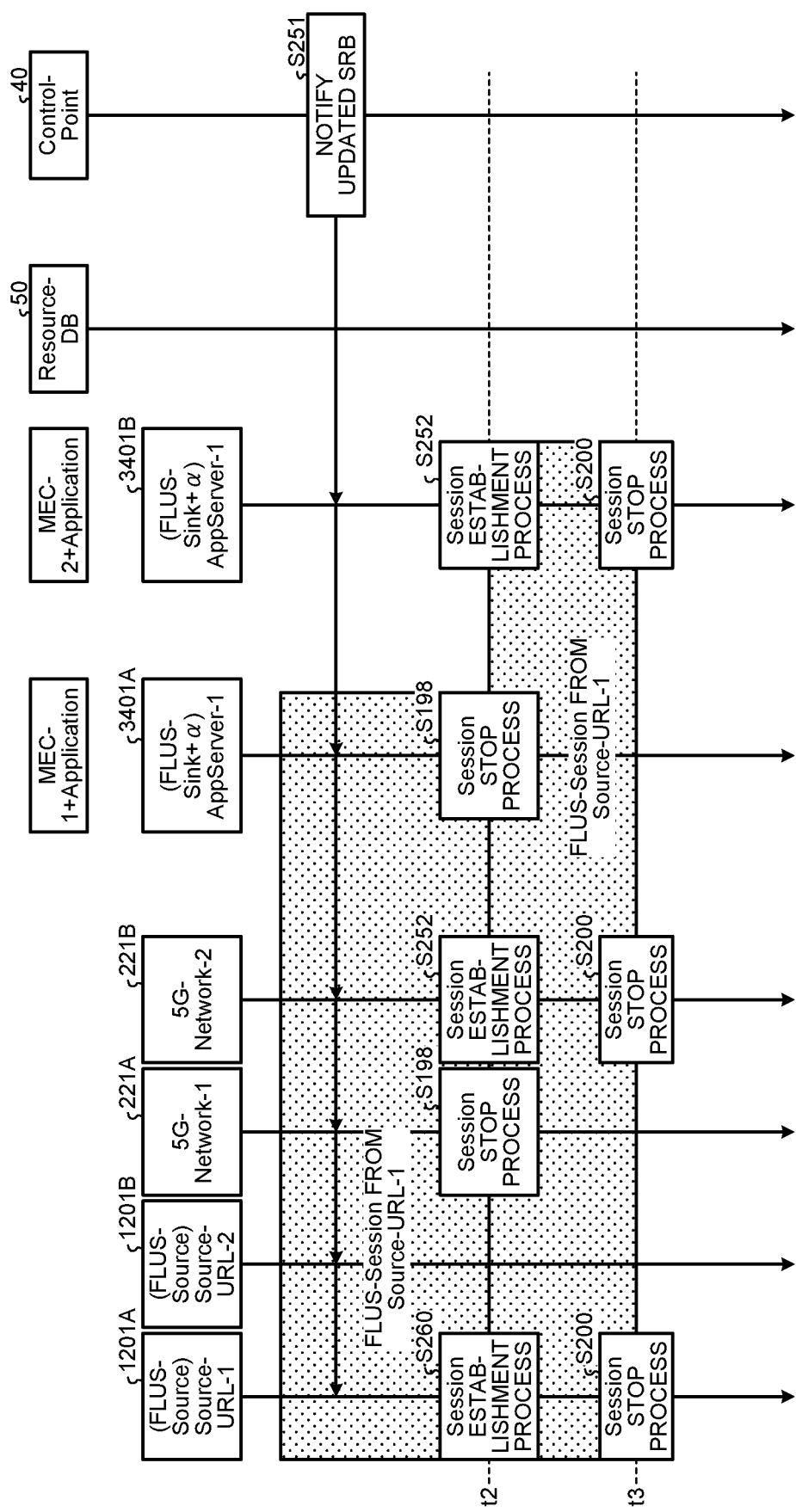
FIG. 42 is a sequence diagram illustrating an example of a flow of information processing executed in the information processing system according to the embodiment of the present disclosure.
Figure 43:
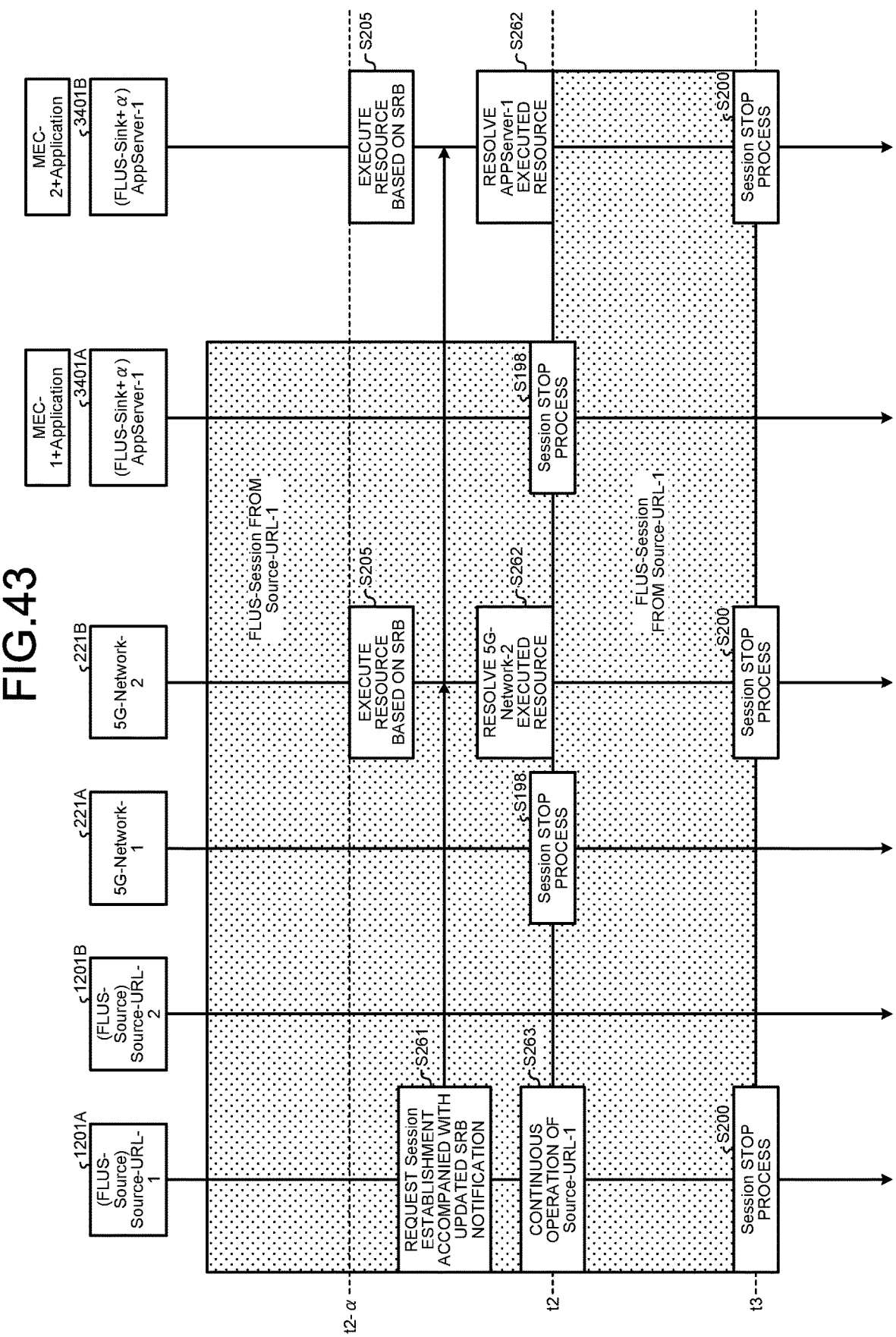
FIG. 43 is a sequence diagram illustrating an example of a flow of information processing executed in the information processing system according to the embodiment of the present disclosure.

Next, an example of the SRB update process in a case where there are pluralities of streaming sources 10, networks 20, and streaming sinks 30 will be described with reference to FIGS. 42 and 43. FIGS. 42 and 43 are sequence diagrams illustrating an example of a flow of information processing executed in the information processing system according to the embodiment of the present disclosure. In FIGS. 42 and 43, a flow of information processing executed by the information processing system illustrated in FIG. 13, for example, is illustrated.

Note that, in FIGS. 42 and 43, the plurality of streaming sources 10 includes a FLUS-Source 1201A having address Source-URL-1 and a FLUS-Source 1201B having address Source-URL-2. Meanwhile, the plurality of networks 20 include a 5G-Network 221A identified by 5G-Network-1 and a 5G-Network 221B identified by 5G-Network-2. In addition, the plurality of streaming sinks 30 include MEC-1 and an application thereover, which is FLUS-Sink+α 3401A having Application-Server identified by AppServer-1 and MEC-2 and an application thereover, which is FLUS-Sink+α 3401B having Application-Server identified by App-Server-1. Note that a as in FLUS-Sink+α 3401 represents, for example, Processing.

In addition, the flow of processes until a session is established at time t1 is the same as that in FIG. 35, and thus, in FIG. 42, illustration and description of processes before time t1.5 are omitted. Furthermore, since processes from the update of the resource attribute of the streaming source 10 at time t1.5 to notification of the SRB updated in step S251 is the same as the processes from step S241 to step S243 illustrated in FIG. 41, illustration and description of such processes are omitted in FIG. 42.

As illustrated in FIG. 42, after updating the SRB, the control point 40 transmits a notification of the updated SRB to the FLUS-Source 1201, the 5G-Network 221, and the FLUS-Sink+α 3401 (step S251). By receiving this SRB, the FLUS-Source 1201A recognizes that it continues to operate even after time t2.

Subsequently, the 5G-Network 221B and the FLUS-Sink+α 3401B execute the session establishment process using the updated SRB before the use end time t2 (step S252).

In addition, before the use end time t2, the FLUS-Source 1201A executes the session establishment process using the updated SRB (step S260). At this point, it is different from the process in FIG. 35 in which the FLUS-Source 1201A executes the session stop process at the use end time t2. In FIG. 42, as a result, the connection between the FLUS-Source 1201A and the 5G-Network 221A is disconnected, and a session between the FLUS-Source 1201A and the 5G-Network 221B is newly established.

Next, details of the session establishment process before and after time t2 will be described with reference to FIG. 43.

As illustrated in FIG. 43, the 5G-Network 221B and the FLUS-Sink+α 3401B activate (execute) the reserved resource at time t2−α, which is α hours earlier than the use start time t2, on the basis of the SRB as the session establishment process (step S205).

Before the use end time t2, the FLUS-Source 1201A transmits a session establishment request accompanied with the updated SRB to the 5G-Network 221B and the FLUS-Sink+α 3401B as the session establishment process (step S261).

The 5G-Network 221B and the FLUS-Sink+α 3401B that have received the session establishment request resolve the executed resource using the updated SRB (step S262). The 5G-Network 221B and the FLUS-Sink+α 3401B have already activated a reserved resource in step S205. Therefore, the 5G-Network 221B and the FLUS-Sink+α 3401B that have received the session establishment request from the FLUS-Source 1201A in step S261 resolve the resource that has been activated on the basis of the updated SRB attached to the request (specify an instance that is already in the activated (operating) state).

As a result, the operation of the FLUS-Source 1201A having address Source-URL-1 continues (step S263), and the session is kept established until the session stop process is performed at time t3 (step S200). Note that the session established here is a FLUS-Session from Source-URL-1.

As described above, even in a case where the resource attribute is updated, the 5G-Network 221B and the FLUS-Sink+α 3401B can secure the resources necessary for session establishment before the use start time t2 by using the SRB. Therefore, the 5G-Network 221B and the FLUS-Sink+α 3401B can resolve resources used in the session with the FLUS-Source 1201A more quickly and can implement seamless uplink streaming.

7. SELECTION OF UPF

As described above, when the resource attribute is updated, the streaming source 10A identified by Source-1 at time t2 travels from the cell C1 of the RAN-1 to the cell C1 of the RAN-2. At this time, the streaming source 10A performs the session establishment process in order to newly establish a PDU session in the RAN-2.

For example, as the session establishment process, the UE 100A including the streaming source 10A transmits a PDU session establishment request to the AMF 209 illustrated in FIG. 3 via an N1 interface. In response to this, the PDU session establishment process is executed between Network Functions (NFs) that are subsequent stages of the AMF 209, and a PDU session establishment response is returned from the AMF 209.

The PDU session establishment process includes various processes such as confirmation and registration of subscription information to the UDM 207, whether or not the same PCF control can be confirmed (whether or not a local policy related to slicing can be applied), selection of the UPF 220, IP address assignment, confirmation of the charging content, and a configuration of a QoS flow of a requested PDU session.

Figure 44:
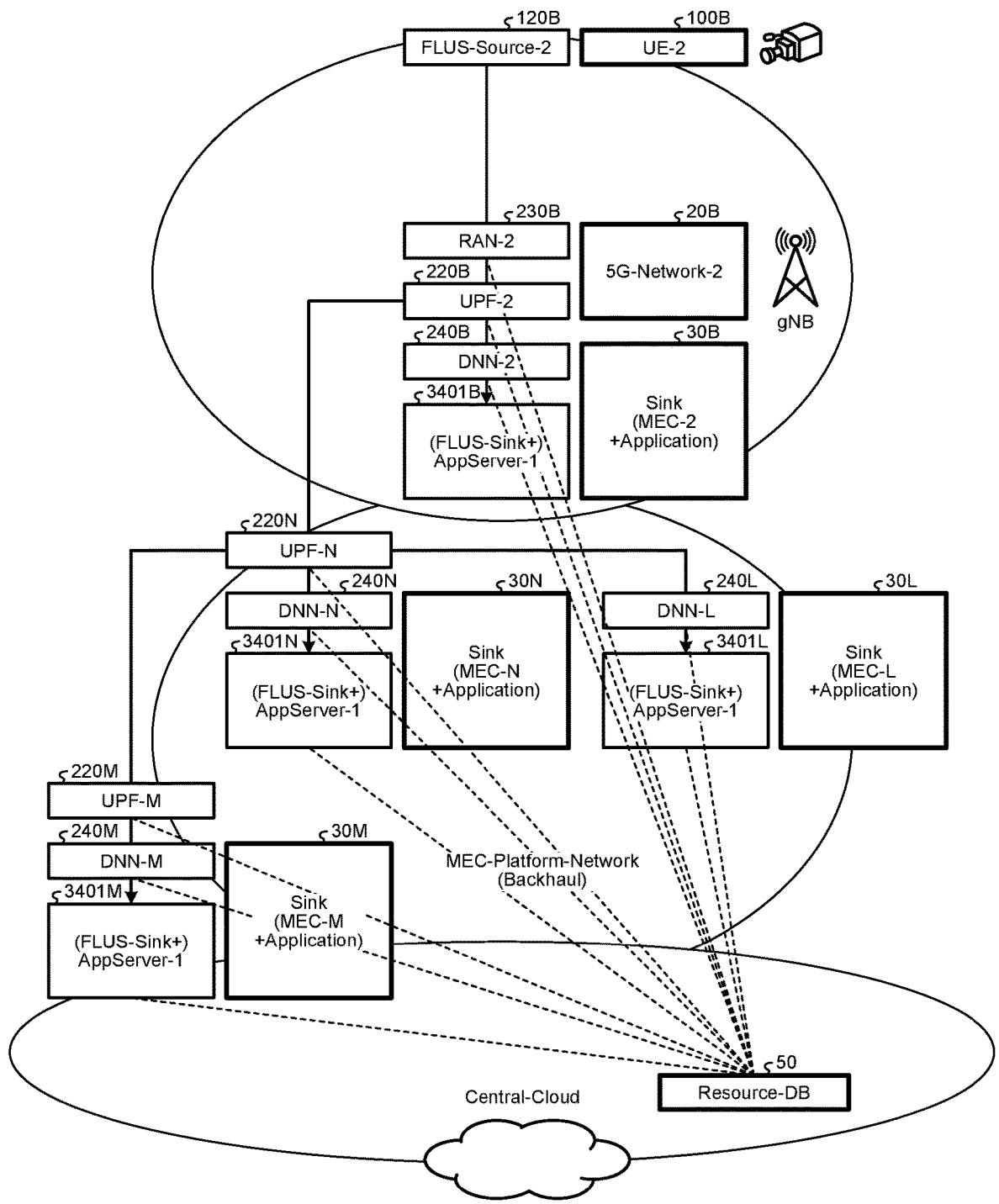
FIG. 44 is a diagram illustrating a configuration example of an information processing system according to the present embodiment.

Here, the selection of the UPF 220 will be described. FIG. 44 is a diagram illustrating a configuration example of an information processing system according to the present embodiment.

As illustrated in FIG. 44, for example, the Application-Client 120B identified by FLUS-Source-2 and included in the UE 100B identified by UE-2 is coupled with the RAN 230B identified by RAN-2. The RAN 230 is, in addition to a UPF 220B identified by UPF-2, a component included in the network 20B identified by 5G-Network-2.

The information processing system includes UPF 220M and UPF 220N identified by UPF-M and UPF-N, respectively, in addition to the UPF 220B identified by UPF-2. UPFs 220 are each coupled with a DN 240 identified by DNN-n. A UPF 220 may be coupled with a plurality of DN 240. For example, the UPF 220N is coupled with a DN 240N identified by DNN-N and a DN 240L identified by DNN-L. A DN 240 is included in a streaming sink 30 together with a FLUS-Sink+3401 identified by AppServer-1.

Note that a UPF 220, a DN 240, and a FLUS-Sink+3401 can be implemented in an MEC-Platform-Network which is a backhaul or in the Central-Cloud. Alternatively, they may be implemented in a network 20 including a RAN 230. The RAN 230, the UPF 220, the DN 240, and the FLUS-Sink+3401 are coupled with the resource database 50 arranged in the Central-Cloud.

As described above, in the information processing system in which the plurality of UPF 220 is included, selecting a UPF at the time of PDU session establishment may greatly delay the PDU session establishment process.

This is because various processes are required for selecting a UPF 220. Examples of such processes may include a process of examining an available UPF 220 and a process of confirming whether or not an application that is in the vicinity of the UE 100A and that is necessary for the UE 100A can be actually caused to operate on the MEC (calculation capacity, storage capacity, load, etc.). Furthermore, such processes may include a selection process of the DN 240 on which the MEC is implemented and a setting process of parameters (DNN/S-NSSAI, UL-CL (Uplink Classifier), and the like) of a PDU session. Furthermore, such processes may include a parameter setting process dependent on the local operator policy and an evaluation process of the load or capacity of the UPF 220, and the like.

These many processes need to be performed, and the PDU session establishment process may take time.

In addition, a UPF 220 plays a role of packet routing of controlling the flow of an uplink stream to a DN 240. Therefore, a UPF 220 is configured in the vicinity of each local DN 240. In a case where there is a plurality of DN 240 on a network from a RAN 230 to the cloud, a UPF 220 is configured for each forwarding destination DN 240. Since a plurality of Applications can be executed on each MEC, the configuration of an executable application may change minutely depending on a calculation or storage resource (other various hardware accelerators implemented in the MEC) or the load status of the MEC environment. Furthermore, the load status may also change for each UPF 220 that forwards the stream to the selected MEC. Therefore, an optimal MEC needs to be selected depending on these pieces of status information of the MEC.

Here, the MEC is expected not only to be directly operated by an operator but also to be provided by various third-party application providers. Therefore, it is desirable that the configuration status of the MEC can be grasped from the operator network side via a standard interface.

In the technology of the present disclosure, the resource attributes and the availability time of an Application that can operate on the MEC for the future are registered in the resource database 50 in association with each other. Therefore, in the technology of the present disclosure, it is possible to select an optimum DN 240 (and an Application that operates on the DN 240) and UPF 220 on the basis of the information registered in the resource database 50.

For example, as described above, upon uplink session establishment, the UE 100A provides the SRB to the network 20. This allows the network 20 to identify a PDU session that is coupled with the Application that is in an operating state on the MEC and that is already established and available. Therefore, since the network 20 can execute the PDU session establishment process by using the PDU session that has been identified, there is no need to newly identify a PDU session that meets the condition, and overheads of the PDU session establishment process can be reduced. As a result, it can be expected that an uplink session is seamlessly handed over.

Figure 45:
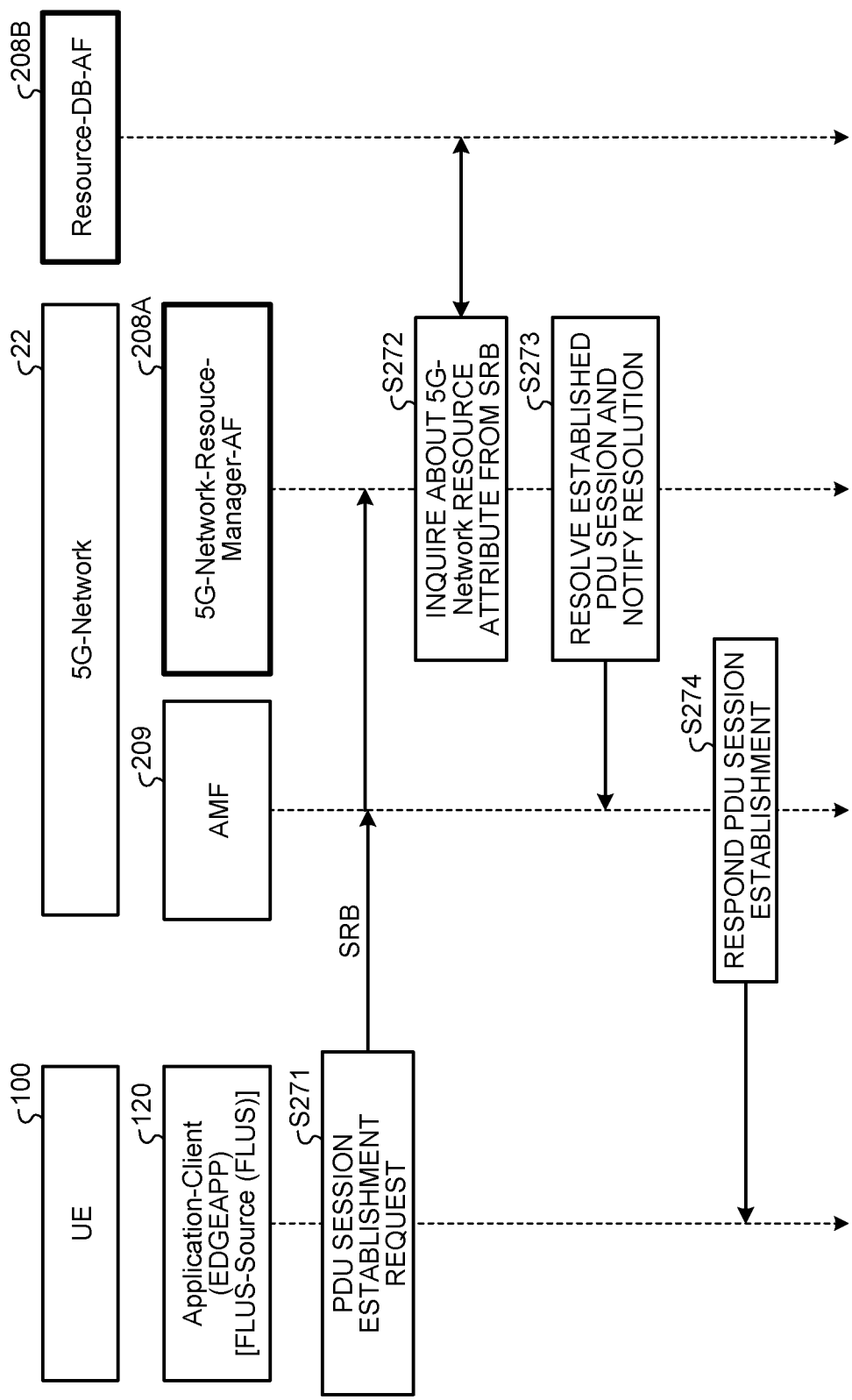
FIG. 45 is a sequence diagram illustrating a flow of a PDU session establishment process according to the embodiment of the present disclosure.

An example of the PDU session establishment process using the SRB will be described with reference to FIG. 45. FIG. 45 is a sequence diagram illustrating a flow of the PDU session establishment process according to the embodiment of the present disclosure. In FIG. 45, a case where FLUS-Source which is the streaming source 10 FLUS-Source which is the streaming source 10 is the Application-Client 120 of EDGEAPP is illustrated. Furthermore, in FIG. 45, a case where the 5G-Network-Resource-Manager-AF 208A executes a part of the PDU session process, and the resource database 50 is an AF (Resource-DB-AF 208B) on the network 20 is illustrated.

The Application-Client 120 on the UE 100A transmits a PDU session establishment request including the SRB to the 5G-Network-Resource-Manager-AF 208A via the AMF 209 (step S271).

The 5G-Network-Resource-Manager-AF 208A inquires the 5G-Network resource attributes from the SRB to the Resource-DB-AF 208B (step S272). The 5G-Network-Resource-Manager-AF 208A transmits, for example, the above query to the Resource-DB-AF 208B as the inquiry of the resource attributes and receives a response.

The 5G-Network-Resource-Manager-AF 208A resolves the established PDU session that has been specified on the basis of the SRB and notifies the AMF 209 that the PDU session has been resolved (step S273). At this point, the 5G-Network-Resource-Manager-AF 208A notifies the AMF 209 of information such as the IP address of a UD or a QoS Flow necessary for an establishment response.

The AMF 209 transmits a PDU session establishment response to the UE 100A on the basis of a notification from the 5G-Network-Resource-Manager-AF 208A (step S274).

8. FUNCTIONAL CONFIGURATION EXAMPLE OF DEVICE

Here, a functional configuration example of each device according to the embodiment of the present disclosure will be described with reference to FIGS. 46 to 48.

[Terminal Device]

Figure 46:
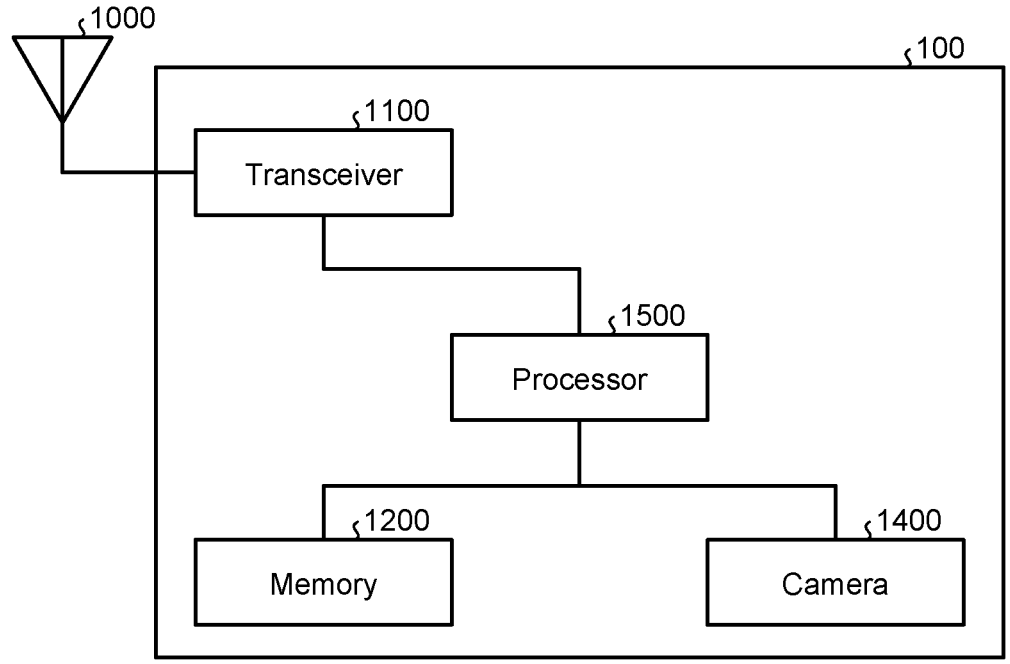
FIG. 46 is a block diagram illustrating a functional configuration example of a terminal device according to the embodiment of the present disclosure.

FIG. 46 is a block diagram illustrating a functional configuration example of a terminal device 100 according to the embodiment of the present disclosure.

The terminal device 100 includes an antenna unit 1000, a communication unit (transceiver) 1100, a storage unit (memory) 1200, an imaging unit (camera) 1400, and a control unit (processor) 1500. Note that the configuration illustrated in FIG. 46 is a functional configuration, and the hardware configuration may be different from the functional configuration. Furthermore, the functions of the terminal device 100 may be implemented in a distributed manner in a plurality of physically separated configurations.

The antenna unit 1000 radiates a signal output from the communication unit 1100 into space as a radio wave. The antenna unit 1000 further converts a radio wave in space into a signal and outputs the signal to the communication unit 1100.

The communication unit 1100 transmits and receives a signal. For example, the communication unit 1100 receives a downlink signal from a base station device 200 and transmits an uplink signal to the base station device 200.

The storage unit 1200 is a storage device capable of reading and writing data, such as a DRAM, an SRAM, a flash memory, or a hard disk. The storage unit 1200 functions as a storage means of the terminal device 100. The imaging unit 1400 is, for example, a camera, and corresponds to the streaming source 10 described above.

The control unit 1500 is a controller that controls each unit of the terminal device 100. The control unit 1500 is implemented by, for example, a processor (hardware processor) such as a CPU or an MPU. For example, the control unit 1500 is implemented by a processor executing various programs stored in the storage device inside the terminal device 100 using a RAM or the like as a work area. Note that the control unit 1500 may be implemented by an integrated circuit such as an ASIC or an FPGA. Any of the CPU, the MPU, the ASIC, and the FPGA can be regarded as a controller.

Note that the terminal device 100 may have a component such as a display unit, an input and output unit, or a voice output unit such as a speaker in addition to the above configuration.

[Base Station Device]

Figure 47:
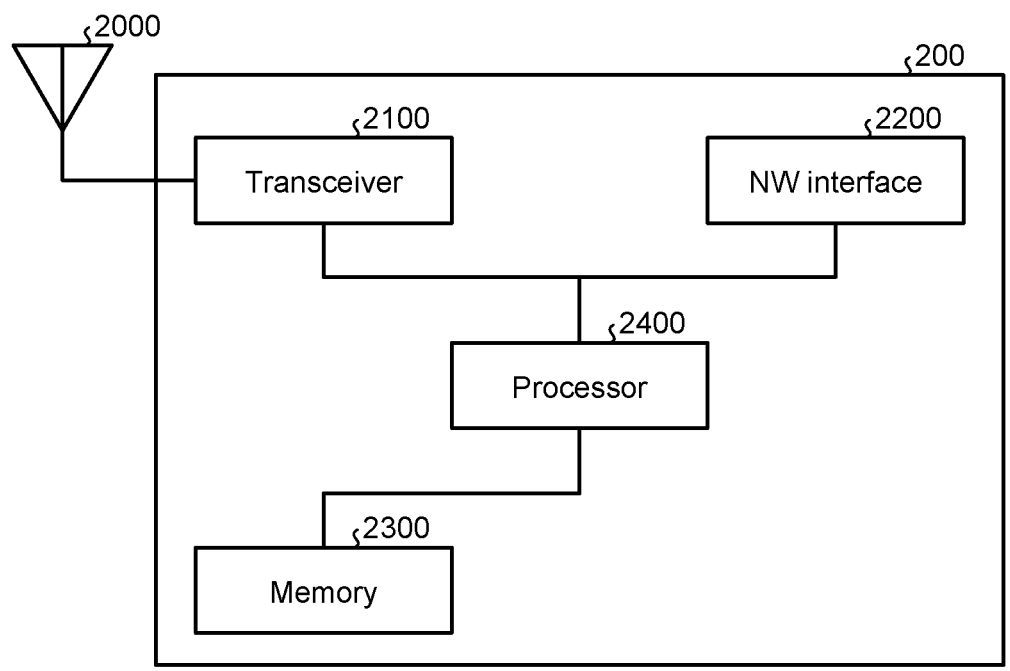
FIG. 47 is a block diagram illustrating a functional configuration example of a base station device according to the embodiment of the present disclosure.

FIG. 47 is a block diagram illustrating a functional configuration example of a base station device 200 according to the embodiment of the present disclosure.

The base station device 200 includes an antenna unit 2000, a communication unit (transceiver) 2100, a network communication unit (NW interface) 2200, a storage unit (memory) 2300, and a control unit (processor) 2400. Note that the configuration illustrated in FIG. 47 is a functional configuration, and the hardware configuration may be different from the functional configuration. Furthermore, the functions of the base station device 200 may be implemented in a distributed manner in a plurality of physically separated configurations.

The antenna unit 2000 radiates a signal output from the communication unit 2100 into space as a radio wave. The antenna unit 2000 further converts a radio wave in space into a signal and outputs the signal to the communication unit 2100.

The communication unit 2100 transmits and receives a signal. For example, the communication unit 2100 receives an uplink signal from the terminal device 100 and transmits a downlink signal to the terminal device 100.

The network communication unit 2200 is a communication interface for communicating with a node positioned at a higher level on the network (for example, a node of the network 20). The network communication unit 2200 is, for example, a LAN interface such as an NIC. The network communication unit 2200 may be a wired interface or a wireless interface. The network communication unit 2200 functions as a network communication means of the base station device 200.

The storage unit 2300 is a storage device capable of reading and writing data, such as a DRAM, an SRAM, a flash memory, or a hard disk. The storage unit 2300 functions as a storage means of the base station device 200.

The control unit 2400 is a controller that controls each unit of the base station device 200. The control unit 2400 is implemented by, for example, a processor (hardware processor) such as a central processing unit (CPU) or a micro processing unit (MPU). For example, the control unit 2400 is implemented by a processor executing various programs stored in a storage device inside the base station device 200 using a random access memory (RAM) or the like as a work area. Note that the control unit 2400 may be implemented by an integrated circuit such as an application specific integrated circuit (ASIC) or a field programmable gate array (FPGA). Any of the CPU, the MPU, the ASIC, and the FPGA can be regarded as a controller.

[Information Processing Device]

Figure 48:
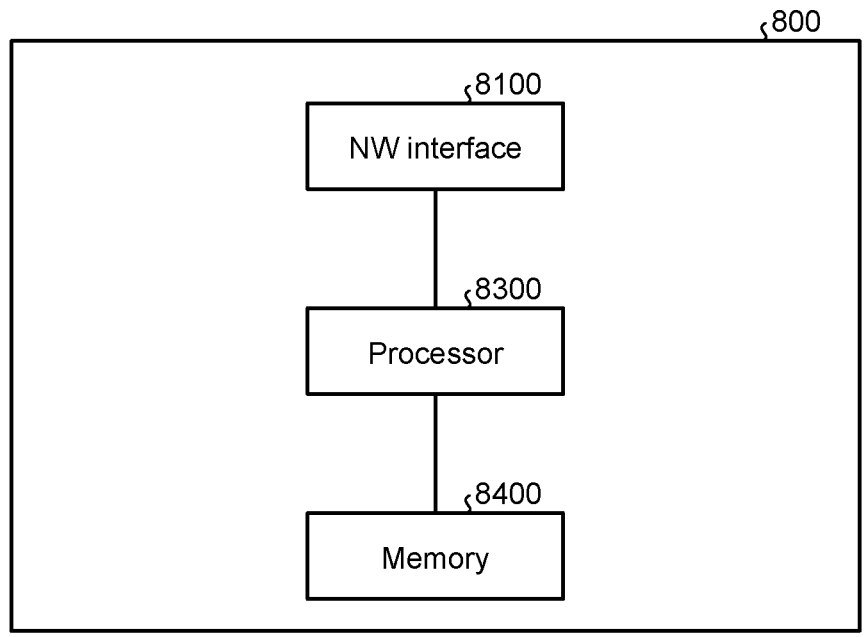
FIG. 48 is a block diagram illustrating a functional configuration example of an information processing device according to the embodiment of the present disclosure.

FIG. 48 is a block diagram illustrating a functional configuration example of an information processing device 800 according to the embodiment of the present disclosure. Examples of the information processing device 800 include the application server 300 and the information processing device 400 in FIG. 1 and each node (NF or AF) of the network 20, the control point 40, and the resource database 50 illustrated in FIG. 3. A functional configuration of the information processing device 800 will be described with reference to FIG. 48 as a functional configuration example of the application server 300, the information processing device 400, each node of the network 20, the control point 40, and the resource database 50.

The information processing device 800 includes a network communication unit (NW interface) 8100, a storage unit (memory) 8200, and a control unit (processor) 8300. Note that the configuration illustrated in FIG. 48 is a functional configuration, and the hardware configuration may be different from the functional configuration. Furthermore, the functions of the information processing device 800 may be implemented in a distributed manner in a plurality of physically separated configurations.

The network communication unit 8100 is a communication interface for communicating with a node positioned on the network (for example, a node of the network 20). The network communication unit 8100 is, for example, a LAN interface such as an NIC. The network communication unit 8100 may be a wired interface or a wireless interface. The network communication unit 8100 functions as a network communication means of the information processing device 800.

The storage unit 8200 is a storage device capable of reading and writing data, such as a DRAM, an SRAM, a flash memory, or a hard disk. The storage unit 8200 functions as a storage means of the information processing device 800.

The control unit 8300 is a controller that controls each unit of the information processing device 800. The control unit 8300 is implemented by, for example, a processor (hardware processor) such as a central processing unit (CPU) or a micro processing unit (MPU). For example, the control unit 8300 operates as a control unit of the application server 300, the information processing device 400, each node of the network 20, the control point 40, or the resource database 50 by the processor executing various programs stored in the storage device inside the information processing device 800 using a random access memory (RAM) or the like as a work area. Note that the control unit 8300 may be implemented by an integrated circuit such as an application specific integrated circuit (ASIC) or a field programmable gate array (FPGA). Any of the CPU, the MPU, the ASIC, and the FPGA can be regarded as a controller.

9. OTHER EMBODIMENTS

The SRB described above can be transmitted as it is (for example, string token) from the control point 40 to the streaming source 10, the network 20, and the streaming sink 30. Alternatively, it may be notified by incorporation into Network-based Media Processing-WorkflowDescription (hereinafter, referred to as NBMP-WD), of which standardization by Network-based Media Processing (NBMP) is ongoing, or the like.

Figure 49:
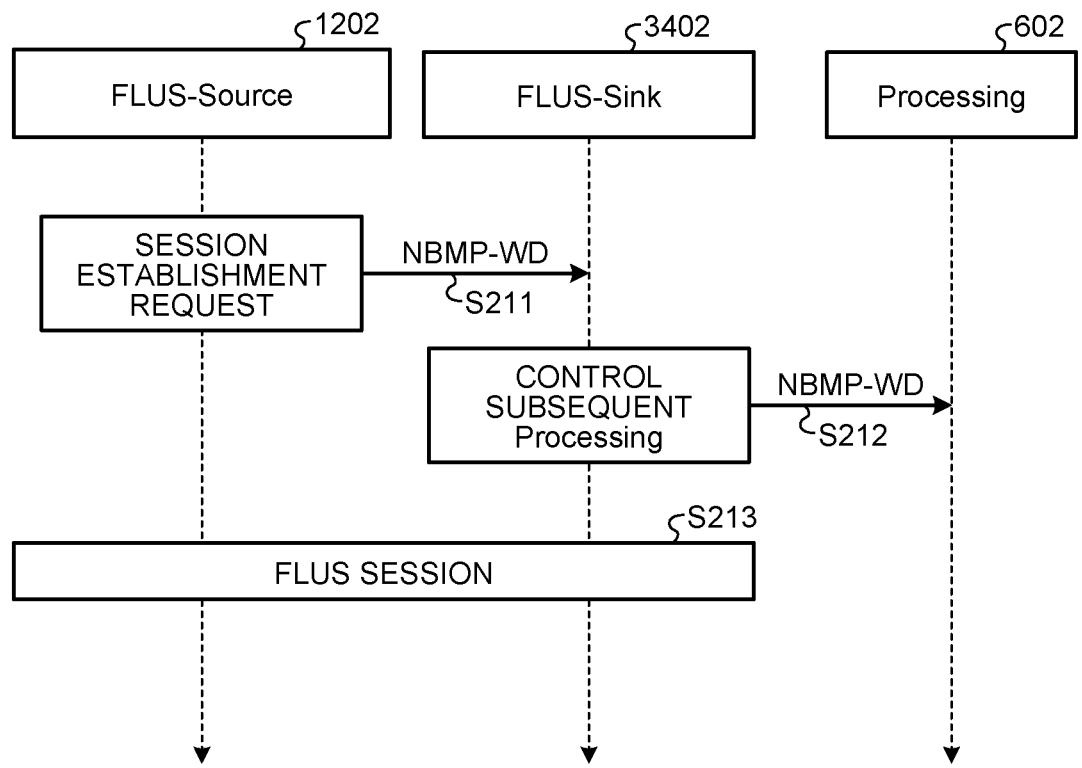
FIG. 49 is a sequence diagram illustrating an example of a workflow using NBMP-WD.

FIG. 49 is a sequence diagram illustrating an example of a workflow using the NBMP-WD. As illustrated in FIG. 47, a FLUS-Source 1202 transmits a session establishment request to a FLUS-Sink 3402 using the NBMP-WD (step S211). After receiving the session establishment request, the FLUS-Sink 3402 controls Processing 602 in a subsequent stage using the NBMP-WD (step S212) and establishes a FLUS session with the FLUS-Source 1202 (step S213).

As described above, the NBMP-WD is adopted as one of workflow descriptions for controlling a group of applications executed in a subsequent stage on the FLUS-Sink 3402 side as a session stream process. Such a session stream process is passed from the FLUS-Source 1202 side to the FLUS-Sink 3402 side when a FLUS session (application protocol) is established.

That is, in a context in which an uplink streaming session is controlled using the FLUS protocol, resource attributes related to the streaming sink 30 (Application-Server(s) 340) may be described using the NBMP-WD. Furthermore, the NBMP-WD may be generated by storing the content of the SRB and thereby notified. Hereinafter, the NBMP-WD in which the SRB is stored is also referred to as SRB extended NBMP-WD.

[Registration Process of Resource Attributes]

First, the registration process of a resource attribute and availability time by the NBMP-WD of the streaming sink 30 will be described. Here, a case where FLUS-Sink (or FLUS-Sink and Processing), which is the streaming sink 30, is the Edge-Application-Server(s) 340 of EDGEAPP will be described.

In steps S62 and S63 of FIG. 8, the Edge-Application-Server(s) 340 request(s) the resource database 50 to register the resource attributes of the Edge-Application-Server(s) 340 via the Edge-Enabler-Server 330. At this time, the Edge-Application-Server(s) 340 describes its own resource attributes using the NBMP-WD. Note that the availability time is described in Start time of Processing Description of the NBMP-WD.

Note that the Edge-Enabler-Server 330 may register the resource attributes related to the Edge-Enabler-Server 330 in the resource database 50 in association with the resource attributes of the Edge-Application-Server(s) 340. In this case, the NBMP-WD is registered in the resource database 50 in association with the Edge-Enabler-Server 330.

The processes other than the above are the same as the registration process illustrated in FIG. 8.

[Reservation Process]

Figure 50:
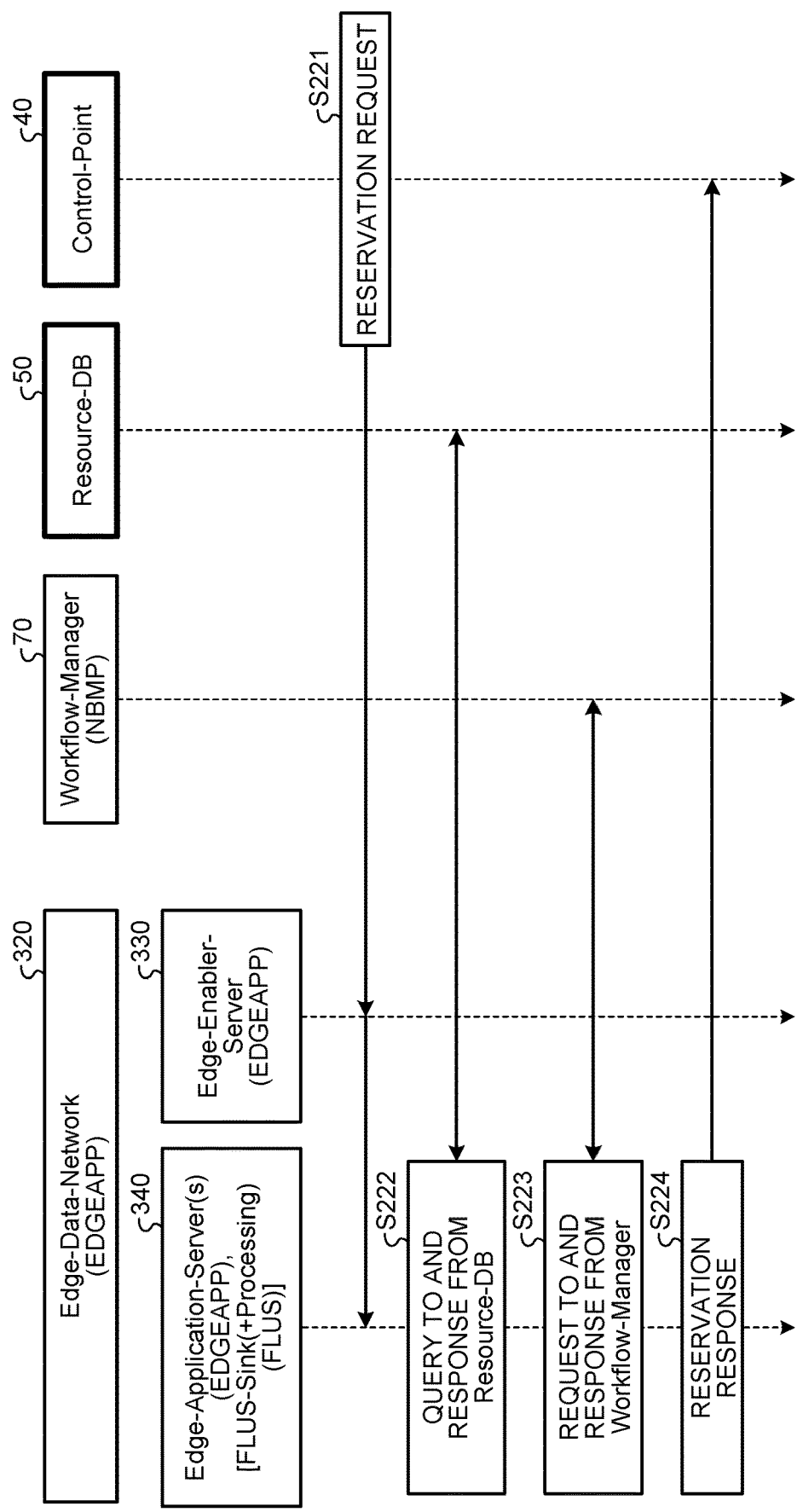
FIG. 50 is a sequence diagram illustrating an example of a reservation process according to another embodiment of the present disclosure.
Figure 51:
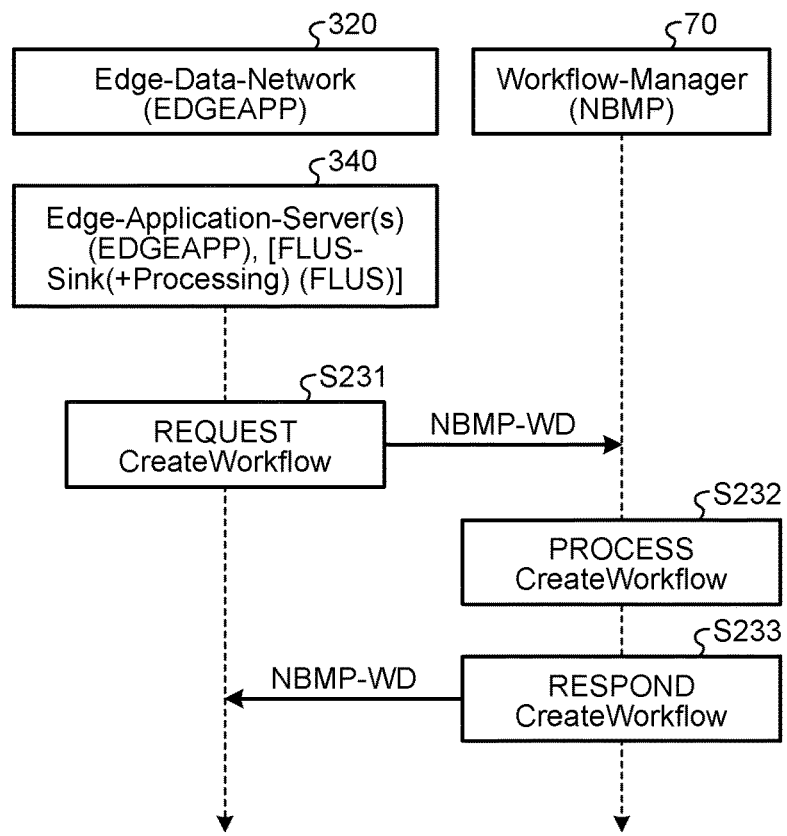
FIG. 51 is a sequence diagram illustrating an example of a reservation process according to another embodiment of the present disclosure.

Next, a case where the NBMP-WD is used for the reservation process of reserving a resource performed by the control point 40 with respect to the streaming sink 30 will be described with reference to FIGS. 50 and 51. FIGS. 50 and 51 are sequence diagrams each illustrating an example of the reservation process according to another embodiment of the present disclosure.

Here, a case where FLUS-Sink (or FLUS-Sink and Processing), which is the streaming sink 30, is the Edge-Application-Server(s) 340 of EDGEAPP will be described.

The Edge-Application-Server(s) 340 is(are) associated with the Edge-Enabler-Server 330. Therefore, as illustrated in FIG. 50, the control point 40 first transmits a reservation request to the Edge-Application-Server(s) 340 via the Edge-Enabler-Server 330 (step S221).

The Edge-Application-Server(s) 340 that has/have received the reservation request transmit(s) a query to the resource database 50 and receive(s) a response (step S222). Here, in the response from the resource database 50, the NBMP-WD is used as a description of the Edge-Application-Server(s) 340.

The Edge-Application-Server(s) 340 transmit(s) a request to a Workflow-Manager 70 and receive(s) a response (step S223).

Here, the interaction between the Edge-Application-Server(s) 340 and the Workflow-Manager 70 will be described with reference to FIG. 51. The interaction between the Edge-Application-Server(s) 340 and the Workflow-Manager 70 is performed using a Workflow-API.

First, the Edge-Application-Server(s) 340 pass(es) the NBMP-WD to the Workflow-Manager 70 as a CreateWorkflow request by a CreateWorkflow-API (step S231).

The Workflow-Manager 70 executes the process of CreateWorkflow in response to the request (step S232). Specifically, the Workflow-Manager 70 generates a Workflow (chain of media processing processes) on the basis of the content of the request. Furthermore, the Workflow-Manager 70 may explicitly perform an execution resource reservation process of the media processing processes on the condition that the executability at a future Start time is ensured.

The Workflow-Manager 70 returns a CreateWorkflow response to the Edge-Application-Server(s) 340 (step S233). In a case where the resources necessary for execution of the workflow can be committed to the Start time of a Processing Descriptor in the NBMP-WD, the Workflow-Manager 70 returns a response indicating that the API call has been successful. Note that it is assumed that a wall clock time is designated as the Start time.

Let us return to FIG. 50. The Edge-Application-Server(s) 340 that has/have received the response from the Workflow-Manager 70 transmit(s) a reservation result (whether or not the reservation can be made) to the control point 40 as a reservation response (step S224).

[SRB Extended NBMP-WD]

Figure 52:
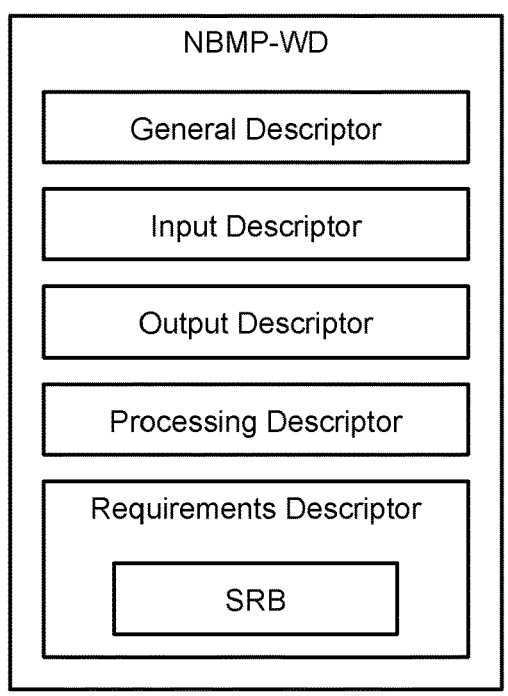
FIG. 52 is a diagram for describing SRB extended NBMP-WD according to another embodiment of the present disclosure.

FIGS. 52 and 53 are diagrams for describing SRB extended NBMP-WD according to another embodiment of the present disclosure.

In FIG. 52, the structure of the NBMP-WD is illustrated. In the present embodiment, the SRB is included as a parameter of a Requirements Descriptor of the NBMP-WD. Note that, in FIG. 52, only elements essential as elements of the NBMP-WD other than the SRB are illustrated.

In addition, as illustrated in FIG. 53, the SRB is stored in the NBMP-WD by introducing ScheduledResourceBinding as Bound Resource Parameters in Requirements Descriptor parameters.

The ScheduledResourceBinding is defined as a token utilized to resolve a reserved resource bound to an instance function task at a scheduled time as described in a workflow.

The control point 40 notifies the SRB extended NBMP-WD instead of the SRB to the streaming source 10, the network 20, and the streaming sink 30.

In a case where the control point 40 notifies the streaming source 10, the control point 40 notifies the SRB extended NBMP-WD instead of the SRB in step S131 of FIG. 27, for example. The above similarly applies to the case of the network 20 and the streaming sink 30.

Note that, in a case where the control point 40 notifies the streaming source 10, a Remote-Command of FLUS to be newly introduced may be notified as the SRB extended NBMP-WD.

10. MODIFICATIONS

The processes according to the above embodiments may be performed in various different modes (modifications) in the above embodiments.

A control device that controls the terminal device 100, the base station device 200, or the information processing device 800 of the present embodiment may be implemented by a dedicated computer system or a general-purpose computer system.

For example, a program for executing the above operation is stored and distributed in a computer-readable recording medium such as an optical disk, a semiconductor memory, a magnetic tape, or a flexible disk. Then, for example, the program is installed in a computer, and the above processes are executed, thereby configuring the control device. At this point, the control device may be a device (for example, a personal computer) external to the terminal device 100, the base station device 200, or the information processing device 800. Furthermore, the control device may be an internal device (for example, the control unit 1500, the control unit 2400, or the control unit 8300) of the terminal device 100, the base station device 200, or the information processing device 800.

In addition, the communication program may be stored in a disk device included in a server device on a network such as the Internet so that the communication program can be downloaded to a computer. In addition, the above functions may be implemented by cooperation of an operating system (OS) and application software. In this case, a portion other than the OS may be stored in a medium and distributed, or a portion other than the OS may be stored in a server device to allow downloading or the like to a computer.

Among the processes described in the above embodiments, all or a part of the processes described as those performed automatically can be performed manually, or all or a part of the processes described as those performed manually can be performed automatically by a known method. In addition, a process procedure, a specific name, and information including various types of data or parameters illustrated in the above or in the drawings can be modified as desired unless otherwise specified. For example, various types of information illustrated in the drawings are not limited to the information that has been illustrated.

In addition, each component of each device illustrated in the drawings is conceptual in terms of the function and does not need to be necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like.

In addition, the above embodiments can be combined as appropriate as long as the process content does not contradict each other. In addition, the order of the steps illustrated in the sequence diagram or the flowchart of the present embodiment can be modified as appropriate.

Furthermore, for example, the present embodiment can be implemented as any configuration including a device or a system, for example, a processor such as a system large scale integration (LSI), a module using a plurality of processors or the like, a unit using a plurality of modules or the like, a set obtained by further adding another function to a unit, or the like (that is, a component of a device).

Note that, in the present embodiment, a system refers to a set of a plurality of components (devices, modules (parts), etc.), and it does not matter whether or not all the components are in the same housing. For example, a plurality of devices housed in separate housings and coupled via a network or the like, and one device in which a plurality of modules is housed in one housing are both systems.

Furthermore, for example, the present embodiment can adopt a configuration of cloud computing in which one function is shared and processed by a plurality of devices in cooperation via a network.

11. SUMMARY

The control point 40, which is an example of the information processing device, includes a control unit (for example, the control unit 8300). The control unit acquires each piece of resource information (for example, resource attributes) related to a plurality of different resources to be used when uplink data (for example, a captured image) is transmitted by streaming. The control unit selects a resource to be used by a device (for example, the streaming source 10, the network 20, or the streaming 30) that performs streaming on the basis of the resource information that has been acquired and reserves the use of the resource that has been selected. The control unit generates combination information (for example, scheduled binding information (SRB)) related to a combination of resources reserved for use.

As a result, the information processing device can implement seamless uplink streaming and can implement a high-quality and low-delay uplink of a recording stream.

Furthermore, the control unit of the information processing device notifies the generated combination information to the device that performs the streaming. As a result, the combination information can be shared between the information processing device and the device that performs the streaming, and seamless uplink streaming can be implemented.

Furthermore, the control unit of the information processing device acquires the resource information in association with the availability time for using the resource. As a result, the information processing device can select an available resource depending on the schedule and can implement seamless uplink streaming.

Furthermore, the control unit of the information processing device selects a resource in accordance with a condition (for example, service requirements) required for streaming. As a result, the information processing device can implement seamless uplink streaming while satisfying the conditions required for the streaming.

Furthermore, in a case where updated resource information is acquired, the control unit of the information processing device performs resource reselection and re-reservation on the basis of the updated resource information and updates the combination information on the basis of the resource that has been re-reserved. As a result, the information processing device can implement seamless uplink streaming even in a case where the resource information is updated.

In addition, the device that performs the streaming establishes a session using the combination information and performs the streaming. As a result, the session can be established by using the resource that has been reserved in advance, and seamless uplink streaming can be implemented.

In addition, the device that performs the streaming executes the session establishment process before a use start time of the resource. As a result, communication can be more reliably started at the use start time of the resource, and seamless uplink streaming can be implemented.

Furthermore, the device that performs the streaming stops the session after the use end time of the resource. As a result, communication can be performed more reliably until the use end time of the resource, and seamless uplink streaming can be implemented.

In addition, the device that performs the streaming transmits a session establishment request including the combination information. As a result, since a resource that has been executed can be released using the combination information, the session establishment process can be performed earlier.

Furthermore, the resource reserved by the information processing device includes at least one of a communication resource used for transmission of the uplink data or a processing resource used for processing of the uplink data. As a result, the information processing device can secure resources necessary for transmission or processing of the uplink data in advance, and seamless uplink streaming can be implemented.

Although the embodiments of the present disclosure have been described above, the technical scope of the present disclosure is not limited to the above embodiments as they are, and various modifications can be made without departing from the gist of the present disclosure. In addition, components of different embodiments and modifications may be combined as appropriate.

Furthermore, the effects of the embodiments described herein are merely examples and are not limiting, and other effects may be achieved.

Note that the present technology can also have the following configurations.

(1)

An information processing device comprising:
a control unit that
acquires each piece of resource information related to a plurality of different resources to be used when uplink data is transmitted by streaming,
selects one of the resources to be used by a device that performs the streaming on the basis of the resource information that has been acquired, performs reservation for use of the resource that has been selected, and
generates combination information regarding a combination of the resources for which the reservation for use has been made.

(2)

The information processing device according to (1),
wherein the control unit notifies the device that performs the streaming of the combination information that has been generated.

(3)

The information processing device according to (1) or (2), wherein the control unit acquires the resource information in association with an availability time for using the resource.

(4)

The information processing device according to any one of (1) to (3), wherein the control unit selects the resource in accordance with a condition required for the streaming.

(5)

The information processing device according to any one of (1) to (4), wherein, in a case where the resource information, which has been updated, is acquired, the control unit reselects and re-reserves the resource on the basis of the resource information that has been updated, and updates the combination information on the basis of the resource that has been re-reserved.

(6)

The information processing device according to any one of (1) to (5), wherein the device that performs the streaming establishes a session using the combination information and performs the streaming.

(7)

The information processing device according to (6), wherein the device that performs the streaming executes an establishment process of the session before a use start time of the resource.

(8)

The information processing device according to (7) or (8), wherein the device that performs the streaming stops the session after a use end time of the resource.

(9)

The information processing device according to any one of (6) to (8), wherein the device that performs the streaming transmits a session establishment request including the combination information.

(10)

The information processing device according to any one of (1) to (9), wherein the resource includes at least one of a communication resource used for transmission of the uplink data or a processing resource used for processing of the uplink data.

(11)

An information processing method comprising:
acquiring each piece of resource information related to a plurality of different resources to be used when uplink data is transmitted by streaming;
selecting one of the resources to be used by a device that performs the streaming on the basis of the resource information that has been acquired;
performing reservation for use of the resource that has been selected; and
generating combination information regarding a combination of the resources for which the reservation for use has been made.

(12)

An information processing system comprising:
a storage device; and an information processing device, wherein the storage device
stores resource information related to a plurality of different resources to be used when uplink data is transmitted by streaming, and the information processing device
acquires the resource information,
selects one of the resources to be used by a device that performs the streaming on the basis of the resource information that has been acquired,
performs reservation for use of the resource that has been selected, and
generates combination information regarding a combination of the resources for which the reservation for use has been made.

REFERENCE SIGNS LIST

10 STREAMING SOURCE
20 NETWORK
30 STREAMING SINK
40 CONTROL POINT
50 RESOURCE DATABASE
100 TERMINAL DEVICE
200 BASE STATION DEVICE
300 APPLICATION SERVER

The invention claimed is:

1. An information processing device comprising:
a control unit that
acquires each piece of resource information related to a plurality of different resources to be used when uplink data is transmitted by streaming,
selects one of the resources to be used by a device that performs the streaming on the basis of the resource information that has been acquired, performs reservation for use of the resource that has been selected, and
generates combination information regarding a combination of the resources for which the reservation for use has been made.

2. The information processing device according to claim 1,
wherein the control unit notifies the device that performs the streaming of the combination information that has been generated.

3. The information processing device according to claim 1,
wherein the control unit acquires the resource information in association with an availability time for using the resource.

4. The information processing device according to claim 1,
wherein the control unit selects the resource in accordance with a condition required for the streaming.

5. The information processing device according to claim 1,
wherein, in a case where the resource information, which has been updated, is acquired, the control unit reselects and re-reserves the resource on the basis of the resource information that has been updated, and updates the combination information on the basis of the resource that has been re-reserved.

6. The information processing device according to claim 1,
wherein the device that performs the streaming establishes a session using the combination information and performs the streaming.

7. The information processing device according to claim 6,
wherein the device that performs the streaming executes an establishment process of the session before a use start time of the resource.

8. The information processing device according to claim 6,
wherein the device that performs the streaming stops the session after a use end time of the resource.

9. The information processing device according to claim 6,
wherein the device that performs the streaming transmits a session establishment request including the combination information.

10. The information processing device according to claim 1,
wherein the resource includes at least one of a communication resource used for transmission of the uplink data or a processing resource used for processing of the uplink data.

11. An information processing method comprising:
acquiring each piece of resource information related to a plurality of different resources to be used when uplink data is transmitted by streaming;
selecting one of the resources to be used by a device that performs the streaming on the basis of the resource information that has been acquired;
performing reservation for use of the resource that has been selected; and
generating combination information regarding a combination of the resources for which the reservation for use has been made.

12. An information processing system comprising:
a storage device; and an information processing device,
wherein the storage device
stores resource information related to a plurality of different resources to be used when uplink data is transmitted by streaming, and
the information processing device
acquires the resource information,
selects one of the resources to be used by a device that performs the streaming on the basis of the resource information that has been acquired,
performs reservation for use of the resource that has been selected, and
generates combination information regarding a combination of the resources for which the reservation for use has been made.

* * * * *